United States Patent
Okada

(10) Patent No.: US 7,882,740 B2
(45) Date of Patent: Feb. 8, 2011

(54) SENSOR FOR DETECTING ACCELERATION AND ANGULAR VELOCITY

(75) Inventor: Kazuhiro Okada, Ageo (JP)

(73) Assignee: Wacoh Corporation, Ageo-Shi (JP)

( * ) Notice: Subject to any disclaimer, the term of this patent is extended or adjusted under 35 U.S.C. 154(b) by 381 days.

(21) Appl. No.: 12/009,987

(22) Filed: Jan. 23, 2008

(65) Prior Publication Data

US 2008/0289417 A1 Nov. 27, 2008

(30) Foreign Application Priority Data

Feb. 2, 2007 (JP) ............................. 2007-023959

(51) Int. Cl.
*G01P 3/00* (2006.01)
*G01P 15/12* (2006.01)
*G01P 15/09* (2006.01)

(52) U.S. Cl. .................... 73/511; 73/514.33; 73/514.34

(58) Field of Classification Search .................. 73/510, 73/511, 514.33, 514.34, 504.04, 504.12, 73/504.02, 504.03, 514.29
See application file for complete search history.

(56) References Cited

U.S. PATENT DOCUMENTS

| | | | | |
|---|---|---|---|---|
| 4,905,523 | A | 3/1990 | Okada | 73/862.04 |
| 4,967,605 | A | 11/1990 | Okada | 73/862.04 |
| 4,969,366 | A | 11/1990 | Okada | 73/862.08 |
| 5,014,415 | A | 5/1991 | Okada | 29/621.1 |
| 5,035,148 | A | 7/1991 | Okada | 73/862.04 |
| 5,092,645 | A | 3/1992 | Okada | 294/86.4 |
| 5,182,515 | A | 1/1993 | Okada | 324/259 |
| 5,263,375 | A | 11/1993 | Okada | 73/862.042 |
| 5,295,386 | A | 3/1994 | Okada | 73/1 D |
| 5,343,765 | A | 9/1994 | Okada | 73/862.043 |
| 5,365,799 | A | 11/1994 | Okada | 73/862.041 |
| 5,392,658 | A | 2/1995 | Okada | 73/862.043 |
| 5,406,848 | A | 4/1995 | Okada | 73/517 R |
| 5,421,213 | A | 6/1995 | Okada | 73/862.043 |
| 5,437,196 | A | 8/1995 | Okada | 73/862.043 |
| 5,492,020 | A | 2/1996 | Okada | 73/862.626 |
| 5,497,668 | A | 3/1996 | Okada | 73/862.626 |

(Continued)

FOREIGN PATENT DOCUMENTS

JP 8-35981 2/1996

(Continued)

*Primary Examiner*—Helen C. Kwok
(74) *Attorney, Agent, or Firm*—Ladas & Parry LLP

(57) ABSTRACT

Static and dynamic acceleration as well as static and dynamic angular velocity are detected with a simple structure. An acceleration detecting section includes a weight body, a pedestal around the weight body, flexible plate-like bridge portions, and piezoresistive elements embedded in the upper surface of the bridge portions. An angular velocity detecting section includes a weight body, a pedestal around the weight body, flexible plate-like bridge portions, and piezoelectric elements fixed to the upper surface of the bridge portions. The pedestals are fixed to a device chassis. When the weight body is displaced by acceleration, the plate-like bridge portions are deflected, so that the acceleration is detected based on the change in the electrical resistances of the piezoresistive elements. When the weight body is displaced by a Coriolis force based on angular velocity while supplying alternating signals to the piezoelectric elements to oscillate the weight body, the plate-like bridge portions are deflected, so that the angular velocity is detected based on charge generation in the piezoelectric elements.

24 Claims, 29 Drawing Sheets

U.S. PATENT DOCUMENTS

| | | | |
|---|---|---|---|
| 5,531,002 A | 7/1996 | Okada | 29/25.41 |
| 5,531,092 A | 7/1996 | Okada | 73/1 D |
| 5,571,972 A | 11/1996 | Okada | 73/862.043 |
| 5,639,973 A | 6/1997 | Okada | 73/862.043 |
| 5,646,346 A | 7/1997 | Okada | 73/504.04 |
| 5,668,318 A | 9/1997 | Okada | 73/504.11 |
| 5,682,000 A | 10/1997 | Okada | 73/862.043 |
| 5,723,790 A * | 3/1998 | Andersson | 73/514.36 |
| 5,744,718 A | 4/1998 | Okada | 73/514.33 |
| 5,780,749 A | 7/1998 | Okada | 73/862.043 |
| 5,811,693 A | 9/1998 | Okada | 73/862.043 |
| 5,831,163 A | 11/1998 | Okada | 73/504.12 |
| 5,850,040 A | 12/1998 | Okada | 73/504.04 |
| 5,856,620 A | 1/1999 | Okada | 73/514.32 |
| 5,962,787 A | 10/1999 | Okada et al. | 73/514.32 |
| 5,987,985 A | 11/1999 | Okada | 73/504.04 |
| 6,003,371 A | 12/1999 | Okada | 73/504.02 |
| 6,053,057 A | 4/2000 | Okada | 73/862.043 |
| 6,076,401 A | 6/2000 | Okada | 73/504.12 |
| 6,098,461 A | 8/2000 | Okada | 73/514.34 |
| 6,158,291 A | 12/2000 | Okada | 73/862.043 |
| 6,159,761 A * | 12/2000 | Okada | 438/53 |
| 6,185,814 B1 | 2/2001 | Okada | 29/621.1 |
| 6,205,856 B1 | 3/2001 | Okada | 73/504.11 |
| 6,269,697 B1 | 8/2001 | Okada | 73/504.02 |
| 6,282,956 B1 | 9/2001 | Okada | 73/504.12 |
| 6,314,823 B1 | 11/2001 | Okada | 73/862.043 |
| 6,338,199 B1 * | 1/2002 | Chigira et al. | 33/318 |
| 6,367,326 B1 | 4/2002 | Okada | 73/504.12 |
| 6,378,381 B1 | 4/2002 | Okada et al. | 73/862.043 |
| 6,474,133 B1 | 11/2002 | Okada | 73/1.38 |
| 6,477,903 B2 | 11/2002 | Okada | 73/862.043 |
| 6,512,364 B1 | 1/2003 | Okada | 324/158.1 |
| 6,530,283 B2 | 3/2003 | Okada et al. | 73/780 |
| 6,716,253 B2 | 4/2004 | Okada | 73/52 |
| 6,772,632 B2 | 8/2004 | Okada | 73/514.38 |
| 6,779,408 B2 | 8/2004 | Okada et al. | 324/681 |
| 6,809,529 B2 | 10/2004 | Okada | |
| 6,859,048 B2 | 2/2005 | Okada | |
| 6,864,677 B1 | 3/2005 | Okada | |
| 6,865,943 B2 | 3/2005 | Okada | |
| 6,894,482 B2 | 5/2005 | Okada | |
| 6,915,709 B2 | 7/2005 | Okada | |
| 6,920,788 B2 | 7/2005 | Okada | |
| 6,941,810 B2 | 9/2005 | Okada | |
| 6,990,867 B2 | 1/2006 | Okada | |
| 7,059,188 B2 | 6/2006 | Okada | |
| 7,075,527 B2 | 7/2006 | Okada | |
| 7,121,147 B2 | 10/2006 | Okada | |
| 7,123,028 B2 | 10/2006 | Okada et al. | |
| 7,152,485 B2 | 12/2006 | Okada | |
| 7,219,561 B2 | 5/2007 | Okada | |
| 7,231,802 B2 | 6/2007 | Okada | |
| 7,318,349 B2 * | 1/2008 | Vaganov et al. | 73/514.33 |
| 7,360,455 B2 | 4/2008 | Okada | |
| 7,363,814 B2 | 4/2008 | Okada | |
| 2005/0056096 A1* | 3/2005 | Ozawa et al. | 73/514.36 |
| 2005/0160814 A1* | 7/2005 | Vaganov et al. | 73/514.01 |
| 2007/0012109 A1 | 1/2007 | Okada | |
| 2007/0051182 A1* | 3/2007 | Egawa et al. | 73/777 |
| 2007/0256469 A1 | 11/2007 | Okada | |
| 2008/0178675 A1 | 7/2008 | Okada | |
| 2008/0210008 A1 | 9/2008 | Okada | |
| 2009/0183569 A1* | 7/2009 | Aizawa et al. | 73/504.15 |

FOREIGN PATENT DOCUMENTS

| | | |
|---|---|---|
| JP | 8-68636 | 3/1996 |
| JP | 2002-296293 | 10/2002 |

* cited by examiner

+Fx

−Fx

+Fz

−Fz

SENSOR FOR DETECTING ACCELERATION AND ANGULAR VELOCITY

BACKGROUND OF THE INVENTION

The present invention relates to sensors for detecting acceleration and angular velocity and, in particular, to a sensor for detecting acceleration and angular velocity based on a force applied to a weight body.

Industrial machinery and electronic devices are often equipped with units for detecting physical quantity such as acceleration and/or angular velocity. For this reason, many types of small-sized and high-accuracy acceleration sensors and angular velocity sensors have been developed. In particular, demand for multiaxial acceleration sensors that can detect two- or three-dimensional acceleration and multiaxial angular velocity sensors that can detect bi- or tri-axial angular velocity has been increasing. For example, recently, many digital cameras have a multiaxial acceleration sensor and/or a multiaxial angular velocity sensor incorporated therein for stabilization control. For this type of application, it is an important issue to reduce the size of sensors, and it is requested that one small-sized sensor can detect both acceleration and angular velocity (such a sensor is commonly called a motion sensor).

In response to such a request, the inventor has proposed sensors capable of detecting acceleration and angular velocity. For example, Japanese Unexamined Patent Publications No. 8-068636A and 2002-350138A disclose sensors for detecting acceleration and angular velocity by electrically detecting the displacement of a weight body (oscillator) due to acceleration or angular velocity as deflection of a piezoelectric element. Japanese Unexamined Patent Publication No. 2005-031096A also discloses a sensor for detecting acceleration and angular velocity by electrically detecting the displacement of a weight body (oscillator) as a change in the capacitance of a capacitor.

Such a type of sensor including a piezoelectric element utilizes the properties of piezoelectric elements that mechanical deformation causes charge generation. Therefore, "dynamic displacement of the weight body (transitional motion)" can be detected, but "static displacement of the weight body (deviation from a fixed position)" cannot be detected. Consequently, as for angular velocity detection based on the motion of the weight body, both static angular velocity (angular velocity of rotational motion at a constant speed in a constant direction) and dynamic angular velocity (angular velocity of rotational motion at a time-varying speed and/or in a time-varying direction) can be detected. However, as for acceleration detection, dynamic acceleration (acceleration of a time-varying amount in a time-varying direction) can be detected, but static acceleration (constant acceleration due to, for example, gravity) cannot be detected in this type of sensor. For example, applying a force to the piezoelectric element causes a predetermined amount of charge to be generated initially as a transient response. However, if the applied force is constant, no charge is to be generated after the stabilization of the measurement system. Therefore, constant acceleration due to, for example, gravity (static acceleration) cannot be detected.

On the other hand, such a type of sensor including a capacitor, which can detect the displacement itself of the weight body as a capacitance (distance between the electrodes) of the capacitor, can detect static and dynamic angular velocity as well as static and dynamic acceleration. However, since it is necessary to install wirings for each of the pair of electrodes that constitute the capacitor, the entire structure of the sensor inevitably becomes complicated. Particularly, in the case of an arrangement in which air that serves as a damper is removed from around the weight body such that the interior is evacuated in order to obtain detection values with high accuracy, it is necessary to install wirings for the electrodes inside while keeping the vacuum state, which requires a very complicated structure.

SUMMARY OF THE INVENTION

Hence, it is an object of the present invention to provide a sensor capable of detecting static and dynamic angular velocity as well as static and dynamic acceleration with a simple structure.

(1) The first feature of the invention resides in a sensor for detecting acceleration and angular velocity, comprising an acceleration detecting section and an angular velocity detecting section, the acceleration detecting section comprising: a weight body for acceleration detection; a pedestal for acceleration detection arranged in such a manner as to surround the weight body for acceleration detection; a flexible connection for acceleration detection for connecting the weight body for acceleration detection and the pedestal for acceleration detection; a piezoresistive element embedded in a surface layer of the flexible connection for acceleration detection; and an acceleration detecting circuit for detecting an applied acceleration based on a change in an electrical resistance of the piezoresistive element, the angular velocity detecting section comprising: a weight body for angular velocity detection; a pedestal for angular velocity detection arranged in such a manner as to surround the weight body for angular velocity detection; a flexible connection for angular velocity detection for connecting the weight body for angular velocity detection and the pedestal for angular velocity detection; a driving piezoelectric element and a detecting piezoelectric element fixed directly or indirectly to a surface of the flexible connection for angular velocity detection; and an angular velocity detecting circuit for detecting an applied angular velocity based on a signal generated in the detecting piezoelectric element while supplying an alternating signal to the driving piezoelectric element to periodically deform the flexible connection for angular velocity detection and to generate a periodic motion of the weight body for angular velocity detection, wherein the pedestal for acceleration detection and the pedestal for angular velocity detection form a monolithic structure and are fixed to a device chassis.

(2) The second feature of the invention resides in a sensor for detecting acceleration and angular velocity according to the first feature, wherein the weight body for acceleration detection, the pedestal for acceleration detection, the flexible connection for acceleration detection, the weight body for angular velocity detection, the pedestal for angular velocity detection, and the flexible connection for angular velocity detection are formed of a single silicon or SOI substrate, and the piezoresistive element is constituted by a silicon layer containing impurities formed in a surface layer of the substrate.

(3) The third feature of the invention resides in a sensor for detecting acceleration and angular velocity according to the second feature, wherein a pair of first and second annular grooves are formed on a lower surface of the single substrate, a portion surrounded by the first annular groove constituting the weight body for acceleration detection, while a portion surrounded by the second annular groove constituting the weight body for angular velocity detection, a thinned portion corresponding to the first annular groove constitutes the flexible connection for acceleration detection, while a thinned portion corresponding to the second annular groove constituting the flexible connection for angular velocity detection, and the piezoresistive element is embedded in an upper surface layer of the flexible connection for acceleration detection, and the driving piezoelectric element and the detecting piezoelectric element are fixed directly or indirectly to an upper surface of the flexible connection for angular velocity detection.

(4) The fourth feature of the invention resides in a sensor for detecting acceleration and angular velocity according to the first to third features, wherein the flexible connection for acceleration detection is composed of a plurality of plate-like bridge portions, each of which includes a piezoresistive element arranged on an inner side that is closer to the weight body for acceleration detection and a piezoresistive element arranged on an outer side that is closer to the pedestal for acceleration detection, and the flexible connection for angular velocity detection is composed of a plurality of plate-like bridge portions, each of which includes a driving piezoelectric element arranged on an inner side that is closer to the weight body for angular velocity detection, a driving piezoelectric element arranged on an outer side that is closer to the pedestal for angular velocity detection, a detecting piezoelectric element arranged on an inner side that is closer to the weight body for angular velocity detection, a detecting piezoelectric element arranged on an outer side that is closer to the pedestal for angular velocity detection.

(5) The fifth feature of the invention resides in a sensor for detecting acceleration and angular velocity according to the first to fourth features, wherein a lower electrode and an upper electrode are formed, respectively, on a lower surface and an upper surface of the driving piezoelectric element and the detecting piezoelectric element, a lower surface of the lower electrode is fixed to an upper surface of the flexible connection for angular velocity detection, and the angular velocity detecting circuit detects an applied angular velocity based on an alternating voltage generated between upper and lower electrodes of the detecting piezoelectric element while applying an alternating voltage between upper and lower electrodes of the driving piezoelectric element to generate a periodic motion of the weight body for angular velocity detection.

(6) The sixth feature of the invention resides in a sensor for detecting acceleration and angular velocity according to the fifth feature, wherein the lower electrodes of the piezoelectric elements are formed of a physically single common metal layer.

(7) The seventh feature of the invention resides in a sensor for detecting acceleration and angular velocity according to the fifth or sixth feature, wherein the piezoelectric elements are formed of a physically single common piezoelectric element.

(8) The eighth feature of the invention resides in a sensor for detecting acceleration and angular velocity, comprising:

a weight body;

a pedestal arranged in such a manner as to surround the weight body and fixed to a device chassis;

a flexible connection for connecting the weight body and the pedestal;

a piezoresistive element embedded in a surface layer of the flexible connection;

a driving piezoelectric element and a detecting piezoelectric element fixed directly or indirectly to a surface of the flexible connection;

an acceleration detecting circuit for detecting an applied acceleration based on a change in an electrical resistance of the piezoresistive element; and an angular velocity detecting circuit for detecting an applied angular velocity based on a signal generated in the detecting piezoelectric element while supplying an alternating signal to the driving piezoelectric element to periodically deform the flexible connection and to generate a periodic motion of the weight body.

(9) The ninth feature of the invention resides in a sensor for detecting acceleration and angular velocity according to the eighth feature, wherein the acceleration detecting circuit has a low-pass filter circuit for filtering out high-frequency components contained in a signal that indicates the change in the electrical resistance of the piezoresistive element, the acceleration detecting circuit outputting signal components passing through the low-pass filter circuit as a detection value of acceleration, and the angular velocity detecting circuit has a drive control circuit for supplying an alternating signal to the driving piezoelectric element to control the periodic motion of the weight body, a high-pass filter circuit for filtering out low-frequency components contained in an alternating signal generated in the detecting piezoelectric element, and a synchronous detection circuit for synchronously detecting an alternating signal passing through the high-pass filter circuit at a time point determined by a detection signal supplied from the drive control circuit, the angular velocity detecting circuit outputting a detection result by the synchronous detection circuit as a detected value of angular velocity.

(10) The tenth feature of the invention resides in a sensor for detecting acceleration and angular velocity according to the eighth or ninth feature, wherein the weight body, the pedestal, and the flexible connection are formed of a single silicon or SOI substrate, and the piezoresistive element is constituted by a silicon layer containing impurities formed in a surface layer of the substrate.

(11) The eleventh feature of the invention resides in a sensor for detecting acceleration and angular velocity according to the tenth feature, wherein an annular groove is formed on a lower surface of the single substrate, a portion surrounded by the annular groove constituting the weight body and a thinned portion corresponding to the annular groove constituting the flexible connection, and the piezoresistive element is embedded in an upper surface layer of the flexible connection, and the driving piezoelectric element and the detecting piezoelectric element are fixed directly or indirectly to an upper surface of the flexible connection.

(12) The twelfth feature of the invention resides in a sensor for detecting acceleration and angular velocity according to the eleventh feature, wherein an XYZ three-dimensional coordinate system having X-axis, Y-axis and Z-axis is defined, an origin O thereof being at a center on an upper surface of the weight body and an XY plane thereof corresponding to an upper surface of the substrate, Xa and Xb-axes are defined on either side of the X-axis in the XY plane, the Xa and Xb-axes running parallel to the X-axis with a predetermined space dx from the X-axis, Ya and Yb-axes are defined on either side of the Y-axis in the XY plane, the Ya and Yb-axes running parallel to the Y-axis with a predetermined space dy from the Y-axis, one of the Xa, Xb, Ya, and Yb-axes is defined as an auxiliar W-axis, a portion of the flexible connection closer to the weight body is defined as an inner side, while a portion of the flexible connection closer to the pedestal is defined as an outer side, some of the detecting piezoelectric elements are arranged, respectively, on the inner and outer sides of the flexible connection along respective positive and negative regions of the X-axis, some of the driving piezoelectric elements are arranged, respectively, on the inner and outer sides of the flexible connection along respective positive and negative regions of the Xa-axis, some of the driving piezoelectric elements are arranged, respectively, on the inner and outer sides of the flexible connection along respective positive and negative regions of the Xb-axis, some of the detecting piezoelectric elements are arranged, respectively, on the inner and outer sides of the flexible connection along respective positive and negative regions of the Y-axis, some of the driving piezoelectric elements are arranged, respectively, on the inner and outer sides of the flexible connection along respective positive and negative regions of the Ya-axis, some of the driving piezoelectric elements are arranged, respectively, on the inner and outer sides of the flexible connection along respective positive and negative regions of the Yb-axis, some of the piezoresistive elements are arranged, respectively, on the inner and outer sides of the flexible connection along respective positive and negative regions of the X-axis, some of the piezoresistive elements are arranged, respectively, on the inner and outer sides of the flexible connection along respective positive and negative regions of the Y-axis, and some of the piezoresistive elements are arranged, respectively, on the inner and outer sides of the flexible connection along respective positive and negative regions of the auxiliar W-axis.

(13) The thirteenth feature of the invention resides in a sensor for detecting acceleration and angular velocity according to the eighth to eleventh features, wherein the flexible connection is composed of a plurality of plate-like bridge portions, each plate-like bridge portion including piezoresistive elements arranged, respectively, on an inner side that is closer to the weight body and on an outer side that is closer to the pedestal, and each plate-like bridge portion including driving piezoelectric elements arranged, respectively, on the inner and outer sides and detecting piezoelectric elements arranged, respectively, on the inner and outer sides.

(14) The fourteenth feature of the invention resides in a sensor for detecting acceleration and angular velocity according to the eighth to thirteenth features, wherein a lower electrode and an upper electrode are formed, respectively, on a lower surface and an upper surface of the driving piezoelectric element and the detecting piezoelectric element, a lower surface of the lower electrode is fixed to an upper surface of the flexible connection, and the angular velocity detecting circuit detects an applied angular velocity based on an alternating voltage generated between upper and lower electrodes of the detecting piezoelectric element while applying an alternating voltage between upper and lower electrodes of the driving piezoelectric element to generate a periodic motion of the weight body.

(15) The fifteenth feature of the invention resides in a sensor for detecting acceleration and angular velocity according to the fourteenth feature, wherein the lower electrodes of the piezoelectric elements are formed of a physically single common metal layer.

(16) The sixteenth feature of the invention resides in a sensor for detecting acceleration and angular velocity according to the fourteenth or fifteenth feature, wherein the piezoelectric elements are formed of a physically single common piezoelectric element.

(17) The seventeenth feature of the invention resides in a sensor for detecting acceleration and angular velocity according to the eighth to sixteenth features, wherein a piezoresistive element and a piezoelectric element are partially laminated with an insulating layer therebetween.

(18) The eighteenth feature of the invention resides in a sensor for detecting acceleration and angular velocity, comprising:

a weight body;

a pedestal arranged to a side of the weight body and fixed to a device chassis;

a flexible connection for connecting the weight body and the pedestal;

a piezoresistive element embedded in a surface layer of the flexible connection;

a driving piezoelectric element and a detecting piezoelectric element fixed directly or indirectly to a surface of the flexible connection;

an acceleration detecting circuit for detecting an applied acceleration based on a change in an electrical resistance of the piezoresistive element; and an angular velocity detecting circuit for detecting an applied angular velocity based on a signal generated in the detecting piezoelectric element while supplying an alternating signal to the driving piezoelectric element to periodically deform the flexible connection and to generate a periodic motion of the weight body.

(19) The nineteenth feature of the invention resides in a sensor for detecting acceleration and angular velocity according to the eighteenth feature, wherein the acceleration detecting circuit has a low-pass filter circuit for filtering out high-frequency components contained in a signal that indicates the change in the electrical resistance of the piezoresistive element, the acceleration detecting circuit outputting signal components passing through the low-pass filter circuit as a detection value of acceleration, and the angular velocity detecting circuit has a drive control circuit for supplying an alternating signal to the driving piezoelectric element to control the periodic motion of the weight body, a high-pass filter circuit for filtering out low-frequency components contained in an alternating signal generated in the detecting piezoelectric element, and a synchronous detection circuit for synchronously detecting an alternating signal passing through the high-pass filter circuit at a time point determined by a detection signal supplied from the drive control circuit, the angular velocity detecting circuit outputting a detection result by the synchronous detection circuit as a detected value of angular velocity.

(20) The twentieth feature of the invention resides in a sensor for detecting acceleration and angular velocity according to the eighteenth or nineteenth feature, wherein the weight body, the pedestal, and the flexible connection are composed of materials including silicon, and the piezoresistive element is constituted by a silicon layer containing impurities.

(21) The twenty-first feature of the invention resides in a sensor for detecting acceleration and angular velocity according to the eighteenth to twentieth features, wherein the flexible connection is composed of a plate-like bridge portion connecting an upper part of the weight body and an upper part of the pedestal, a lower part of the pedestal being fixed to the device chassis, and the piezoresistive element is embedded in an upper surface layer of the flexible connection, and the driving piezoelectric element and the detecting piezoelectric element are fixed directly or indirectly to an upper surface of the flexible connection.

(22) The twenty-second feature of the invention resides in a sensor for detecting acceleration and angular velocity according to the twenty-first feature, wherein W-axis is defined for connecting a predetermined point on an upper surface of the weight body and a predetermined point on an upper surface of the pedestal, and Wa and Wb-axes are defined on either side of the W-axis, the Wa and Wb-axes running parallel to the W-axis with a predetermined space dw from the W-axis, a portion of the flexible connection closer to the weight body is defined as a weight body neighborhood, while a portion of the flexible connection closer to the pedestal is defined as a pedestal neighborhood, the detecting piezoelectric elements are arranged, respectively, on the weight body neighborhood and the pedestal neighborhood of the flexible connection along the W-axis, some of the driving piezoelectric elements are arranged, respectively, on the weight body neighborhood and the pedestal neighborhood of the flexible connection along the Wa-axis, some of the driving piezoelectric elements are arranged, respectively, on the weight body neighborhood and the pedestal neighborhood of the flexible connection along the Wb-axis, and the piezoresistive elements are arranged, respectively, on the weight body neighborhood and the pedestal neighborhood of the flexible connection along the W-axis.

(23) The twenty-third feature of the invention resides in a sensor for detecting acceleration and angular velocity according to the twenty-first feature, wherein W-axis is defined for connecting a predetermined point on an upper surface of the weight body and a predetermined point on an upper surface of the pedestal, and Wa and Wb-axes are defined on either side of the W-axis, the Wa and Wb-axes running parallel to the W-axis with a predetermined space dw from the W-axis, a portion of the flexible connection closer to the weight body is defined as a weight body neighborhood, while a portion of the flexible connection closer to the pedestal is defined as a pedestal neighborhood, the driving piezoelectric elements are arranged, respectively, on the weight body neighborhood and the pedestal neighborhood of the flexible connection along the W-axis, some of the detecting piezoelectric elements are arranged, respectively, on the weight body neighborhood and the pedestal neighborhood of the flexible connection along the Wa-axis, some of the detecting piezoelectric elements are arranged, respectively, on the weight body neighborhood and the pedestal neighborhood of the flexible connection along the Wb-axis, and the piezoresistive elements are arranged, respectively, on the weight body neighborhood and the pedestal neighborhood of the flexible connection along the W-axis.

(24) The twenty-fourth feature of the invention resides in a sensor for detecting acceleration and angular velocity according to the eighteenth to twenty-third features, wherein a lower electrode and an upper electrode are formed, respectively, on a lower surface and an upper surface of the driving piezoelectric, element and the detecting piezoelectric element, a lower surface of the lower electrode is fixed to an upper surface of the flexible connection, and the angular velocity detecting circuit detects an applied angular velocity based on an alternating voltage generated between upper and lower electrodes of the detecting piezoelectric element while applying an alternating voltage between upper and lower electrodes of the driving piezoelectric element to generate a periodic motion of the weight body.

(25) The twenty-fifth feature of the invention resides in a sensor for detecting acceleration and angular velocity according to the twenty-fourth feature, wherein the lower electrodes on the piezoelectric elements are formed of a physically single common metal layer.

(26) The twenty-sixth feature of the invention resides in a sensor for detecting acceleration and angular velocity according to the twenty-fourth or twenty-fifth feature, wherein the piezoelectric elements are formed of a physically single common piezoelectric element.

(27) The twenty-seventh feature of the invention resides in a sensor for detecting acceleration and angular velocity according to the eighteenth to twenty-sixth features, wherein a piezoresistive element and a piezoelectric element are partially laminated with an insulating layer therebetween.

In a sensor according to the present invention, there is provided a weight body, a pedestal, and a flexible connection for connecting the weight body and the pedestal. An applied acceleration or angular velocity is detected by detecting a displacement of the weight body with respect to the pedestal. In addition, the acceleration is detected based on the change in the electrical resistance of a piezoresistive element formed in the flexible connection, while the angular velocity is detected through a piezoelectric element formed in the flexible connection. Since the piezoresistive element and the piezoelectric element are both formed in a flexible connection, it is possible to install wirings easily, whereby the entire structure of the sensor can be simplified. Also in the detection using the piezoresistive element and the piezoelectric element, there is no need to keep the atmosphere around the oscillator evacuated as in the detection using a capacitor. Further, since the piezoresistive element can detect even a static acceleration (e.g. acceleration due to gravity) as an electrical resistance, the static acceleration can be detected based on the electrical resistance. The sensor according to the present invention can thus detect static and dynamic angular velocity as well as static and dynamic acceleration with a simple structure.

DESCRIPTION OF THE PREFERRED EMBODIMENTS

The present invention will hereinafter be described with reference to illustrative embodiments.

Section 1

Basic Structure of the Sensor According to the First Embodiment

Figure 1:
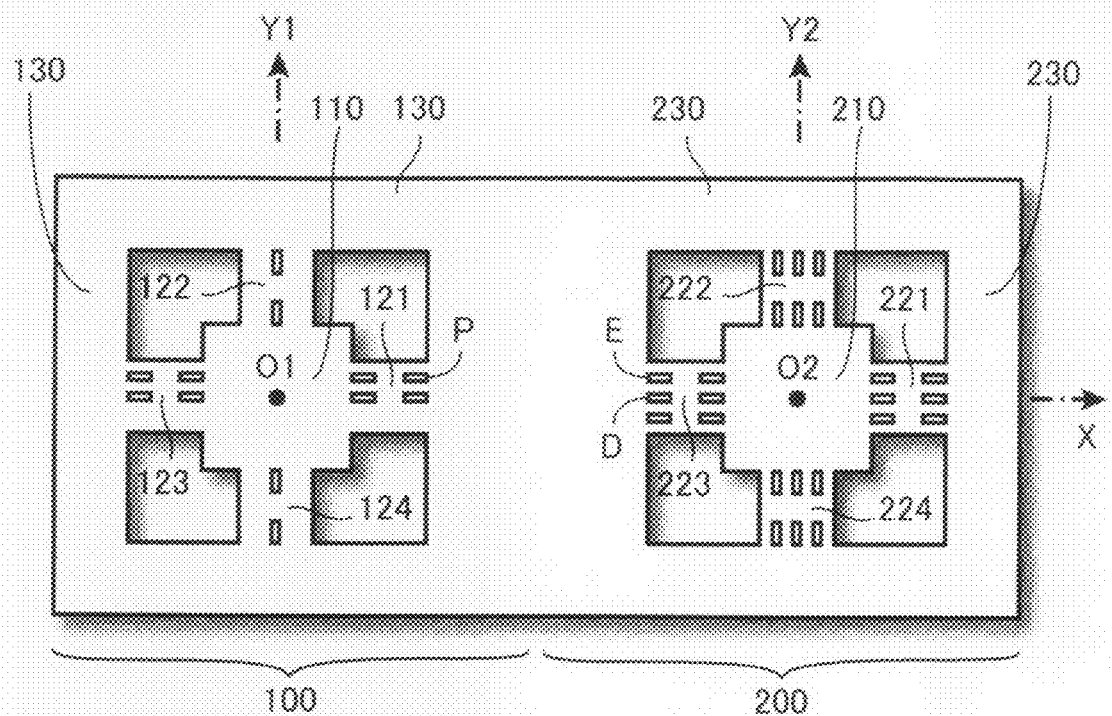
FIG. 1 is a top view of an acceleration and angular velocity sensor according to a first embodiment of the present invention.

FIG. 1 is a top view of an exemplary sensor according to a first embodiment of the present invention. As shown in FIG. 1, the left half of the sensor constitutes an acceleration detecting section 100, while the right half constitutes an angular velocity detecting section 200. The major structures of the acceleration detecting section 100 are a square-columnar weight body 110 for acceleration detection, four plate-like bridge portions 121 to 124, and a pedestal 130 for acceleration detection. The pedestal 130 has a square contour arranged in such a manner as to surround the weight body 110, and the four plate-like bridge portions 121 to 124 serve as flexible connections for connecting the weight body 110 and the pedestal 130. Meanwhile, the major structures of the angular velocity detecting section 200 are a square-columnar weight body 210 for angular velocity detection, four plate-like bridge portions 221 to 224, and a pedestal 230 for angular velocity detection. The pedestal 230 has a square contour arranged in such a manner as to surround the weight body 210, and the four plate-like bridge portions 221 to 224 serve as flexible connections for connecting the weight body 210 and the pedestal 230.

Figure 2:
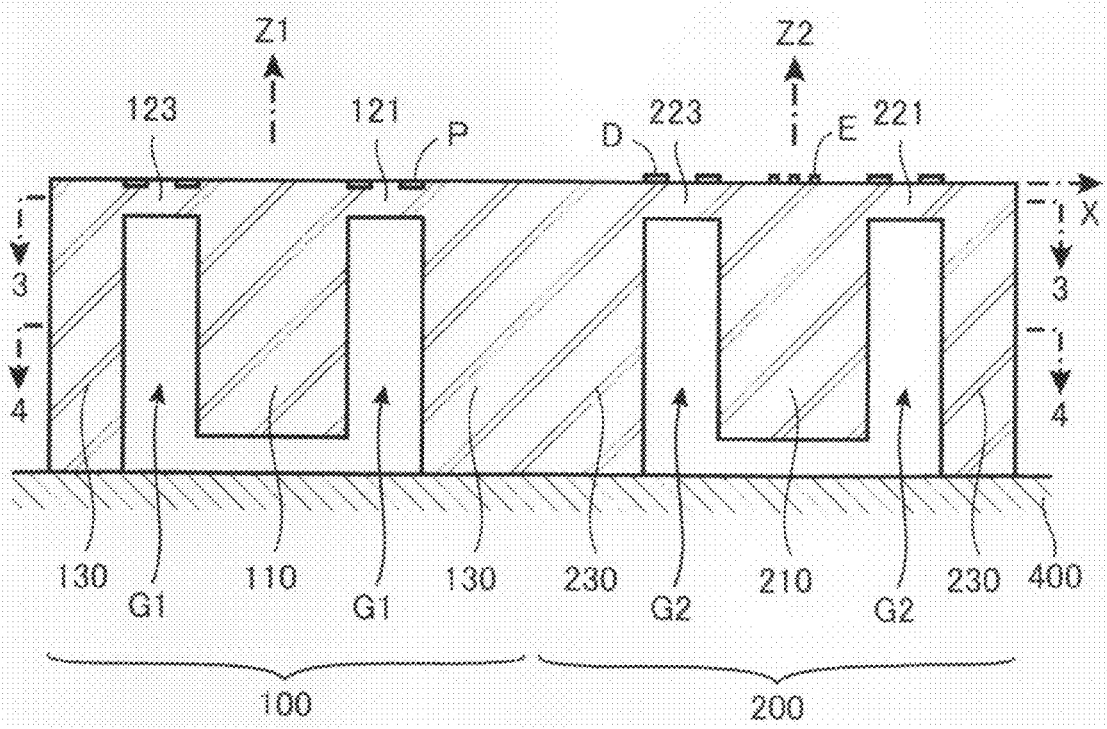
FIG. 2 is a vertical cross-sectional view of the sensor taken along the X-axis of FIG. 1.

FIG. 2 is a vertical cross-sectional view of the sensor shown in FIG. 1. For the sake of descriptive convenience, here an origin O1 will be defined at the center on the upper surface of the weight body 110 for acceleration detection, an origin O2 at the center on the upper surface of the weight body 210 for angular velocity detection, and XYZ three-dimensional coordinate systems for the respective origins O1 and O2, as shown in FIG. 1. Although the X-axis is directed rightward in the drawings in either coordinate system, the Y and Z axes vary for each coordinate system. Therefore, the Y and Z axes will be referred to, respectively, as Y1 and Y2 axes and Z1 and Z2 axes. FIG. 2 is a vertical cross-sectional view of the sensor taken along the X-axis of FIG. 1.

Figure 3:
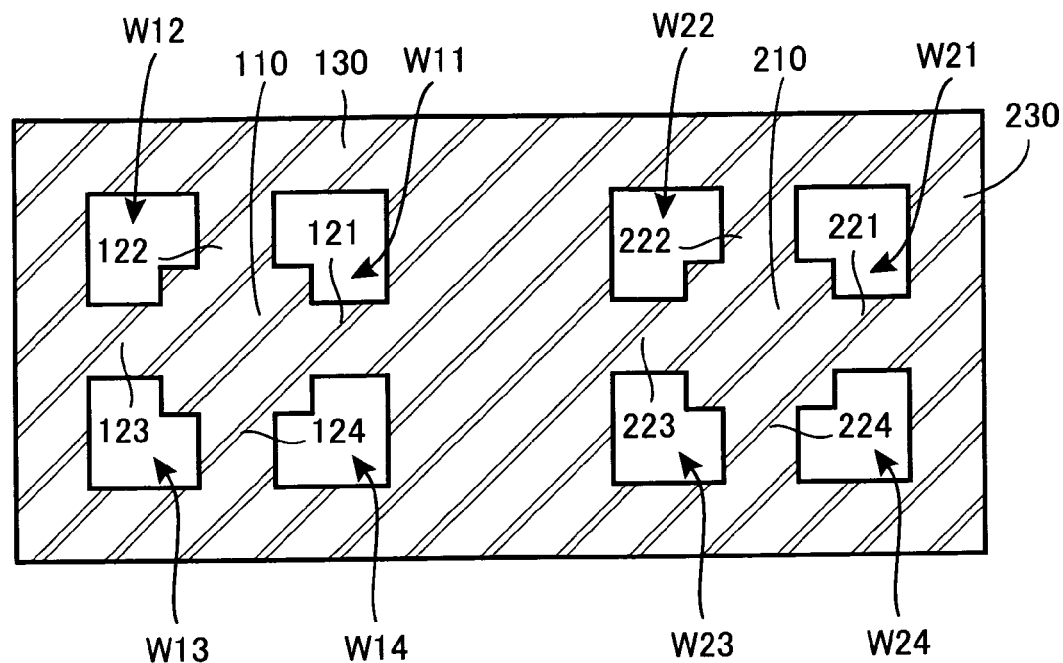
FIG. 3 is a horizontal cross-sectional view of the sensor taken along the line 3-3 of FIG. 2.
Figure 4:
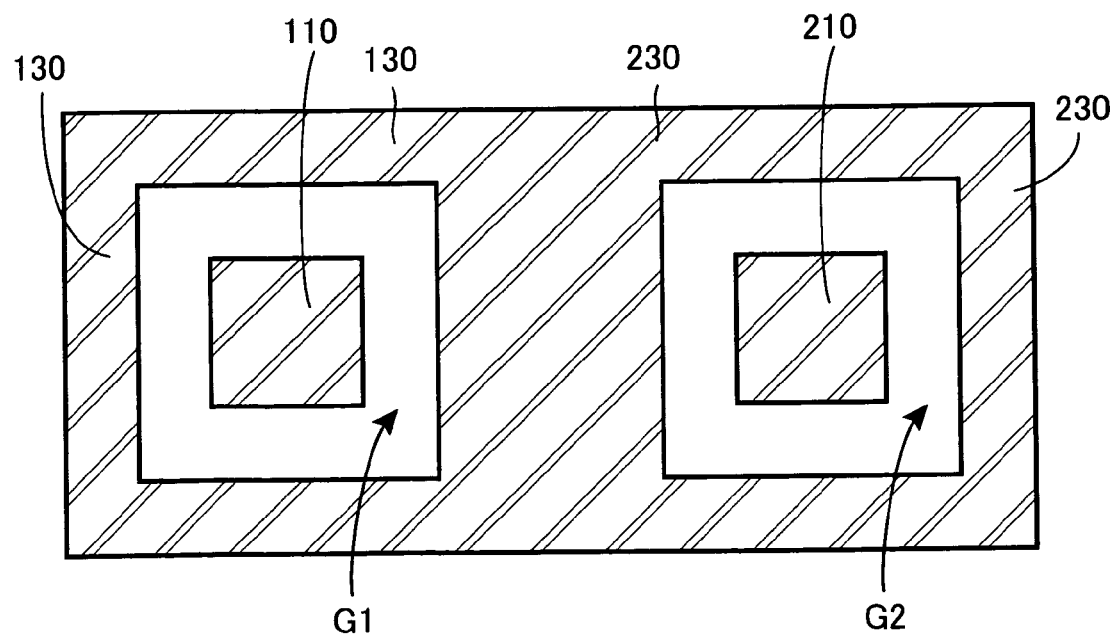
FIG. 4 is a horizontal cross-sectional view of the sensor taken along the line 4-4 of FIG. 2.

FIG. 3 is a horizontal cross-sectional view of the sensor taken along the line 3-3 of FIG. 2, and FIG. 4 is a horizontal cross-sectional view of the sensor taken along the line 4-4 of FIG. 2. As shown in FIG. 4, the weight bodies 110 and 210 have a square-columnar shape with a square cross-section, and rectangular annular grooves G1 and G2 are formed around the respective weight bodies 110 and 210. The pedestals 130 and 230 are wall-shaped structures surrounding the respective weight bodies 110 and 210 across the rectangular annular grooves G1 and G2. It is noted that the pedestals 130 and 230 actually form a monolithic structure composed of a part of a member. For the sake of descriptive convenience, the portions surrounding the weight body 110 for acceleration detection and the weight body 210 for angular velocity detection will here be referred to, separately, as pedestal 130 for acceleration detection and pedestal 230 for angular velocity detection, but as shown in the drawings, the right end of the pedestal 130 and the left end of the pedestal 230 are merged and blur into each other.

The major structures of the sensor (weight bodies 110 and 210, plate-like bridge portions 121 to 124 and 221 to 224, pedestals 130 and 230) can actually be constructed by processing a single substrate (silicon substrate in the embodiment described herein). That is, a predetermined depth for the rectangular annular grooves G1 and G2 from the lower surface of a single substrate is dug to form the weight bodies 110 and 210, and then the bottom portions of the weight bodies 110 and 210 are removed by a slight amount to be suspended, as shown in the vertical cross-sectional view of FIG. 2. Subsequently, opening portions W11 to W14 and W21 to W24 like windows are formed in the upper part of the substrate to achieve the major structures, as shown in the horizontal cross-sectional view of FIG. 3.

Although the bottom surfaces of the pedestals 130 and 230 are fixed to the device chassis 400 as shown in FIG. 2, the bottom portions of the weight bodies 110 and 210 are not in contact with the device chassis 400, so that the weight bodies 110 and 210 are suspended with a predetermined space from the device chassis 400. It is noted that only a part of the device chassis 400 (in the bottom portion where the pedestals 130 and 230 are fixed) is shown here for the sake of illustrative convenience, but the device chassis 400 actually surrounds the entirety of the major structures of the sensor, and wall surfaces of the device chassis 400 are arranged in the left, right, and upper margins of FIG. 2.

The plate-like bridge portions 121 to 124, which are composed of thinned portions, serve as flexible connections. Also, the weight body 110 is supported by the plate-like bridge portions 121 to 124 at four sides. Therefore, when a force based on acceleration is applied to the weight body 110, the plate-like bridge portions 121 to 124 are to be deflected so that the weight body 110 is displaced with respect to the pedestal 130. Similarly, the plate-like bridge portions 221 to 224, which correspond to thinned portions, serve as flexible connections. Then, the weight body 210 is supported by the plate-like bridge portions 221 to 224 at four sides. Therefore, the weight body 210 can be oscillated by deflecting the plate-like bridge portions 221 to 224, and when a Coriolis force based on angular velocity is applied to the weight body 210 in this oscillated state, the plate-like bridge portions 221 to 224 are to be deflected based on the Coriolis force so that the weight body 210 is displaced with respect to the pedestal 230 based on the Coriolis force.

The major structures of the acceleration detecting section 100 and the major structures of the angular velocity detecting section 200 have heretofore been described with reference to FIG. 1 to FIG. 4. In fact, the basic configurations of these major structures are completely the same. A major difference between the acceleration detecting section 100 and the angular velocity detecting section 200 exists in each element formed in the flexible connections (plate-like bridge portions 121 to 124 and 221 to 224) in the major structures. That is, as shown in the top view of FIG. 1, multiple piezoresistive elements P are formed in the plate-like bridge portions 121 to 124 in the acceleration detecting section 100, while multiple piezoelectric elements D and E are formed in the plate-like bridge portions 221 to 224 in the angular velocity detecting section 200. The piezoresistive elements P are for detecting acceleration, while the piezoelectric elements D and E are for detecting angular velocity.

As shown in FIG. 2, the piezoresistive elements P are embedded in the surface layer of the plate-like bridge portions 121 to 124 (flexible connections for acceleration detection), and an acceleration detecting circuit to be described hereinafter detects an applied acceleration based on the change in the electrical resistances of the piezoresistive elements P. Meanwhile, the piezoelectric elements D and E are firmly fixed to the upper surface of the plate-like bridge portions 221 to 224 (flexible connections for angular velocity detection). As shown in FIG. 1, the plate-like bridge portions 221 to 224 each have six piezoelectric elements arranged therein and therefore, the angular velocity detecting section 200 has 24 piezoelectric elements in total arranged therein. The 24 piezoelectric elements, which have completely the same structure physically, will be treated separately as detecting piezoelectric elements D and driving piezoelectric elements E in consideration of their applications.

As will be described hereinafter in detail, in the case of the sensor shown in FIG. 1, the detecting piezoelectric elements D are constituted by eight piezoelectric elements arranged on the X and Y2 axes, and the driving piezoelectric elements E are constituted by 16 piezoelectric elements arranged on either side of the respective detecting piezoelectric elements D. An angular velocity detecting circuit to be described hereinafter detects an applied angular velocity based on a signal generated in the detecting piezoelectric elements D while supplying an alternating signal to the driving piezoelectric elements E to periodically deform the plate-like bridge portions 221 to 224 (flexible connections for angular velocity detection) and to generate a periodic motion of the weight body 210 for angular velocity detection.

It is noted that the detecting piezoelectric elements D and the driving piezoelectric elements E are only required to be firmly fixed at predetermined positions on the surfaces of the plate-like bridge portions 221 to 224 so that the deflection of the upper surfaces of the plate-like bridge portions 221 to 224 is transferred to each piezoelectric element, and at the same time the deflection of each piezoelectric element is transferred to the upper surfaces of the plate-like bridge portions 221 to 224. Therefore, each piezoelectric element may be firmly fixed directly to the surfaces of the plate-like bridge portions 221 to 224 (flexible connections for angular velocity detection) or may be firmly fixed indirectly via another member of some kind. In the embodiment described herein, upper and lower electrodes are formed, respectively, on the upper and lower surfaces of each piezoelectric element, and each piezoelectric element is firmly fixed indirectly to the surfaces of the plate-like bridge portions 221 to 224 via each lower electrode. However, the upper and lower electrodes are not shown in FIG. 2 to prevent complexity.

Section 2

Deflection of Parts in the Sensor According to the First Embodiment

Next will be considered the deflection of each part in the plate-like bridge portions 121 to 124 when a force in a direction along each coordinate axis is applied to the weight body 110 of the acceleration detecting section 100 in the sensor shown in FIG. 1, and further the deflection of each part in the plate-like bridge portions 221 to 224 when a force in a direction along each coordinate axis is applied to the weight body 210 of the angular velocity detecting section 200.

Figure 5:
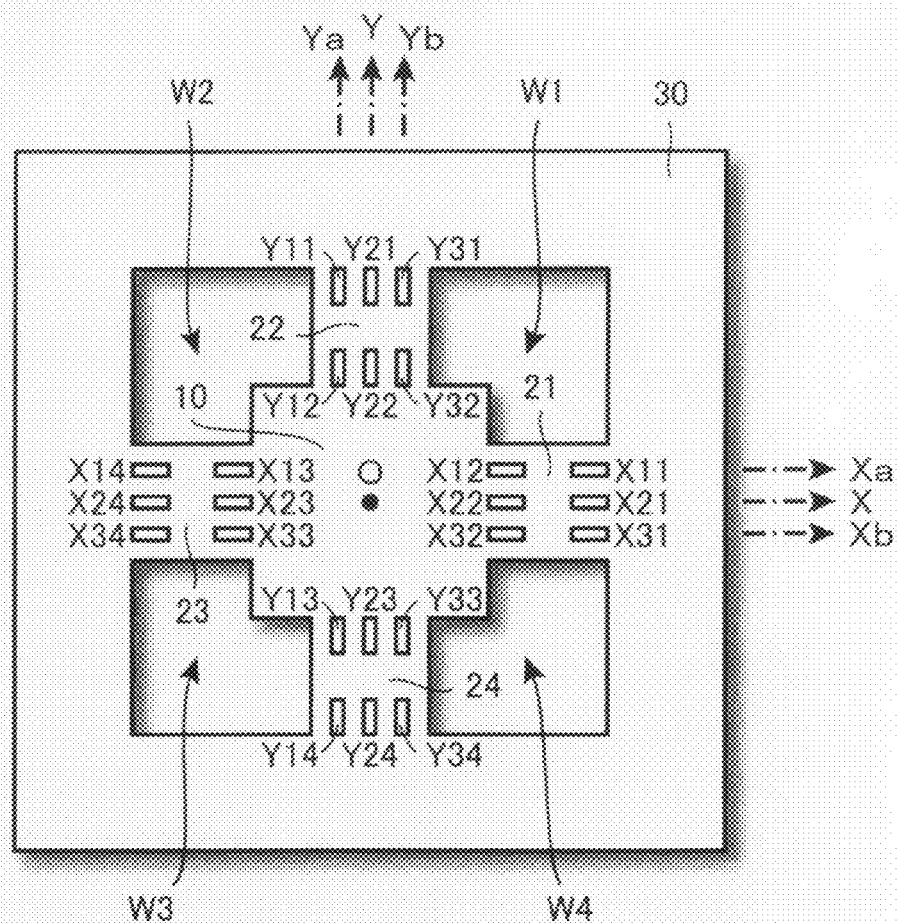
FIG. 5 is a top view of a fundamental model showing the physical structure of the major structures of the acceleration detecting section 100 and the angular velocity detecting section 200 in the sensor shown in FIG. 1.
Figure 6:
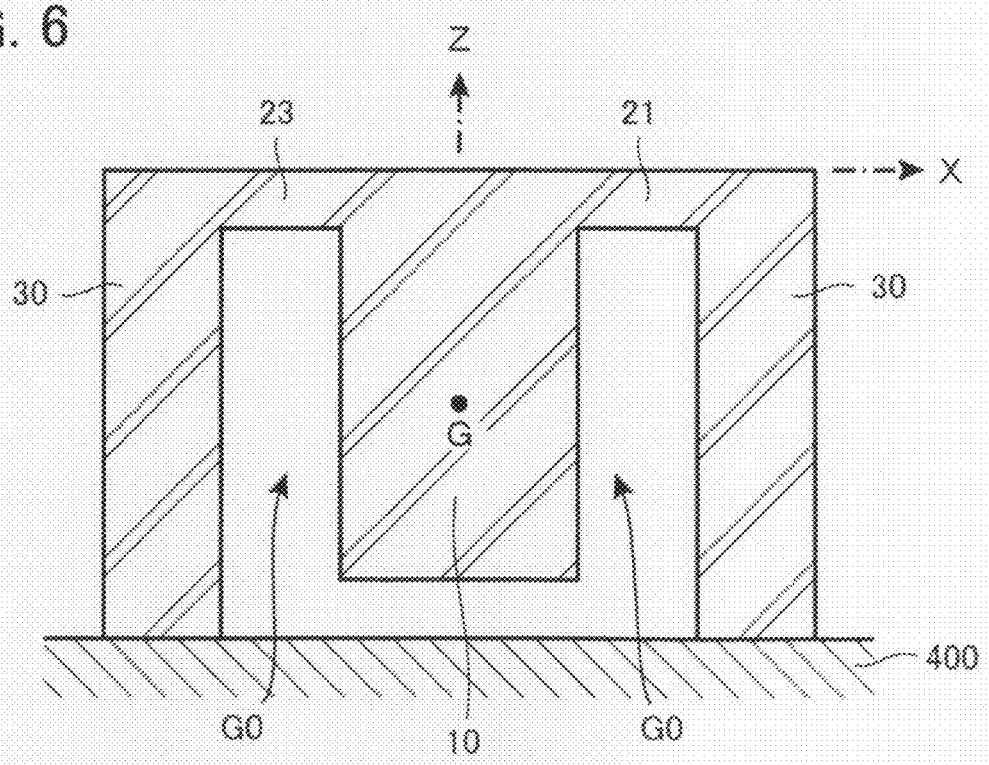
FIG. 6 is a vertical cross-sectional view of the fundamental model taken along the X-axis of FIG. 5.

Since the major structures of the acceleration detecting section 100 and the major structures of the angular velocity detecting section 200 have a common basic configuration as mentioned above, here will be proposed such a fundamental model as shown in FIG. 5 and FIG. 6 for the sake of descriptive convenience. This fundamental model corresponds to the physical structure of the major structures of the acceleration detecting section 100 and the angular velocity detecting section 200 in the sensor shown in FIG. 1, where FIG. 5 is a top view and FIG. 6 is a vertical cross-sectional view. As shown in the drawings, the fundamental model includes a square-columnar weight body 10 arranged at the center, a pedestal 30 arranged in such a manner as to surround the weight body 10, and four plate-like bridge portions 21, 22, 23, and 24 (flexible connections) for connecting the weight body 10 and the pedestal 30. The weight body 10 is surrounded by a rectangular annular groove G0, and opening portions W1, W2, W3, and W4 are formed in the upper surface of the weight body 10. Also, the bottom surface of the pedestal 30 is fixed to the device chassis 400, and the weight body 10 is suspended through the four plate-like bridge portions 21, 22, 23, and 24.

The sensor shown in FIG. 1 and FIG. 2 is equivalent to one including two fundamental models shown in FIG. 5 and FIG. 6 arranged side by side. Also in this fundamental model, an origin O is defined at the center on the upper surface of the weight body 10, and an XYZ three-dimensional coordinate system is defined with the X-axis rightward and the Y-axis upward shown in the top view of FIG. 5. In the vertical cross-sectional view of FIG. 6, the X-axis is directed rightward and the Z-axis is directed upward. The Y-axis shown in FIG. 5 corresponds to the Y1 and Y2 axes shown in FIG. 1, and the Z-axis shown in FIG. 6 corresponds to the Z1 and Z2 axes shown in FIG. 2. Also, as shown in FIG. 5, Xa and Xb axes are defined on either side of the X-axis in the XY plane, the Xa and Xb axes running parallel to the X-axis with a predetermined space dx from the X-axis, and Ya and Yb axes are defined on either side of the Y-axis in the XY plane, the Ya and Yb axes running parallel to the Y-axis with a predetermined space dy from the Y-axis, for the sake of descriptive convenience.

Then, as shown in FIG. 5, areas X11 to X34 and Y11 to Y34 (having a rectangular shape in the drawing) are defined on the upper surface of the four plate-like bridge portions 21, 22, 23, and 24. Here, the areas X11 to X14 are defined on the Xa-axis and have a shape elongated in the direction of the Xa-axis; the areas X21 to X24 are defined on the X-axis and have a shape elongated in the direction of the X-axis; and the areas X31 to X34 are defined on the Xb-axis and have a shape elongated in the direction of the Xb-axis. Similarly, the areas Y11 to Y14 are defined on the Ya-axis and have a shape elongated in the direction of the Ya-axis; the areas Y21 to Y24 are defined on the Y-axis and have a shape elongated in the direction of the Y-axis; and the areas Y31 to Y34 are defined on the Yb-axis and have a shape elongated in the direction of the Yb-axis. All of the areas have the same shape and size and are arranged symmetrically with respect to the X and Y axes.

In addition, the areas are arranged at the ends of the plate-like bridge portions 21, 22, 23, and 24. That is, when the portions of the plate-like bridge portions 21, 22, 23, and 24 closer to the weight body 10 are defined as inner sides, while the portions closer to the pedestal 30 are defined as outer sides, the areas X11, X21, X31, X14, X24, X34, Y11, Y21, Y31, Y14, Y24, and Y34 are arranged on the outer sides, while the areas X12, X22, X32, X13, X23, X33, Y12, Y22, Y32, Y13, Y23, and Y33 are arranged on the inner sides. In the embodiment described herein, the piezoresistive elements P and the piezoelectric elements D and E are arranged in some of the areas shown in FIG. 5.

Next will be considered the deformation of the major structures when a force in a direction along each coordinate axis is applied to the center of gravity G of the weight body 10 in this fundamental model. First, a deformation state where a force +Fx in the positive direction along the X-axis is applied is shown in the vertical cross-sectional view of FIG. 7, and a deformation state where a force −Fx in the negative direction along the X-axis is applied is shown in the vertical cross-sectional view of FIG. 8. It is here noted that since the weight body 10 and the pedestal 30 are sufficiently rigid, while the thinned plate-like bridge portions 21, 22, 23, and 24 (flexible connections) are flexible, the drawings are based on the assumption that only the plate-like bridge portions 21, 22, 23, and 24 are deformed intensively. The weight body 10 and the pedestal 30 are to be deformed slightly in a strict sense, but if the thickness of the plate-like bridge portions is sufficiently small, there is no problem from a practical standpoint, to consider that the plate-like bridge portions are deformed intensively. For example, if the major structures are formed of a silicon substrate as will be described hereinafter, it may be considered that the plate-like bridge portions are deformed approximately intensively when the thickness of the entire substrate (height of the pedestal 30) is about 0.3 mm and the thickness of the plate-like bridge portions 21, 22, 23, and 24 is about 10 μm.

Figure 7:
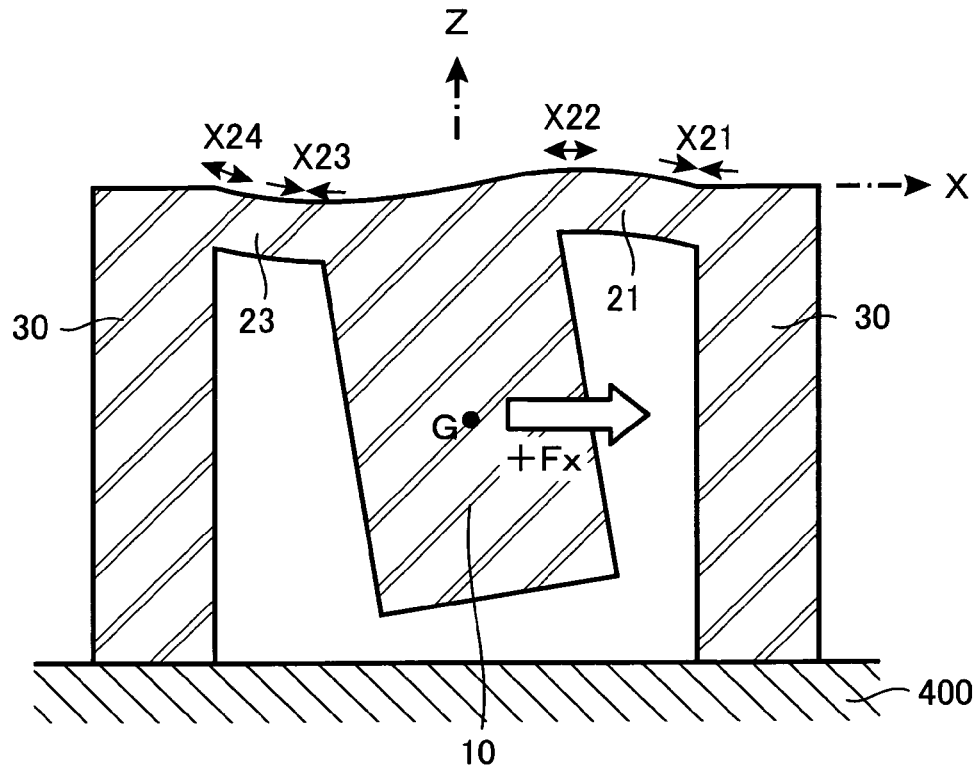
FIG. 7 is a vertical cross-sectional view showing a deformation state where a force +Fx in the positive direction along the X-axis is applied to the weight body 10 in the fundamental model shown in FIG. 6.
Figure 8:
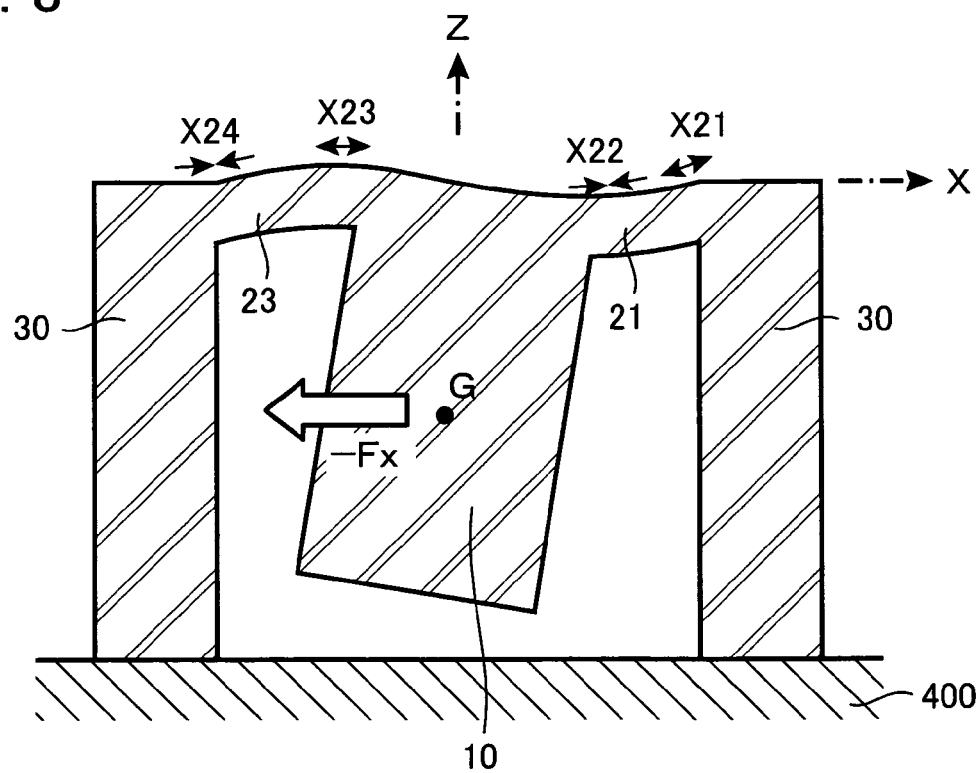
FIG. 8 is a vertical cross-sectional view showing a deformation state where a force −Fx in the negative direction along the X-axis is applied to the weight body 10 in the fundamental model shown in FIG. 6.

Here, attention will be focused on the deflection of each part in the upper surface of the plate-like bridge portions 21, 22, 23, and 24. In particular, attention will be focused on stretching of the areas X11 to X34 and Y11 to Y34 shown in FIG. 5 in the longitudinal direction. In FIG. 7 and FIG. 8, the arrows drawn above the plate-like bridge portions 21 and 23 indicate such a stretching state. A pair of arrows directed outward indicate that the corresponding area is stretched relative to a normal state (where no force is applied), and a pair of arrows directed inward indicate that the corresponding area is shrunk relative to a normal state.

For example, as shown in FIG. 7, when a force +Fx in the positive direction along the X-axis is applied to the center of gravity G, the areas X21 and X23 on the X-axis are shrunk, while the areas X22 and X24 are stretched. On the contrary, when a force −Fx in the negative direction along the X-axis is applied, the areas X21 and X23 on the X-axis are stretched, while the areas X22 and X24 are shrunk, as shown in FIG. 8. Each area on the Xa and Xb axes that are defined on either side of the X-axis is also deformed similarly. In this case, the areas Y11 to Y34 on the plate-like bridge portions 22 and 24 are deformed in a twisted manner in the width direction, but no prominent deformation occurs in the longitudinal direction.

Next will be considered the case where a force +Fy in the positive direction along the Y-axis and a force −Fy in the negative direction along the Y-axis are applied to the center of gravity G. Although the X and Y axes are orthogonal to each other as shown in FIG. 5, the geometry of the fundamental model cannot be changed even if the major structures may be rotated by 90° around the origin O. Therefore, the foregoing deformation aspect when forces in the direction of the X-axis are applied can be applied directly to the deformation aspect when forces in the direction of the Y-axis are applied. That is, the stretching state of the areas Y11 to Y34 when forces in the direction of the Y-axis are applied is the same as the foregoing stretching state of the areas X11 to X34 when the forces in the direction of the X-axis are applied. Also, when the forces in the direction of the Y-axis are applied, the areas X11 to X34 on the plate-like bridge portions 21 and 23 are deformed in a twisted manner in the width direction, but no prominent deformation occurs in the longitudinal direction.

Figure 9:
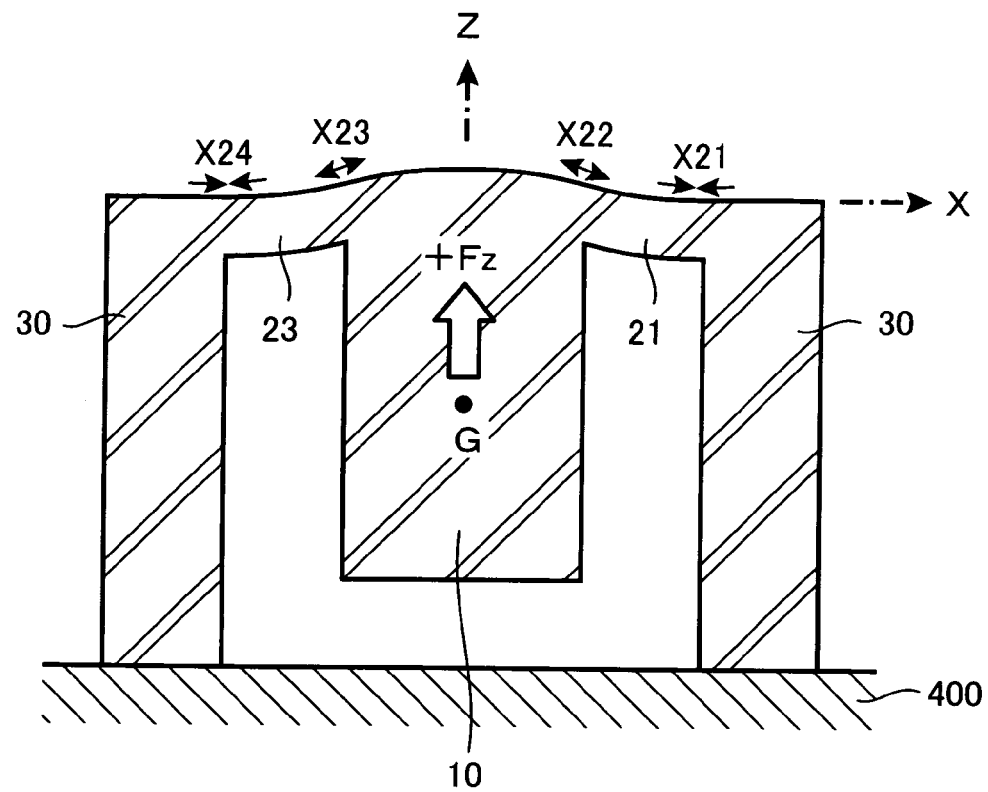
FIG. 9 is a vertical cross-sectional view showing a deformation state where a force +Fz in the positive direction along the Z-axis is applied to the weight body 10 in the fundamental model shown in FIG. 6.

Next will be considered the case where forces in the direction of the Z-axis are applied to the center of gravity G. FIG. 9 is a vertical cross-sectional view showing a deformation state where a force +Fz in the positive direction along the Z-axis is applied. The weight body 10 moves upward and thereby the areas X21 and X24 on the X-axis are shrunk, while the areas X22 and X23 are stretched. Such a stretching state is applied similar to the areas on the Xa and Xb axes arranged on either side of the X-axis, and further to the areas on the Y-axis and Ya, Yb axes arranged on either side of the Y-axis. Consequently, as for the 24 areas in total on the plate-like bridge portions 21, 22, 23, and 24 shown in the top view of FIG. 5, the outer side areas X11, X21, X31, X14, X24, X34, Y11, Y21, Y31, Y14, Y24, and Y34 are shrunk, while the inner side areas X12, X22, X32, X13, X23, X33, Y12, Y22, Y32, Y13, Y23, and Y33 are stretched.

Figure 10:
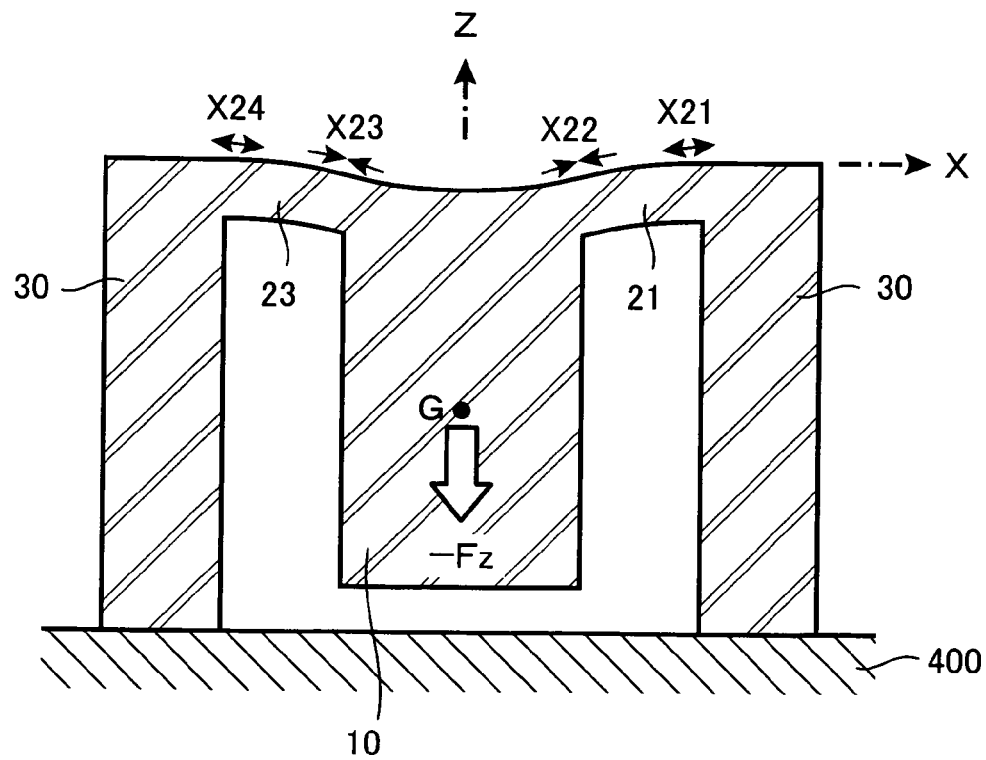
FIG. 10 is a vertical cross-sectional view showing a deformation state where a force −Fz in the negative direction along the Z-axis is applied to the weight body 10 in the fundamental model shown in FIG. 6.

Meanwhile, FIG. 10 is a vertical cross-sectional view showing a deformation state where a force −Fz in the negative direction along the Z-axis is applied. The weight body 10 moves downward and thereby the areas X21 and X24 on the X-axis are stretched, while the areas X22 and X23 are shrunk. Consequently, as for the 24 areas in total on the plate-like bridge portions 21, 22, 23, and 24 shown in the top view of FIG. 5, the outer side areas X11, X21, X31, X14, X24, X34, Y11, Y21, Y31, Y14, Y24, and Y34 are stretched, while the inner side areas X12, X22, X32, X13, X23, X33, Y12, Y22, Y32, Y13, Y23, and Y33 are shrunk.

Figure 11:
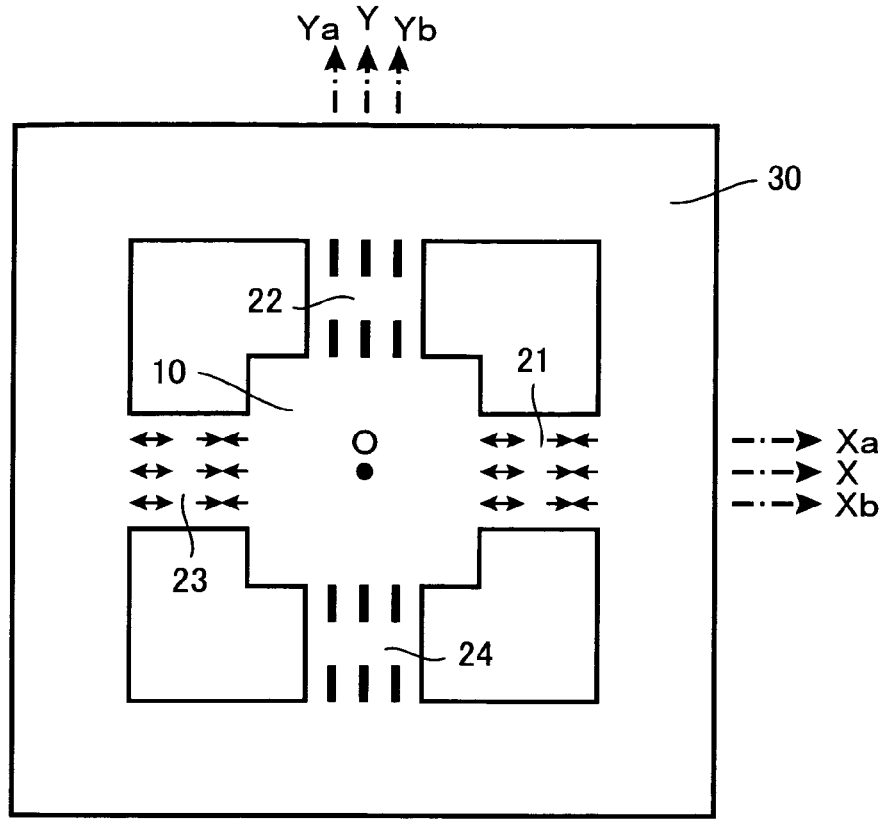
FIG. 11 is a top view showing a stretching state in the upper surface of each plate-like bridge portion where a force +Fx in the positive direction along the X-axis is applied to the weight body 10 in the fundamental model shown in FIG. 5.
Figure 12:
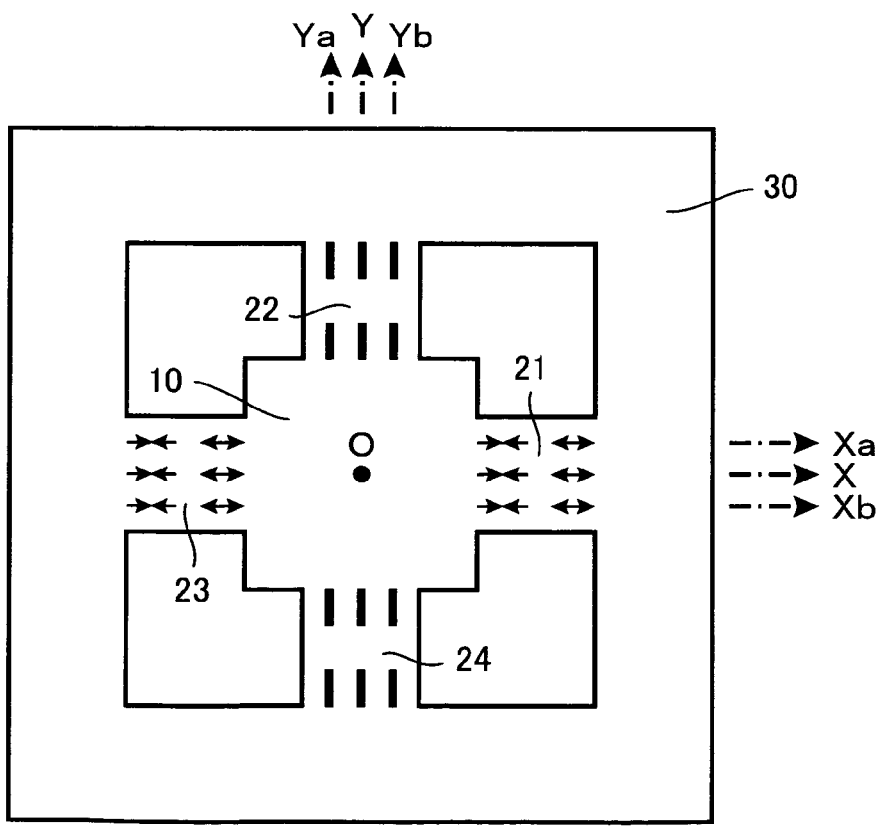
FIG. 12 is a top view showing a stretching state in the upper surface of each plate-like bridge portion where a force −Fx in the negative direction along the X-axis is applied to the weight body 10 in the fundamental model shown in FIG. 5.
Figure 13:
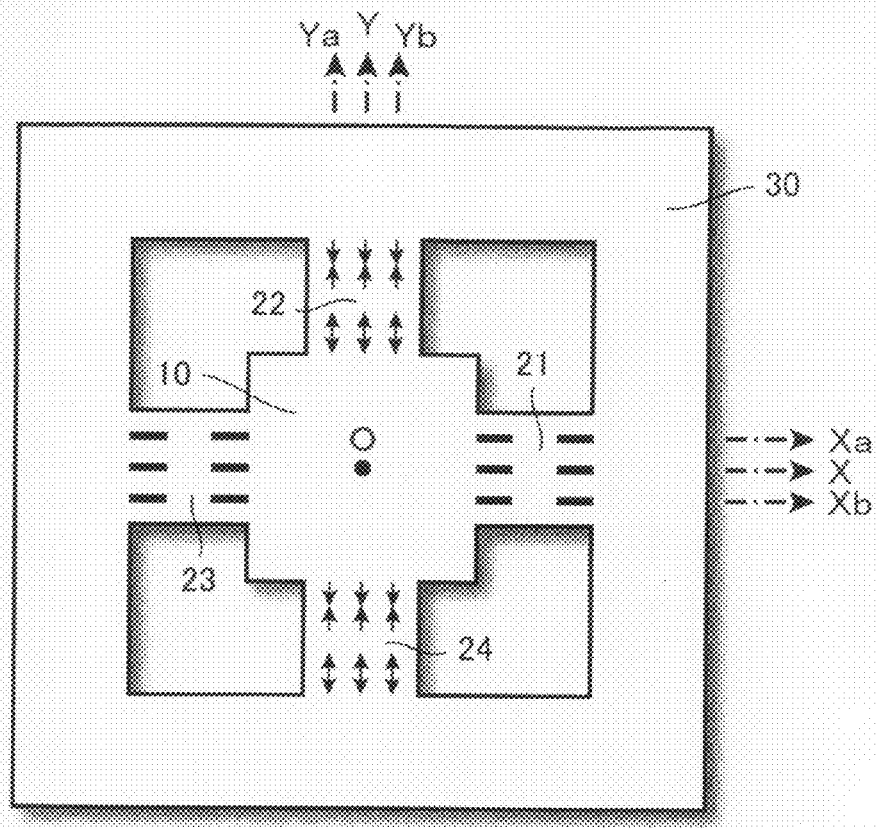
FIG. 13 is a top view showing a stretching state in the upper surface of each plate-like bridge portion where a force +Fy in the positive direction along the Y-axis is applied to the weight body 10 in the fundamental model shown in FIG. 5.
Figure 14:
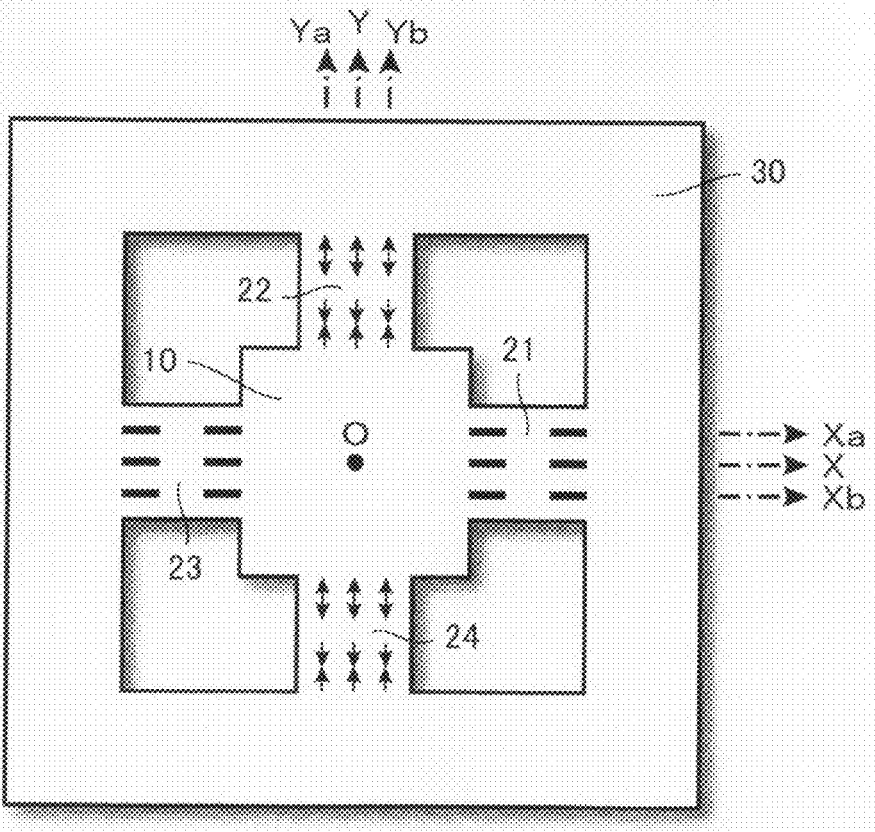
FIG. 14 is a top view showing a stretching state in the upper surface of each plate-like bridge portion where a force −Fy in the negative direction along the Y-axis is applied to the weight body 10 in the fundamental model shown in FIG. 5.
Figure 15:
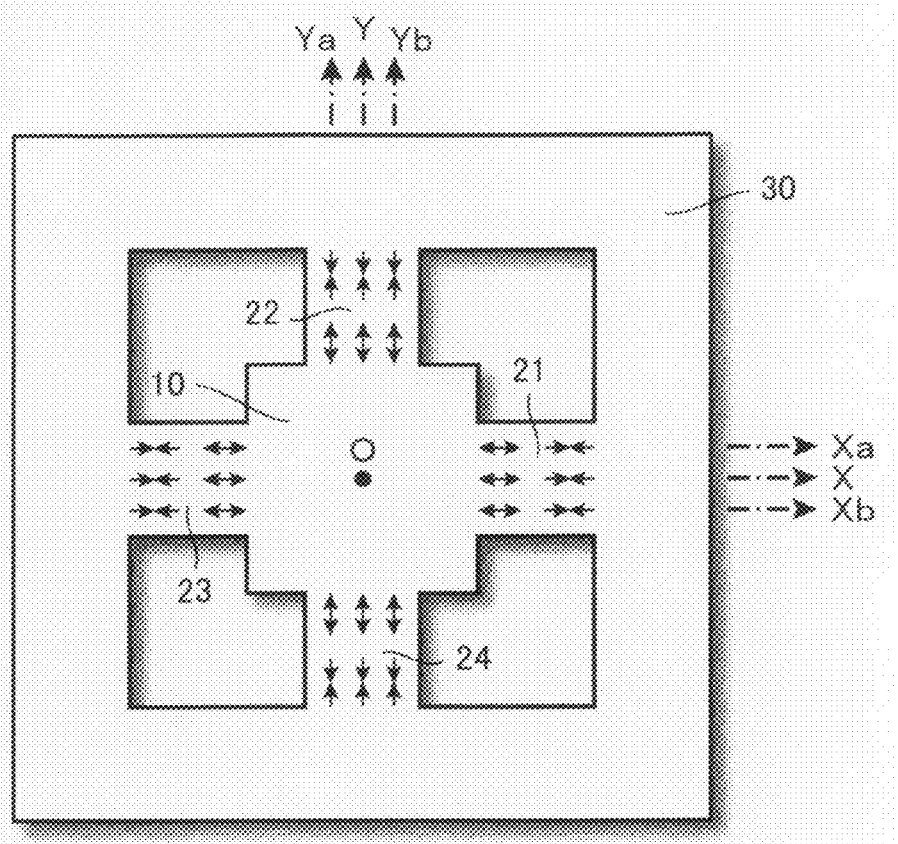
FIG. 15 is a top view showing a stretching state in the upper surface of each plate-like bridge portion where a force +Fz in the positive direction along the Z-axis is applied to the weight body 10 in the fundamental model shown in FIG. 5.
Figure 16:
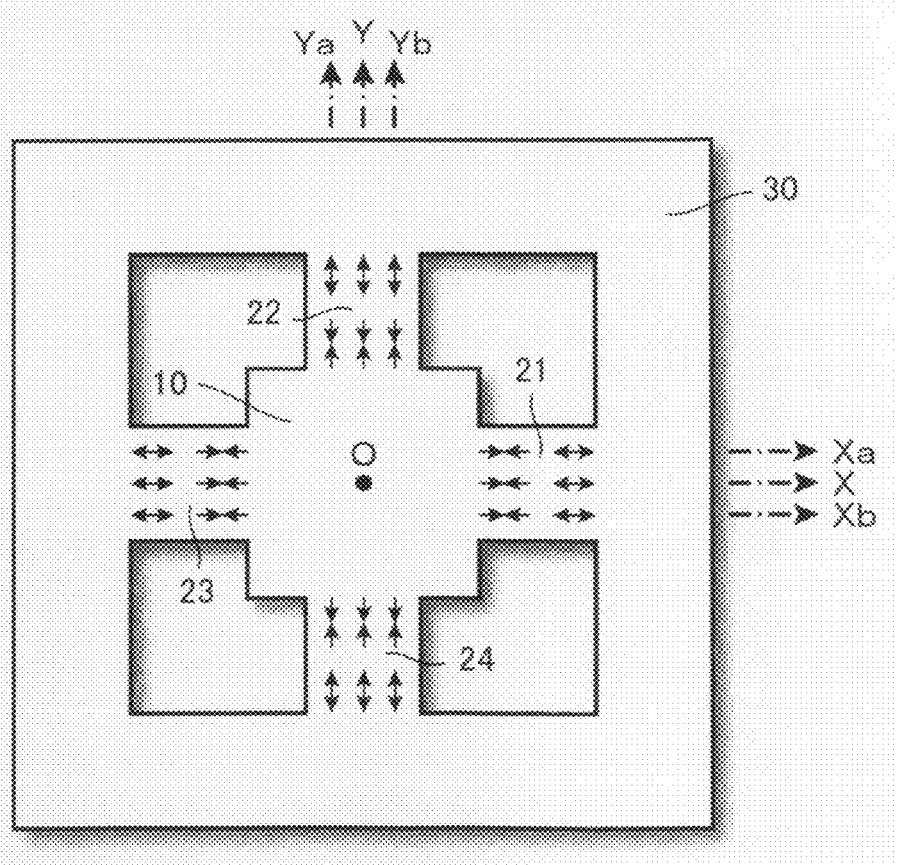
FIG. 16 is a top view showing a stretching state in the upper surface of each plate-like bridge portion where a force −Fz in the negative direction along the Z-axis is applied to the weight body 10 in the fundamental model shown in FIG. 5.

In accordance with the result of the above-described considerations, the longitudinal stretching states of the areas defined on the upper surfaces of the plate-like bridge portions when forces in directions along each coordinate axis are applied to the weight body 10 of the fundamental model shown in FIG. 5 are collectively shown in the top views of FIG. 11 to FIG. 16. That is, FIG. 11 is a top view showing a state where a force +Fx in the positive direction along the X-axis is applied; FIG. 12 is a top view showing a state where a force −Fx in the negative direction along the X-axis is applied; FIG. 13 is a top view showing a state where a force +Fy in the positive direction along the Y-axis is applied; FIG. 14 is a top view showing a state where a force −Fy in the negative direction along the Y-axis is applied; FIG. 15 is a top view showing a state where a force +Fz in the positive direction along the Z-axis is applied; and FIG. 16 is a top view showing a state where a force −Fz in the negative direction along the Z-axis is applied.

In each drawing, a pair of arrows directed outward indicate that the corresponding area is stretched relative to a normal state (where no force is applied), and a pair of arrows directed inward indicate that the corresponding area is shrunk relative to a normal state. It is noted that the stretching considered herein occurs only in the longitudinal direction of each area, and no stretching in the width direction is considered. Bars with no arrow indicate that the corresponding areas are neither stretched nor shrunk significantly in the longitudinal direction. Also, the stretching results described herein occur on the upper surfaces of the plate-like bridge portions 21, 22, 23, and 24, and not inside or on the lower surfaces thereof.

Section 3

Principle of Acceleration Detection by the Sensor According to the First Embodiment Here will be described the principle of acceleration detection by the acceleration detecting section 100 in the sensor according to the first embodiment shown in FIG. 1 and FIG. 2.

Figure 17:
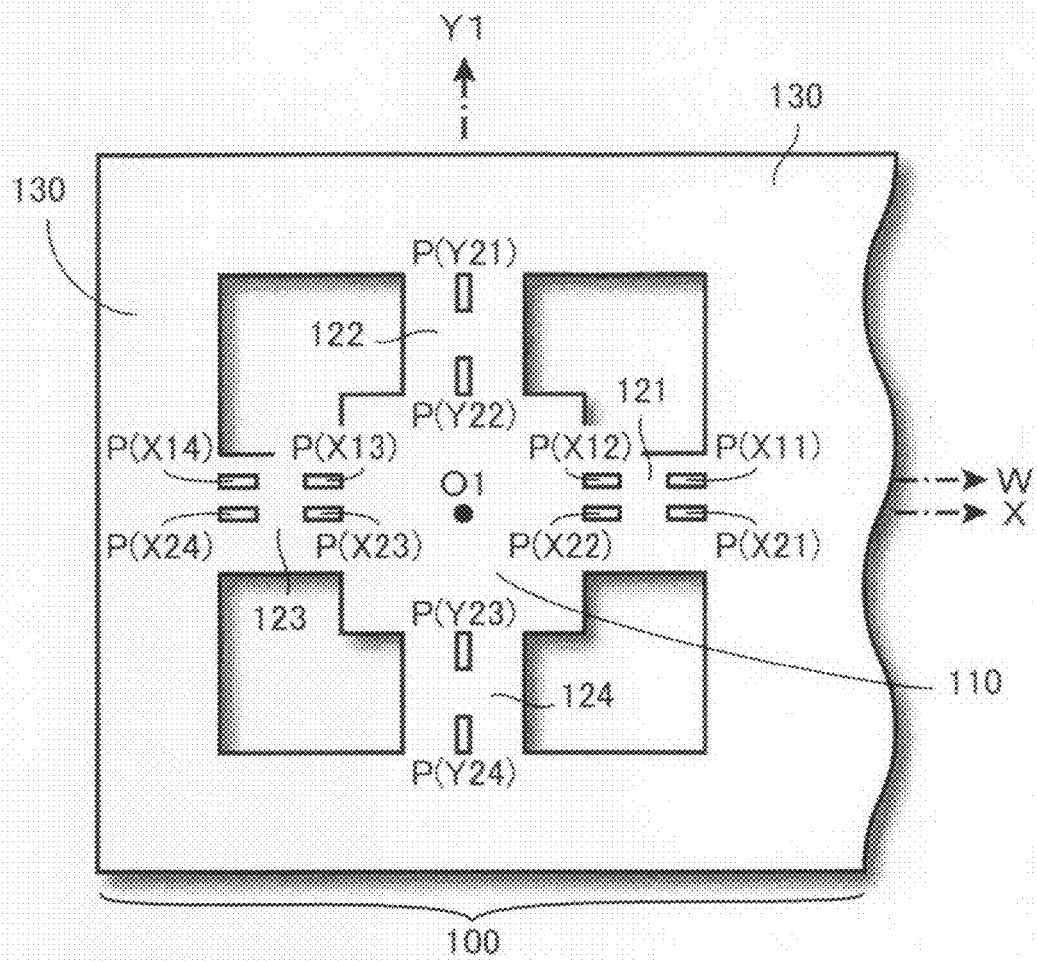
FIG. 17 is an enlarged top view of the acceleration detecting section 100 in the sensor shown in FIG. 1.

FIG. 17 is an enlarged top view of the acceleration detecting section 100 in the sensor shown in FIG. 1. As described in Section 1, the multiple piezoresistive elements P are embedded in the upper surface layer of the plate-like bridge portions (flexible connections for acceleration detection) 121 to 124 in the acceleration detecting section 100, and an applied acceleration is detected based on the change in the electrical resistances of the piezoresistive elements P. An origin O1 is also defined at the center on the upper surface of the weight body 110 for acceleration detection, and a three-dimensional coordinate system is defined with the X-axis rightward and the Y1-axis upward in FIG. 17, as is the case in FIG. 1. A W-axis running parallel adjacent to the X-axis is also defined as shown in the drawing. The W-axis shown in FIG. 17 corresponds to the Xa-axis shown in FIG. 5, but here it will be referred to as "W-axis" for the sake of convenience. It is noted that although the W-axis is parallel to the X-axis in the example of the drawing, the W-axis may be one passing through the origin O1 and inclined by a predetermined angle with respect to the X-axis.

As shown in the drawing, the acceleration detecting section 100 is provided with 12 piezoresistive elements P in total. All of the piezoresistive elements P are completely the same size and are composed of the same material, except for the arranged positions thereof. Hence, each element will be referred to as "P (area symbol)" as shown in the drawing. Here, "area symbol" represents the areas X11 to X34 and Y11 to Y34 shown in FIG. 5. For example, the piezoresistive element P (X11) shown in FIG. 17 corresponds to the element arranged in the area X11 shown in FIG. 5. The piezoresistive elements P arranged on each axis have a shape elongated in the direction of the corresponding axis, and the change in the electrical resistance in this longitudinal direction contributes to acceleration detection.

Figure 18:
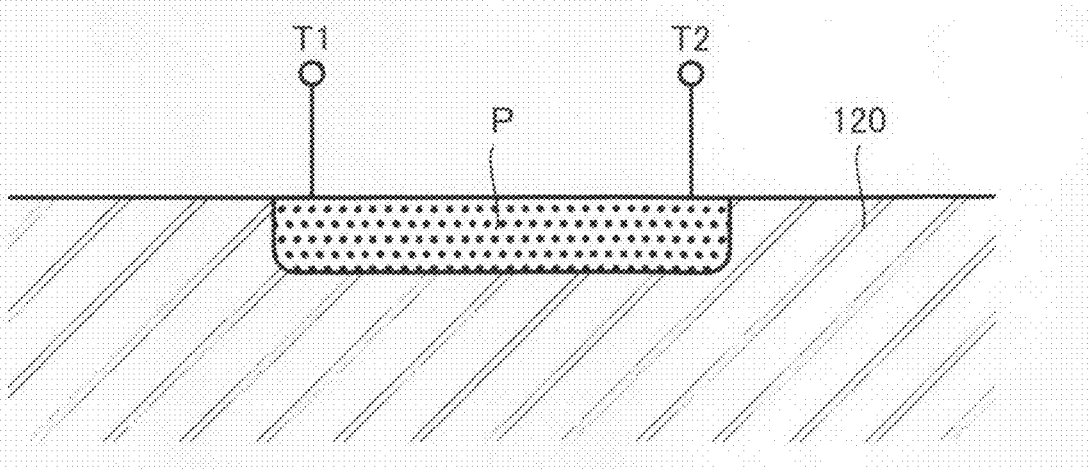
FIG. 18 is an enlarged vertical cross-sectional view of a portion where a piezoresistive element is formed in the sensor shown in FIG. 1.

FIG. 18 is an enlarged vertical cross-sectional view of a portion where a piezoresistive element P is formed. The flexible connection 120 shown in the drawing corresponds to any of the plate-like bridge portions 121 to 124, and the piezoresistive element P is embedded in the upper surface layer of the flexible connection 120. In the embodiment described herein, the flexible connection 120 is constituted by a part of an N-type silicon substrate, and the piezoresistive element P is constituted by a P-type impurity region formed in a part of the N-type silicon substrate. It is noted that wirings extending from the terminals T1 and T2 are drawn with lines in FIG. 18, which indicates for the sake of convenience that wirings are installed between the left and right ends of the piezoresistive element P and the terminals T1 and T2. Such a wiring layer is actually formed on the upper surface of the flexible connection 120 with metal such as aluminum.

Figure 19A:
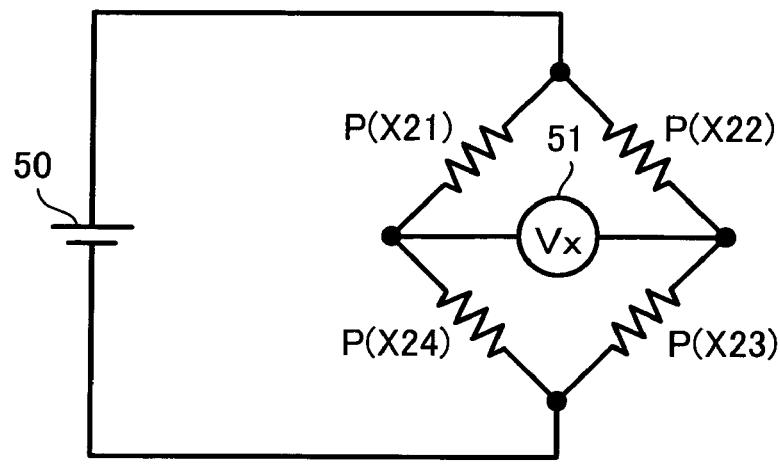
FIGS. 19A to 19C are circuit diagrams showing exemplary acceleration detecting circuits used in the sensor shown in FIG. 1.
Figure 19B:
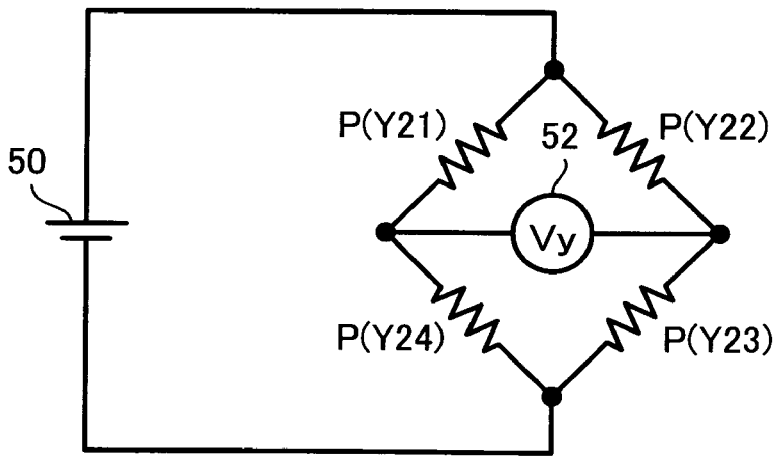
Figure 19C:
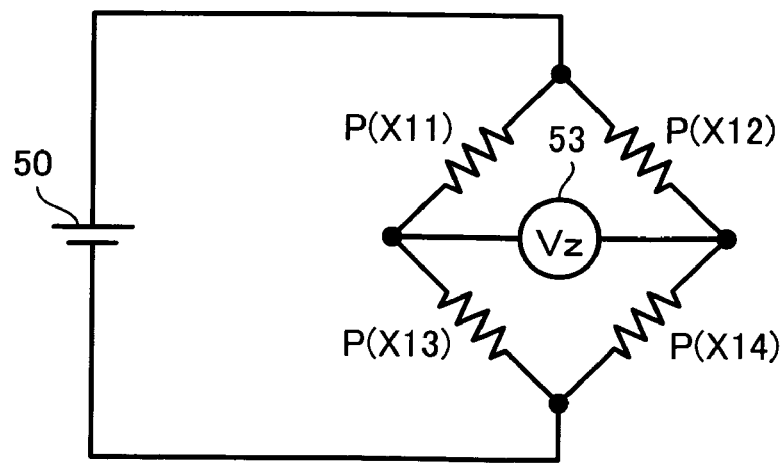

FIGS. 19A, 19B and 19C show circuit diagrams of exemplary acceleration detecting circuits used in the sensor according to the first embodiment, where FIG. 19A shows a circuit for detecting the X-axis component $\alpha x$ of an applied acceleration; FIG. 19B shows a circuit for detecting the Y-axis component $\alpha y$ of an applied acceleration; and FIG. 19C shows a circuit for detecting the Z-axis component $\alpha z$ of an applied acceleration. The piezoresistive elements in these circuits correspond to the piezoresistive elements shown in FIG. 18, and the terminals T1 and T2 in FIG. 18 correspond to the black dots in the circuit diagrams of FIGS. 19A, 19B and 19C. Each circuit includes a bridge circuit composed of four piezoresistive elements P, and a constant voltage is applied to each bridge circuit from the DC power supply 50.

First, the bridge circuit shown in FIG. 19A is composed of four piezoresistive elements P (X21), P (X22), P (X23), and P (X24) that are arranged on the X-axis in FIG. 17, and the bridge voltage Vx is measured by a potentiometer 51. When no force is applied, the four piezoresistive elements P have the same electrical resistance, so that the bridge circuit is kept balanced and the bridge voltage Vx is measured as zero by the potentiometer 51. However, when a force in the direction of the X-axis is applied to the weight body 110, such a stretching state as shown in FIG. 11 or 12 occurs. Piezoresistive elements P have a property that the electrical resistance thereof increases/decreases in accordance with a mechanical stretching state, and when such a stretching state as shown in FIG. 11 or 12 occurs, the bridge circuit shown in FIG. 19A becomes out of balance and thereby the bridge voltage Vx is measured as a positive or negative value by the potentiometer 51.

In the bridge circuit shown in FIG. 19A, the pair of piezoresistive elements P (X21) and P (X23) on opposite sides takes the same stretching state when a force in the direction of the X-axis is applied (if one is stretched the other is also stretched, while if one is shrunk the other is also shrunk). Similarly, the other pair of piezoresistive elements P (X22) and P (X24) on opposite sides also takes the same stretching state when a force in the direction of the X-axis is applied. Therefore, the bridge voltage Vx measured by the potentiometer 51 indicates the direction and magnitude of the applied force in the direction of the X-axis, that is, the X-axis component $\alpha x$ of the acceleration.

It is noted that when a force in the direction of the Y-axis is applied, the four piezoresistive elements P (X21), P (X22), P (X23), and P (X24) that constitute the bridge circuit shown in FIG. 19A are neither stretched nor shrunk significantly as shown in FIG. 13 and FIG. 14, and therefore, the bridge voltage Vx cannot vary significantly. On the other hand, when a force in the direction of the Z-axis is applied, the four piezoresistive elements P (X21), P (X22), P (X23), and P (X24) that constitute the bridge circuit shown in FIG. 19A are stretched or shrunk significantly as shown in FIG. 15 and FIG. 16. However, the pair of piezoresistive elements P (X21) and P (X23) on opposite sides in the bridge circuit take mutually different stretching states when a force in the direction of the Z-axis is applied (if one is stretched the other is shrunk, while if one is shrunk the other is stretched). Similarly, the other pair of piezoresistive elements P (X22) and P (X24) on opposite sides also takes mutually different stretching states when a force in the direction of the Z-axis is applied. Therefore, the variation of the bridge voltage Vx due to the force applied in the direction of the Z-axis is cancelled. Consequently, the bridge circuit shown in FIG. 19A can detect only the X-axis component $\alpha x$ of the applied acceleration independently.

Meanwhile, the bridge circuit shown in FIG. 19B is composed of four piezoresistive elements P (Y21), P (Y22), P (Y23), and P (Y24) that are arranged on the Y-axis in FIG. 17, and the bridge voltage Vy is measured by a potentiometer 52. When no force is applied, the four piezoresistive elements P have the same electrical resistance, so that the bridge circuit is kept, balanced and the bridge voltage Vy is measured as zero by the potentiometer 52. However, when a force in the direction of the Y-axis is applied to the weight body 110, such a stretching state as shown in FIG. 13 or 14 occurs, and therefore, the bridge circuit becomes out of balance. Consequently, the bridge voltage Vy measured by the potentiometer 52 indicates the Y-axis component αy of the acceleration.

In the bridge circuit shown in FIG. 19B, when a force in the direction of the X-axis is applied, the bridge voltage Vy cannot vary significantly. Also, when a force in the direction of the Z-axis is applied, the pairs of piezoresistive elements on the opposite sides take mutually different stretching states, and therefore, the variation of the bridge voltage Vy due to the force applied in the direction of the Z-axis is cancelled. Consequently, the bridge circuit shown in FIG. 19B can detect only the Y-axis component a y of the applied acceleration independently.

Further, the bridge circuit shown in FIG. 19C is composed of four piezoresistive elements P (X11), P (X12), P (X13), and P (X14) that are arranged on the W-axis in FIG. 17, and the bridge voltage Vz is measured by a potentiometer 53. When no force is applied, the four piezoresistive elements P have the same electrical resistance, so that the bridge circuit is kept balanced and the bridge voltage Vz is measured as zero by the potentiometer 53. However, when a force in the direction of the Z-axis is applied to the weight body 110, such a stretching state as shown in FIG. 15 or 16 occurs, and therefore, the bridge circuit becomes out of balance. Consequently, the bridge voltage Vz measured by the potentiometer 53 indicates the Z-axis component a z of the acceleration.

In the bridge circuit shown in FIG. 19C, each pair of piezoresistive elements on opposite sides is a combination of elements both arranged on the inner sides or a combination of elements both arranged on the outer sides. Therefore, when a force in the direction of the Z-axis is applied, the pairs of piezoresistive elements on the opposite sides take the same stretching state, and therefore, the bridge voltage Vz varies. However, when a force in the direction of the X or Y-axis is applied, the pairs of piezoresistive elements on the opposite sides take mutually different stretching states, and therefore, the variation of the bridge voltage Vz due to the force applied in the direction of the X or Y-axis is cancelled. Consequently, the bridge circuit shown in FIG. 19C can detect only the Z-axis component αz of the applied acceleration independently.

It is noted that the W-axis on which the four piezoresistive elements for use in detecting a force in the direction of the Z-axis are arranged may be any of the axes X, Xa, Xb, Y, Ya, and Yb shown in FIG. 5. This is for the reason that a force in the direction of the Z-axis can be detected by providing a bridge circuit in which a pair of elements arranged on the inner sides forms one pair of opposite sides and another pair of elements arranged on the outer sides forms the other pair of opposite sides. However, in order to provide a sensor having a tri-axial detecting function in the X, Y, and Z axes in the fundamental model shown in FIG. 5, it is preferable that the elements arranged in the areas X21, X22, X23, and X24 on the X-axis be used for detection of a force in the direction of the X-axis and that the elements arranged in the areas Y21, Y22, Y23, and Y24 on the Y-axis be used for detection of a force in the direction of the Y-axis. Therefore, the W-axis on which the four piezoresistive elements for use in detecting a force in the direction of the Z-axis are arranged is preferably one of the Xa, Xb, Ya, and Yb axes or an axis passing through the origin and inclined by a predetermined angle with respect to the X-axis. In the example of the first embodiment, the Xa-axis is selected as the W-axis.

Section 4

Principle of Angular Velocity Detection by the Sensor According to the First Embodiment Next will be described the principle of angular velocity detection by the angular velocity detecting section 200 in the sensor according to the first embodiment shown in FIG. 1 and FIG. 2.

Figure 20:
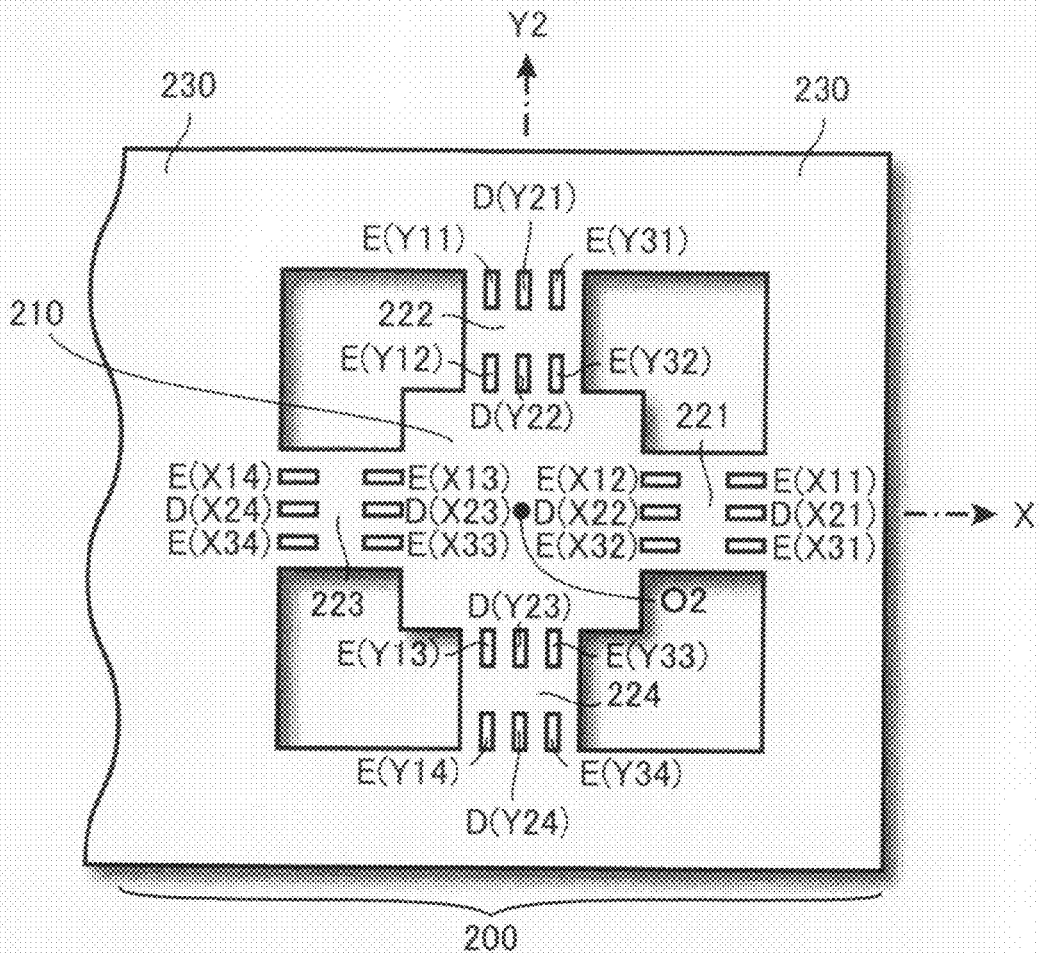
FIG. 20 is an enlarged top view of the angular velocity detecting section 200 in the sensor shown in FIG. 1.

FIG. 20 is an enlarged top view of the angular velocity detecting section 200 in the sensor shown in FIG. 1. As described in Section 1, 24 piezoelectric elements in total are arranged on the upper surfaces of the plate-like bridge portions (flexible connections for angular velocity detection) 221 to 224 in the angular velocity detecting section 200. The piezoelectric elements, which have completely the same structure physically, will be referred to, separately in consideration of their applications, as detecting piezoelectric elements D for ones to be used in detecting a force applied to the weight body 210 and driving piezoelectric elements E for ones to be used in driving the weight body 210.

The arrangement of the 24 piezoelectric elements shown in FIG. 20 is the same as that of the areas X11 to X34 and Y11 to Y34 shown in FIG. 5. Hence, the detecting and driving piezoelectric elements D and E will here be referred to, respectively, as "D (area symbol)" and "E (area symbol)." "Area symbol" represents the areas X11 to X34 and Y11 to Y34 shown in FIG. 5. For example, the piezoelectric element D (X21) shown in FIG. 20 corresponds to the detecting piezoelectric element arranged in the area X21 shown in FIG. 5, and the piezoelectric element E (X11) corresponds to the driving piezoelectric element arranged in the area X11 shown in FIG. 5. Also, the detecting and driving piezoelectric elements D and E will collectively be referred to simply as "piezoelectric elements F."

In FIG. 20, an origin O2 is also defined at the center on the upper surface of the weight body 210 for angular velocity detection, and a three-dimensional coordinate system is defined with the X-axis rightward and the Y2-axis upward in the drawing, as is the case in FIG. 1. In this embodiment, the four piezoelectric elements arranged on the X-axis and the four piezoelectric elements arranged on the Y2-axis serve as detecting piezoelectric elements D, and the piezoelectric elements arranged on either side of the X-axis and on either side of the Y-axis (elements arranged in the areas on the Xa, Xb, Ya, and Yb axes in FIG. 5) serve as driving piezoelectric elements E.

Figure 21:
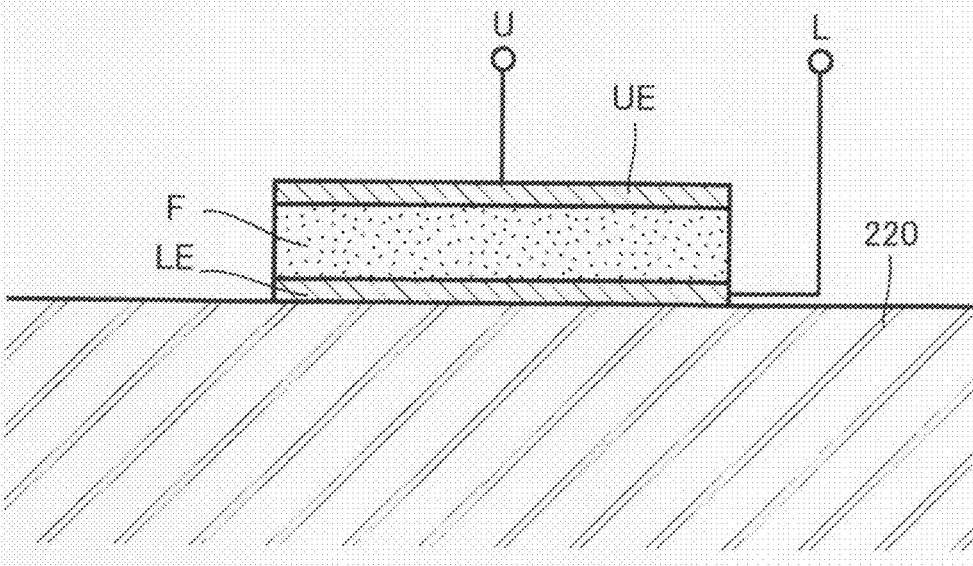
FIG. 21 is an enlarged vertical cross-sectional view of a portion where a piezoelectric element is formed in the sensor shown in FIG. 1.

FIG. 21 is an enlarged vertical cross-sectional view of a portion where a piezoelectric element F is formed. The flexible connection 220 shown in the drawing corresponds to any of the plate-like bridge portions 221 to 224, and the piezoelectric element F is arranged on the upper surface of the flexible connection 220. In the example of the drawing, the piezoelectric element F has a plate-like shape with an upper electrode UE firmly fixed to the upper surface thereof and a lower electrode LE fixed to the lower surface thereof. Then, the lower surface of the lower electrode LE is firmly fixed to the upper surface of the flexible connection 220, so that the piezoelectric element F is firmly fixed indirectly to the upper surface of the flexible connection 220 via the lower electrode LE. As a result, deflection (mechanical deformation) of the upper surface of the flexible connection 220 is transferred to the piezoelectric element F, and at the same time deflection of the piezoelectric element F is transferred to the upper surface of the flexible connection 220.

In the embodiment described herein, the flexible connection 220 is constituted by a part of a silicon substrate, the piezoelectric element F is composed of, for example, PZT (lead zirconium titanate), and the upper and lower electrodes UE and LE are each formed of an aluminum layer. It is noted that wirings extending from the terminals U and L are drawn with lines in FIG. 21, which indicates for the sake of convenience that wirings are installed between the terminal U and the upper electrode UE and the terminal L and the lower electrode LE. Such a wiring layer is actually formed with metal such as aluminum.

In general, piezoelectric elements have a property that a voltage is generated when a stress is applied, while a stress is generated when a voltage is applied. The piezoelectric element F shown in FIG. 21 has a property that when a stretching stress is applied in the horizontal direction of the drawing (in the direction parallel to the upper surface of the flexible connection 220), a voltage is generated between the upper and lower electrodes UE and LE. The polarity of the generated voltage depends on the direction of the applied stress (stretching or shrinkage in the horizontal direction), while the magnitude of the generated voltage depends on the magnitude of the applied stress. The piezoelectric element F has another property that when a voltage is applied between the upper and lower electrodes UE and LE, the element is stretched or shrunk in the horizontal direction of the drawing. The stretching or shrinkage depends on the polarity of the applied voltage, while the amount of the stretching or shrinkage depends on the magnitude of the applied voltage.

The weight body 210 can be driven by utilizing such properties of the piezoelectric element F. That is, a periodic motion of the weight body 210 can be generated by supplying an alternating signal to the driving piezoelectric elements E to deform the plate-like bridge portions 221 to 224 periodically.

For example, when a voltage of a first polarity is applied between the upper and lower electrodes of the driving piezoelectric elements E (X11), E (X31), E (X13), and E (X33) shown in FIG. 20 to cause each piezoelectric element to be shrunk and a voltage of a second polarity is applied between the upper and lower electrodes of the driving piezoelectric elements E (X12), E (X32), E (X14), and E (X34) to cause each piezoelectric element to be stretched, such a deformation aspect as shown in the fundamental model of FIG. 7 is obtained and thereby the center of gravity G of the weight body 210 moves in the positive direction along the X-axis. Also, if the polarity of the voltages applied to each driving piezoelectric element is reversed, such a deformation aspect as shown in the fundamental model of FIG. 8 is obtained and thereby the center of gravity G of the weight body 210 moves in the negative direction along the X-axis.

Figure 22:
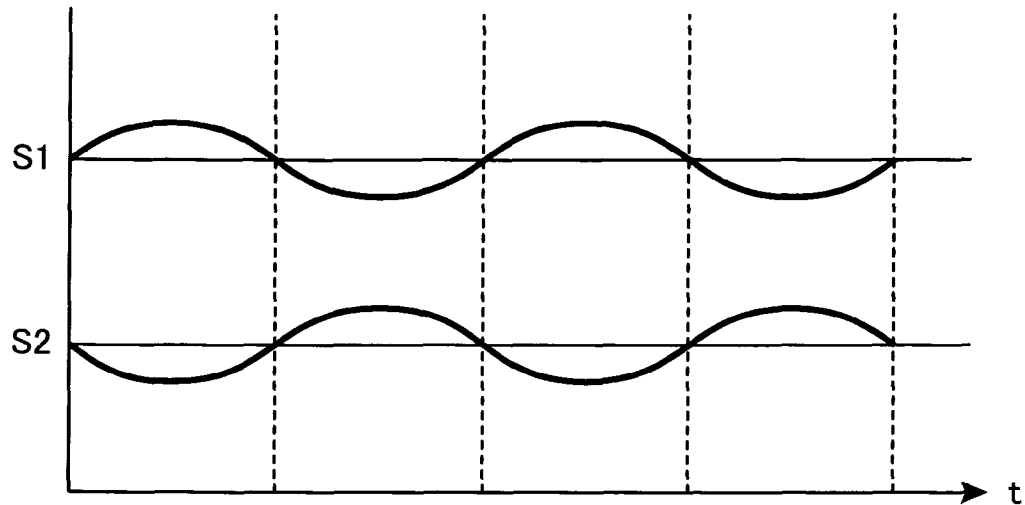
FIG. 22 is a waveform diagram showing drive signals for harmonic oscillation of the weight body 210 for angular velocity detection in the sensor shown in FIG. 1.

Consequently, the center of gravity G of the weight body 210 can be oscillated harmonically in the direction of the X-axis by providing such alternating drive signals S1 and S2 (a pair of sinusoidal signals having mutually opposite phases) as shown in FIG. 22, keeping the lower electrode LE of each driving piezoelectric element at a ground potential, supplying the drive signal S1 to the upper electrodes UE of the driving piezoelectric elements E (X11), E (X31), E (X13), and E (X33) shown in FIG. 20, and supplying the drive signal S2 to the upper electrodes UE of the driving piezoelectric elements E (X12), E (X32), E (X14), and E (X34).

Similarly, the center of gravity G of the weight body 210 can be oscillated harmonically in the direction of the Y-axis by keeping the lower electrode LE of each driving piezoelectric element at a ground potential, supplying the drive signal S1 to the upper electrodes UE of the driving piezoelectric elements E (Y11), E (Y31), E (Y13), and E (Y33) shown in FIG. 20, and supplying the drive signal S2 to the upper electrodes UE of the driving piezoelectric elements E (Y12), E (Y32), E (Y14), and E (Y34).

The center of gravity G of the weight body 210 can also be oscillated harmonically in the direction of the Z-axis by alternately repeating the deformation aspects shown in FIG. 9 and FIG. 10, that is, by keeping the lower electrode LE of each driving piezoelectric element at a ground potential, supplying the drive signal S1 to the upper electrodes UE of the driving piezoelectric elements E (X11), E (X31), E (X14), E (X34), E (Y11), E (Y31), E (Y14), and E (Y34) that are arranged on the outer sides, and supplying the drive signal S2 to the upper electrodes UE of the driving piezoelectric elements E (X12), E (X32), E (X13), E (X33), E (Y12), E (Y32), E (Y13), and E (Y33) that are arranged on the inner sides.

Figure 23:
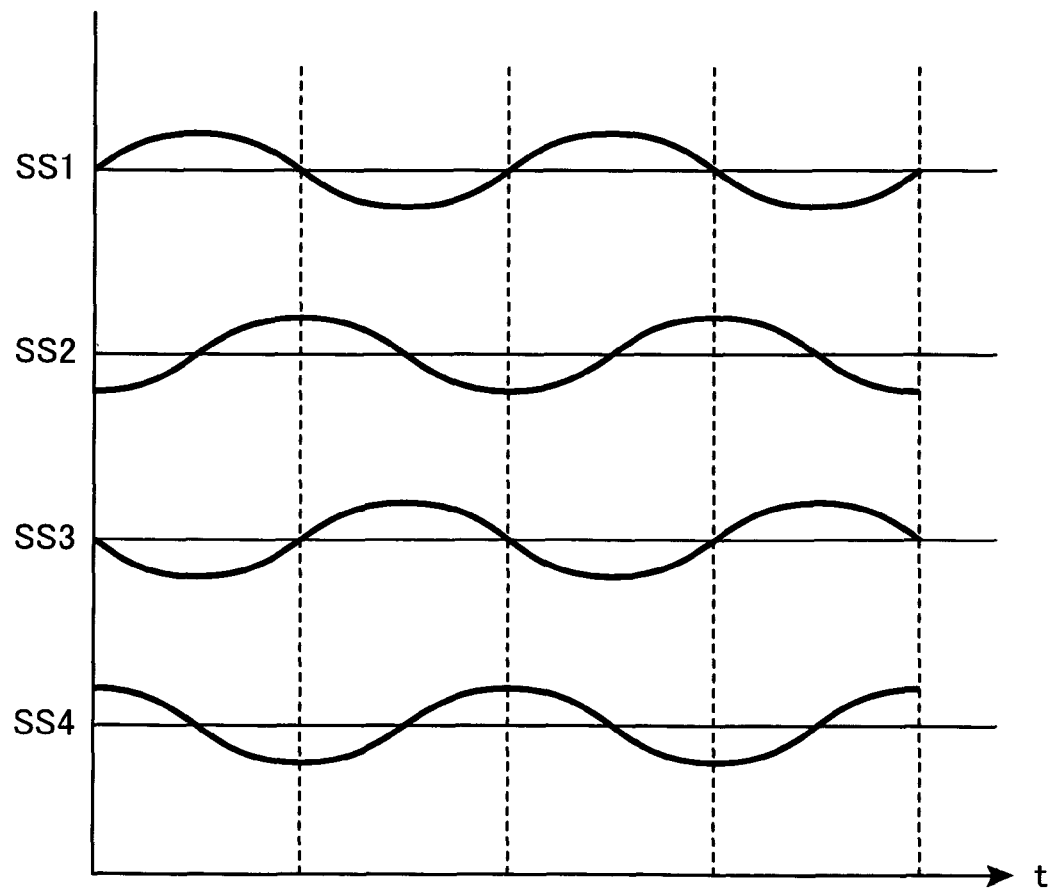
FIG. 23 is a waveform diagram showing drive signals for circular motion of the weight body 210 for angular velocity detection in the sensor shown in FIG. 1.

The center of gravity G of the weight body 210 can thus be oscillated harmonically in the direction of the X, Y, or Z-axis by supplying two kinds of drive signals S1 and S2 as shown in FIG. 22 selectively to specified driving piezoelectric elements E. The center of gravity G of the weight body 210 can also be moved circularly by providing four kinds of drive signals SS1 to SS4 (sinusoidal signals having mutually π/2-shifted phases) as shown in FIG. 23.

For example, the center of gravity G can be moved circularly in a plane parallel to the X-Y2 plane shown in FIG. 20 (XY plane in the fundamental model of FIG. 5) by keeping the lower electrode LE of each driving piezoelectric element at a ground potential, supplying the drive signal SS1 to the upper electrodes UE of the driving piezoelectric elements E (X11), E (X31), E (X13), and E (X33) shown in FIG. 20, supplying the drive signal SS2 to the upper electrodes UE of the driving piezoelectric elements E (Y11), E (Y31), E (Y13), and E (Y33), supplying the drive signal SS3 to the upper electrodes UE of the driving piezoelectric elements E (X12), E (X32), E (X14), and E (X34), and supplying the drive signal SS4 to the upper electrodes UE of the driving piezoelectric elements E (Y12), E (Y32), E (Y14), and E (Y34).

Similarly, the center of gravity G can also be moved circularly in the X-Z2 plane (XZ plane in the fundamental model of FIG. 5) or Y2-Z2 plane (YZ plane in the fundamental model of FIG. 5) by selecting appropriate drive signals to be supplied to each driving piezoelectric element E.

It is noted that although the foregoing description gives an example that the lower electrode LE of each driving piezoelectric element E is kept at a common ground potential and each upper electrode UE is supplied with a specified drive signal, it may be arranged that the upper electrode UE of each driving piezoelectric element E is kept at a common ground potential and each lower electrode LE is supplied with a specified drive signal.

Although this embodiment employs 16 driving piezoelectric elements E in total, all of the 16 driving piezoelectric elements E are not required theoretically. The weight body 210 can be driven using, for example, only the eight elements arranged on the inner sides or only the eight elements arranged on the outer sides. However, from a practical standpoint, it is preferable to provide 16 driving piezoelectric elements E in total as shown in the drawing to drive the weight body 210 efficiently and stably.

Figure 24A:
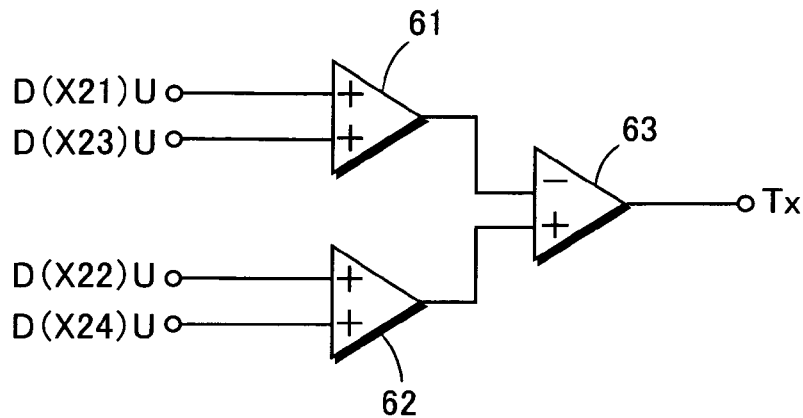
FIGS. 24A to 24C are circuit diagrams partially showing angular velocity detecting circuits used in the sensor shown in FIG. 1.
Figure 24B:
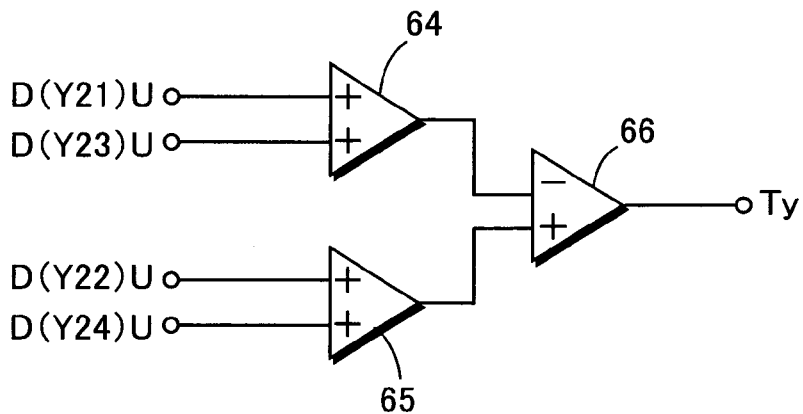
Figure 24C:
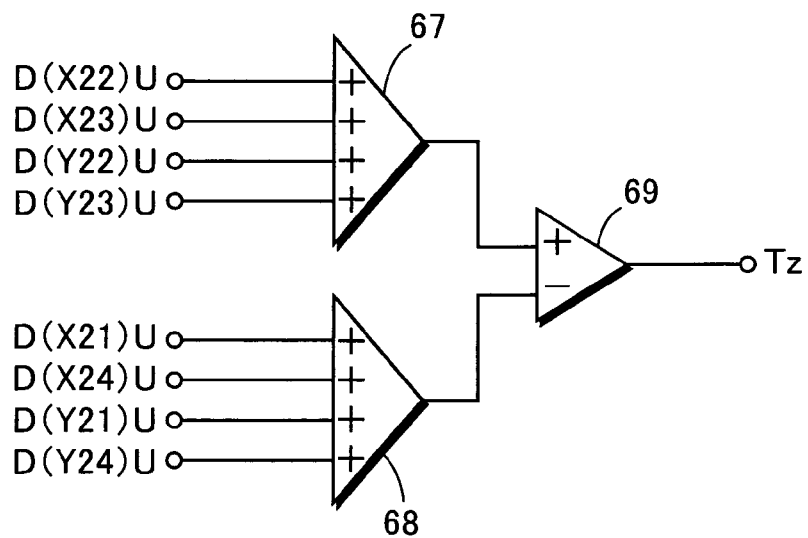

Meanwhile, a force applied to the weight body 210 in the direction of each axis can be detected using the detecting piezoelectric elements D. FIGS. 24A, 24B and 24C show circuit diagrams of exemplary circuits for detecting such a force, where FIG. 24A shows a circuit for detecting the X-axis component of the applied force; FIG. 24B shows a circuit for detecting the Y1-axis (Y-axis in the fundamental model of FIG. 5) component of the applied force; and FIG. 24C shows a circuit for detecting the Z2-axis (Z-axis in the fundamental model of FIG. 5) component of the applied force. In these circuits, the lower electrode LE of each detecting piezoelectric element D is kept at a common ground potential and analog operation results based on the voltage values generated on the upper electrodes UE are output at terminals Tx, Ty, and Tz.

The circuit shown in FIG. 24A is an arithmetic circuit for detecting piezoelectric elements D on the X-axis shown in FIG. 20, including: an arithmetic unit 61 for obtaining the sum of the voltage values at the upper electrode D (X21) U of the detecting piezoelectric element D (X21) and the upper electrode D (X23) U of the detecting piezoelectric element D (X23); an arithmetic unit 62 for obtaining the sum of the voltage values at the upper electrode D (X22) U of the detecting piezoelectric element D (X22) and the upper electrode D (X24) U of the detecting piezoelectric element D (X24); and an arithmetic unit 63 for obtaining the difference between the outputs from the respective arithmetic units 61 and 62.

In the case of the above-described fundamental model, when a force +Fx in the positive direction along the X-axis is applied to the weight body 10, the upper surfaces of the plate-like bridge portions 21 and 23 are stretched or shrunk as shown in FIG. 7. Also, when a force −Fx in the negative direction along the X-axis is applied, the upper surfaces of the plate-like bridge portions 21 and 23 are stretched or shrunk as shown in FIG. 8. In either case, the stretching states of the detecting piezoelectric element D (X21) and detecting piezoelectric element D (X23) that belong to the first group are the same. Also, the stretching states of the detecting piezoelectric element D (X22) and detecting piezoelectric element D (X24) that belong to the second group are the same. Therefore, the arithmetic unit 61 outputs a value indicating the stretching state of an element belonging to the first group, while the arithmetic unit 62 outputs a value indicating the stretching state of an element belonging to the second group. Meanwhile, since the stretching states of each element belonging to the first group and each element belonging to the second group are opposite, the arithmetic unit 63 obtains the difference between the outputs from the respective arithmetic units 61 and 62 and then outputs the difference at the terminal Tx. Consequently, the voltage value output at the terminal Tx indicates the X-axis component of the force applied to the weight body 10.

Also, the circuit shown in FIG. 24B is an arithmetic circuit for the detecting piezoelectric elements D on the Y2-axis shown in FIG. 20, including: an arithmetic unit 64 for obtaining the sum of the voltage values at the upper electrode D (Y21) U of the detecting piezoelectric element D (Y21) and the upper electrode D (Y23) U of the detecting piezoelectric element D (Y23); an arithmetic unit 65 for obtaining the sum of the voltage values at the upper electrode D (Y22) U of the detecting piezoelectric element D (Y22) and the upper electrode D (Y24) U of the detecting piezoelectric element D (Y24); and an arithmetic unit 66 for obtaining the difference between the outputs from the respective arithmetic units 64 and 65. In accordance with such a circuit configuration, the voltage value output at the terminal Ty indicates the Y-axis component of the force applied to the weight body 10.

Meanwhile, the circuit shown in FIG. 24C is an arithmetic circuit for the detecting piezoelectric elements D on the X and Y2-axes shown in FIG. 20, including: an arithmetic unit 67 for obtaining the sum of the voltage values at the upper electrodes D (X22) U, D (X23) U, D (Y22) U, and D (Y23) U of the detecting piezoelectric elements D arranged on the inner sides; an arithmetic unit 68 for obtaining the sum of the voltage values at the upper electrodes D (X21) U, D (X24) U, D (Y21) U, and D (Y24) U of the detecting piezoelectric elements D arranged on the outer sides; and an arithmetic unit 69 for obtaining the difference between the outputs from the respective arithmetic units 67 and 68.

In the case of the above-described fundamental model, when a force +Fz in the positive direction along the Z-axis is applied to the weight body 10, the upper surfaces of the plate-like bridge portions 21 and 23 are stretched or shrunk as shown in FIG. 9. Also, when a force −Fz in the negative direction along the Z-axis is applied, the upper surfaces of the plate-like bridge portions 21 and 23 are stretched or shrunk as shown in FIG. 10. In either case, the stretching states of the detecting piezoelectric elements D arranged on the inner sides are the same, and also the stretching states of the detecting piezoelectric elements D arranged on the outer sides are the same. Therefore, the arithmetic unit 67 outputs a value indicating the stretching state of an element arranged on the inner side, while the arithmetic unit 68 outputs a value indicating the stretching state of an element arranged on the outer side. Meanwhile, since the stretching states of each element arranged on the inner side and each element arranged on the outer side are opposite, the arithmetic unit 69 obtains the difference between the outputs from the respective arithmetic units 67 and 68 and then outputs the difference at the terminal Tz. Consequently, the voltage value output at the terminal Tz indicates the Z-axis component of the force applied to the weight body 10.

Now, when an object travels at a velocity V in the direction along a first coordinate axis in a three-dimensional orthogonal coordinate system and when an angular velocity $\omega$ around a second coordinate axis is applied to the object, a Coriolis force Fc is applied to the object in the direction along a third coordinate axis, where the angular velocity $\omega$ is proportional to Fc/V. The angular velocity detecting section 200 described herein has a function of detecting angular velocity around a desired coordinate axis by utilizing this principle.

For example, an angular velocity $\omega z$ around the Z2-axis applied to the weight body 210 can be obtained by oscillating the weight body 210 harmonically in the direction of the X-axis by the above-described method and by detecting a force (Coriolis force) Fc, based on the detection values, applied to the weight body 210 in the direction of the Y2-axis by the above-described method. In this case, since the velocity V of the weight body 210 in the direction of the X-axis is constant (maximum velocity of the harmonic oscillation) under an exemplary precondition that the force Fc is detected at the moment of timing the weight body 210 passes through the center of the harmonic oscillation, the detected force Fc can be treated directly as a value proportional to the angular velocity $\omega z$.

Similarly, an angular velocity $\omega y$ around the Y2-axis can be detected by oscillating the weight body 210 harmonically in the direction of the X-axis and detecting a Coriolis force Fc applied in the direction of the Z2-axis. Alternatively, an angular velocity $\omega x$ around the X-axis can be detected by oscillating the weight body 210 harmonically in the direction of the Y2-axis and detecting a Coriolis force Fc applied in the direction of the Z2-axis. In other words, the angular velocity detecting section 200 in the sensor according to the first embodiment can move the weight body 210 in any desired direction of the X, Y2, and Z2 axes, and at the same time, can detect a Coriolis force in the direction of the X, Y2, and Z2 axes applied to the weight body 210, whereby the angular velocity around the X, Y2, and Z2 axes can be detected by appropriately combining drive axes and detection axes.

In order to detect tri-axial angular velocity successively at a predetermined cycle, it is preferable to move the weight body 210 circularly. As mentioned above, the weight body 210 can be moved circularly in a plane parallel to the X-Y2 plane (XY plane in the fundamental model of FIG. 5) by using, for example, four kinds of drive signals SS1 to SS4 (sinusoidal signals having mutually $\pi/2$-shifted phases) as shown in FIG. 23. In this circular motion, since the weight body 210 moves in the direction of the Y2-axis at the moment of timing the weight body 210 passes through the X-Z2 plane, the angular velocity around the Z2-axis can be obtained by detecting a Coriolis force applied in the direction of the X-axis at the moment, while the angular velocity around the X-axis can be obtained by detecting a Coriolis force applied in the direction of the Z2-axis at the moment. Similarly, in this circular motion, since the weight body 210 moves in the direction of the X-axis at the moment of timing the weight body 210 passes through the Y2-Z2 plane, the angular velocity around the Y2-axis can be obtained by detecting a Coriolis force applied in the direction of the Z2-axis at the moment, while the angular velocity around the Z2-axis can be obtained by detecting a Coriolis force applied in the direction of the Y2-axis at the moment.

Section 5

Features of the Sensor According to the First Embodiment

The basic structure, deformation aspect, principle of acceleration detection, and principle of angular velocity detection have heretofore been described in this order about the sensor according to the first embodiment having the structure shown in FIG. 1 and FIG. 2. Here will be described features of the sensor.

The most critical feature of the sensor according to the present invention is that acceleration is detected through a piezoresistive element, while angular velocity is detected through a piezoelectric element. In the case of the sensor according to the first embodiment, acceleration is detected by detecting the displacement of the weight body 110 in the acceleration detecting section 100 as the change in the electrical resistance of each piezoresistive element. Here, the change in the electrical resistance of each piezoresistive element is a static physical phenomenon. For example, even if a constant force +Fx may be applied and thereby the flexible connections may be kept in a constant deformation state as shown in FIG. 7, the electrical resistance of each piezoresistive element formed in the flexible connections is kept at a constant value dependent on the deformation state. Therefore, even a static acceleration such as acceleration due to gravity can be detected.

Thus, piezoresistive elements have the advantage of being able to detect a static state, but cannot be used as a drive element. In order to detect angular velocity, it is necessary to move the weight body in a predetermined direction as mentioned above, which requires a drive element. Hence, piezoelectric elements are employed in the angular velocity detecting section 200. Piezoelectric elements can serve not only as a detection element in which a voltage is generated in accordance with the deformation of each flexible connection, but also as a drive element displaced by supplying a drive signal.

However, piezoelectric elements cannot detect a static deformation state as piezoresistive elements, the function thereof as a detection element being limited to the detection of a dynamic transient phenomenon. For example, if the weight body 10 moves in the positive direction along the X-axis as shown in FIG. 7 when a force +Fx is applied, charges are generated temporarily in the piezoelectric elements firmly fixed to the upper surfaces of the flexible connections by their transient deformation, but when the weight body 10 comes to rest at the position shown in FIG. 7 so that the flexible connections are kept in the deformation state shown in the drawing, no charge is generated in the piezoelectric elements.

Although the detecting function of piezoelectric elements is thus limited to the detection of a dynamic deformation state, such a limited detecting function is enough to detect angular velocity. As mentioned above, the weight body 210 in the angular velocity detecting section 200 is driven for harmonic oscillation or circular motion, where the magnitude and/or direction of the velocity V of the weight body 210 changes temporally. Accordingly, the magnitude and/or direction of the Coriolis force Fc applied to the weight body 210 also changes temporally, resulting in that the Coriolis force Fc to be detected is detected not as a static quantity but as a dynamic transient phenomenon. Therefore, there is nothing wrong with employing a piezoelectric element as a detection element in the angular velocity detecting section 200.

In the present invention, acceleration is detected through a piezoresistive element, while angular velocity is detected through a piezoelectric element in consideration of the circumstances above. Also, piezoresistive elements and piezoelectric elements can be formed on the upper surface of each flexible connection, which has the advantage that the wiring can be simplified. For example, in the case of using capacitors as a detection element and/or a drive element, since it is necessary to provide one of the pair of electrodes constituting each capacitor on the weight body, the wiring for each electrode inevitably becomes complicated. Also, in the case of using capacitors, since detection based on a slight change in the distance between electrodes is required, from a practical standpoint, necessary to keep the interior evacuated in order that the motion of the weight body may not be disturbed by air. If piezoresistive elements and/or piezoelectric elements are used as detection elements, there is no need to keep the interior evacuated, whereby the structure of the sensor can be simplified.

Another feature of the sensor according to the first embodiment is that the major structures including a weight body, a pedestal surrounding the weight body, and a flexible connection for connecting the weight body and the pedestal are employed as mechanical components of the acceleration detecting section 100 and the angular velocity detecting section 200, and that the pedestal 130 in the acceleration detecting section 100 and the pedestal 230 in the angular velocity detecting section 200 form a monolithic structure.

As will be understood from the top view of FIG. 1 and the vertical cross-sectional view of FIG. 2, the physical structures of the acceleration detecting section 100 and the angular velocity detecting section 200 have the same shape and form a monolithic structure. This means that the physical structures of the acceleration detecting section 100 and the angular velocity detecting section 200 can be produced through a common production process, which is effective on the simplification of the production process.

From a practical standpoint, it is preferable to use a single silicon substrate to produce the physical structures of the acceleration detecting section 100 and the angular velocity detecting section 200. That is, the weight body 110 for acceleration detection, the flexible connections (plate-like bridge portions) 121 to 124 for acceleration detection, the pedestal 130 for acceleration detection, the weight body 210 for angular velocity detection, the flexible connections (plate-like bridge portions) 221 to 224 for angular velocity detection, and the pedestal 230 for angular velocity detection shown in FIG. 2 are formed of a single silicon substrate.

In this embodiment, a pair of rectangular annular grooves G1 and G2 (refer to FIG. 4) are formed in the lower surface of the single silicon substrate, the portion surrounded by the first rectangular annular groove G1 constituting the weight body 110 for acceleration detection, while the portion surrounded by the second rectangular annular groove G2 constituting the weight body 210 for angular velocity detection. Then, as shown in FIG. 2, the thinned portion corresponding to the first rectangular annular groove G1 constitutes the flexible connections (plate-like bridge portions) 121 to 124 for acceleration detection, while the thinned portion corresponding to the second rectangular annular groove G2 constitutes the flexible connections (plate-like bridge portions) 221 to 224 for angular velocity detection.

Also, the flexible connection for acceleration detection includes four plate-like bridge portions 121 to 124, and piezoresistive elements are arranged on both the inner sides that are closer to the weight body 110 for acceleration detection and the outer sides that are closer to the pedestal 130 for acceleration detection in the plate-like bridge portions 121 to 124. The flexible connection for angular velocity detection includes four plate-like bridge portions 221 to 224, and driving piezoelectric elements E and detecting piezoelectric elements D are arranged on both the inner sides that are closer to the weight body 210 for angular velocity detection and the outer sides that are closer to the pedestal 230 for angular velocity detection in the plate-like bridge portions 221 to 224.

Elements are thus arranged on both the inner and outer sides of each plate-like bridge portion. This is for the reason that when the weight body is displaced, these parts (particularly base portions for the weight body inside and base portions for the pedestal outside) may have a stress concentration due to deformation. The weight body can be driven efficiently and deflection can be detected efficiently by arranging elements in these parts.

It is noted that each piezoresistive element P formed in the acceleration detecting section 100 is embedded in the upper surface layer of the flexible connection 120 for acceleration detection as shown in FIG. 18 and is constituted by a layer containing impurities (e.g. P-type impurity diffused layer) formed in the surface layer of a silicon substrate.

Meanwhile, the piezoelectric elements F formed in the angular velocity detecting section 200, which are divided functionally into driving piezoelectric elements E and detecting piezoelectric elements D, are firmly fixed directly or indirectly to the upper surface of the flexible connection 220 for angular velocity detection. In the example of FIG. 21, the piezoelectric element F has a lower electrode LE formed on the lower surface thereof and an upper electrode UE formed on the upper surface thereof, and the lower surface of the lower electrode LE on the piezoelectric element F is firmly fixed to the upper surface of the flexible connection 220 for angular velocity detection. The angular velocity detecting circuit for the angular velocity detecting section 200 detects an applied angular velocity based on an alternating voltage generated between the upper and lower electrodes UE and LE on each detecting piezoelectric element D while applying an alternating voltage between the upper and lower electrodes UE and LE on each driving piezoelectric element E to generate a periodic motion of the weight body 210 for angular velocity detection.

Section 6

Sensor According to the Second Embodiment

Next will be described a sensor according to a second embodiment of the present invention. The sensor according to the second embodiment can be figured out as a sensor in which the acceleration detecting section 100 and the angular velocity detecting section 200 in the sensor according to the first embodiment shown in FIG. 1 and FIG. 2 are integrated on a single major structure. As will be understood from the top view of FIG. 1 and the vertical cross-sectional view of FIG. 2, the physical structures of the acceleration detecting section 100 and the angular velocity detecting section 200 are substantially the same and equivalent to the fundamental model shown in FIG. 5 and FIG. 6. The difference between the structures is that the acceleration detecting section 100 is provided with piezoresistive elements P, while the angular velocity detecting section 200 is provided with piezoelectric elements F. In the sensor according to the second embodiment to be described herein, both piezoresistive elements P and piezoelectric elements F are formed in the major structure that is constructed based on the fundamental model shown in FIG. 5 and FIG. 6.

Figure 25:
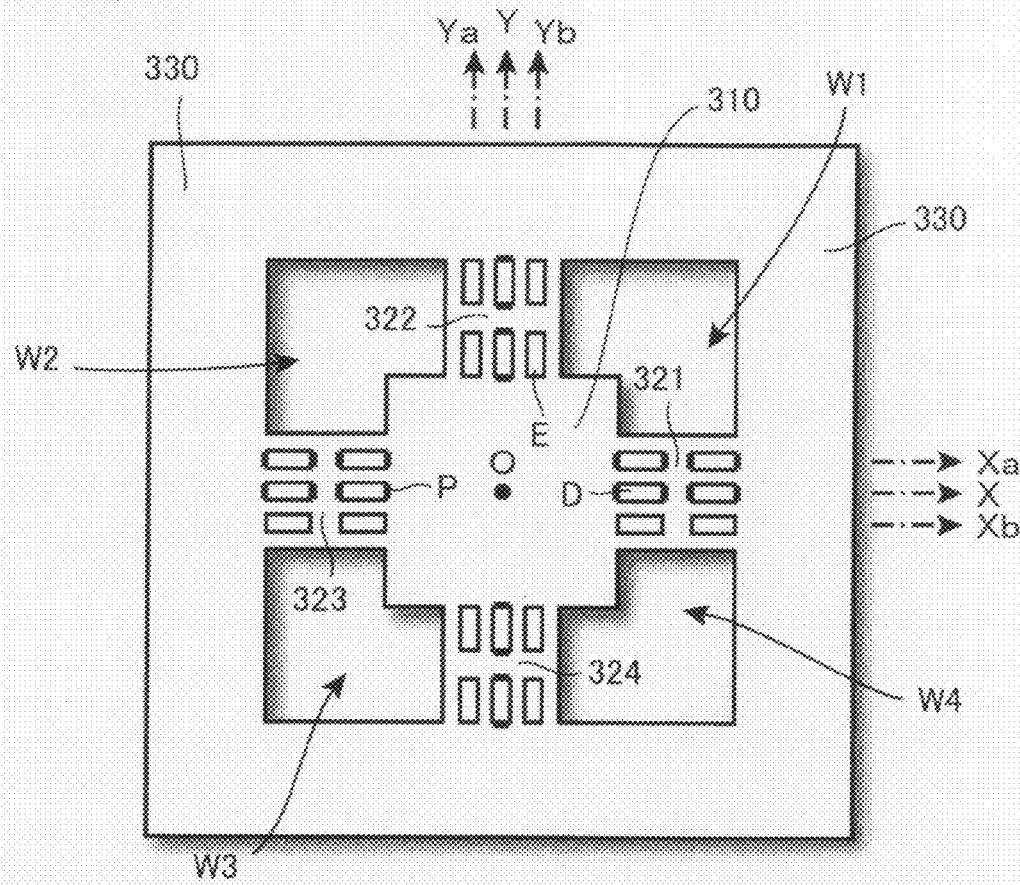
FIG. 25 is a top view of an acceleration and angular velocity sensor according to a second embodiment of the present invention.

FIG. 25 is a top view of the sensor according to the second embodiment. As shown in the drawing, the major structures of the sensor are the same as those of the fundamental model shown in FIG. 5, including a square-columnar weight body 310, four plate-like bridge portions 321 to 324, and a pedestal 330. The pedestal 330 has a square contour arranged in such a manner as to surround the weight body 310, and the four plate-like bridge portions 321 to 324 serve as flexible connections for connecting the weight body 310 and the pedestal 330.

Figure 26:
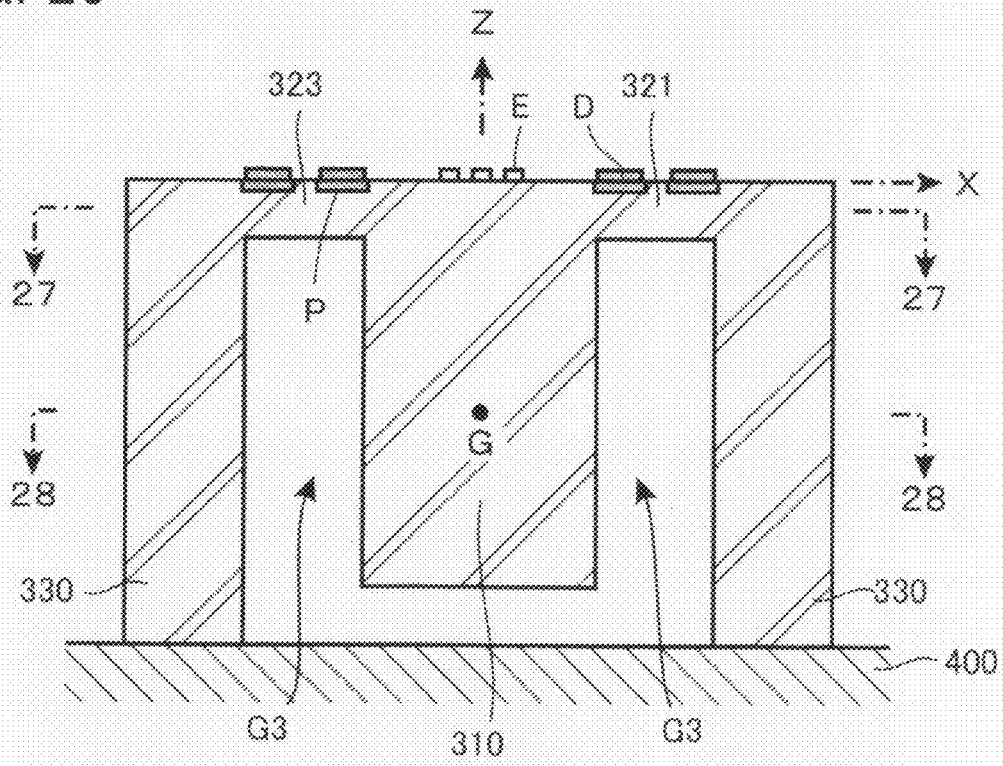
FIG. 26 is a vertical cross-sectional view of the sensor taken along the X-Z plane of FIG. 25.

FIG. 26 is a vertical cross-sectional view of the sensor shown in FIG. 25. For the sake of descriptive convenience, here will also be defined an origin O at the center on the upper surface of the weight body 310 and further an XYZ three-dimensional coordinate system, as shown in FIG. 25. The X-axis is directed rightward in FIG. 25, the Y-axis is directed upward in FIG. 25, and the Z-axis is directed upward in FIG. 26. FIG. 26 is a vertical cross-sectional view of the sensor taken along the X-axis of FIG. 25. Also, as shown in FIG. 25, Xa and Xb-axes are defined on either side of the X-axis in the XY plane, the Xa and Xb-axes running parallel to the X-axis with a predetermined space dx from the X-axis, and Ya and Yb-axes are defined on either side of the Y-axis in the XY plane, the Ya and Yb-axes running parallel to the Y-axis with a predetermined space dy from the Y-axis.

Figure 27:
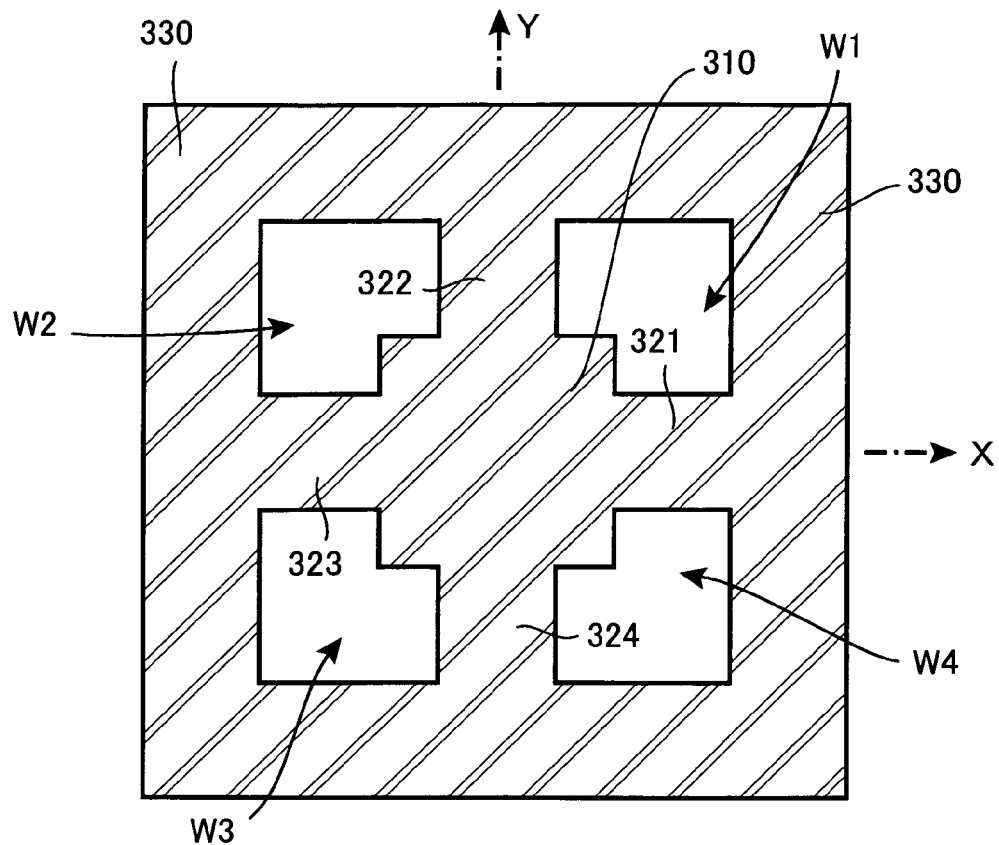
FIG. 27 is a horizontal cross-sectional view of the sensor taken along the line 27-27 of FIG. 26.
Figure 28:
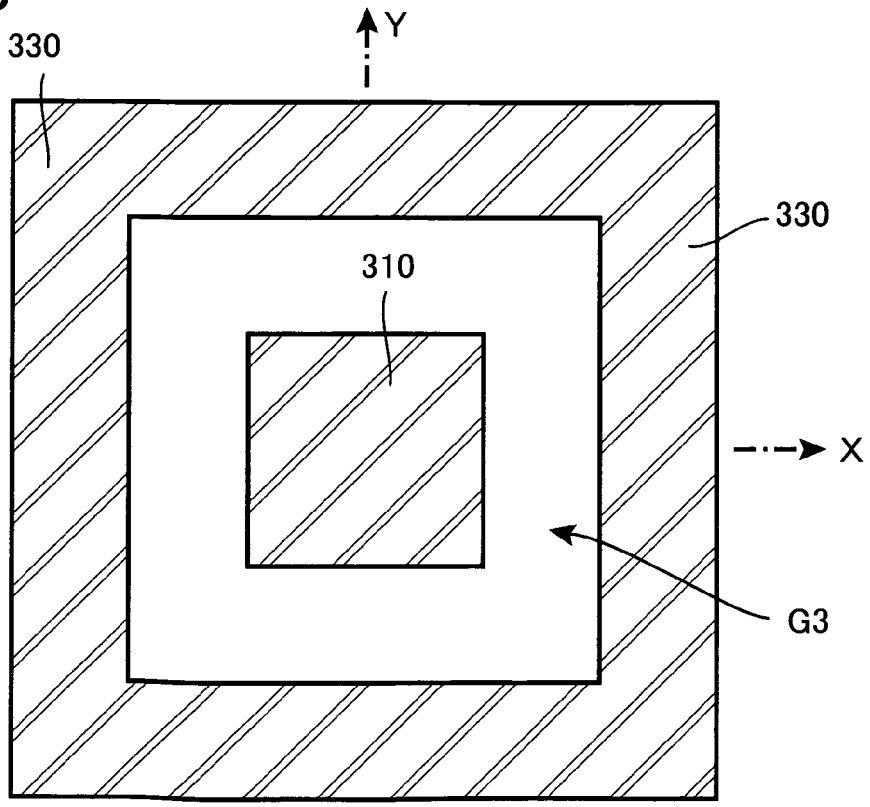
FIG. 28 is a horizontal cross-sectional view of the sensor taken along the line 28-28 of FIG. 26.

FIG. 27 is a horizontal cross-sectional view of the sensor taken along the line 27-27 of FIG. 26, and FIG. 28 is a horizontal cross-sectional view of the sensor taken along the line 28-28 of FIG. 26. As shown in FIG. 28, the weight body 310 has a square-columnar shape with a square cross-section, and a rectangular annular groove G3 is formed around the weight body 310. The pedestal 330 is a wall-shaped structure surrounding the entirety of the weight body 310 across the rectangular annular groove G3.

The major structures of the sensor (weight body 310, plate-like bridge portions 321 to 324, and pedestal 330) can actually be constructed by processing a single substrate (e.g. silicon substrate), as is the case in the first embodiment. That is, the rectangular annular groove G3 is dug by a predetermined depth from the lower surface of a single substrate to form the weight body 310, and then the bottom portion of the weight body 310 is removed by a slight amount to be suspended, as shown in the vertical cross-sectional view of FIG. 26. Subsequently, opening portions W1 to W4 are formed in the upper part of the substrate to achieve the major structures, as shown in the horizontal cross-sectional view of FIG. 27.

Although the bottom surface of the pedestal 330 is fixed to the device chassis 400 as shown in FIG. 26, the bottom portion of the weight body 310 is not in contact with the device chassis 400, so that the weight body 310 is suspended with a predetermined space from the device chassis 400. It is noted that only a part of the device chassis 400 (in the bottom portion where the pedestal 330 is fixed) is shown here for the sake of illustrative convenience, but the device chassis 400 actually surrounds the entirety of the major structures of the sensor, and wall surfaces of the device chassis 400 are arranged in the left, right, and upper margins of FIG. 26.

The plate-like bridge portions 321 to 324, which correspond to thinned portions, serve as flexible connections. Also, the weight body 310 is supported by the plate-like bridge portions 321 to 324 at four sides. Therefore, when a force based on acceleration or a Coriolis force is applied to the weight body 310, the plate-like bridge portions 321 to 324 are to be deflected so that the weight body 310 is displaced with respect to the pedestal 330.

As shown in the top view of FIG. 25, multiple piezoresistive elements P and multiple piezoelectric elements D and E are formed in the plate-like bridge portions 321 to 324. The piezoresistive elements P have the same structure and function as the 12 elements formed on the acceleration detecting section 100 in the sensor according to the first embodiment (refer to FIG. 17), and the piezoelectric elements D and E have the same structure and function as the 24 elements formed on the angular velocity detecting section 200 in the sensor according to the first embodiment (refer to FIG. 20).

As shown in FIG. 26, the piezoresistive elements P are embedded in the surface layer of the plate-like bridge portions 321 to 324 (flexible connections), and the piezoelectric elements D and E are firmly fixed to the upper surface of the plate-like bridge portions 321 to 324 (the piezoelectric elements D and E each actually have upper and lower electrodes UE and LE formed thereon, which are not shown in FIG. 26). The specific configuration of the piezoresistive elements P is the same as in the first embodiment (refer to FIG. 18). Also, the piezoelectric elements D and E, which are actually constituent parts of piezoelectric elements F having the same structure, are just referred to as detecting piezoelectric elements D and driving piezoelectric elements E in consideration of their applications. The specific configuration of the piezoelectric elements F is also the same as in the first embodiment (refer to FIG. 21).

Thus, since the piezoresistive elements P are embedded in the surface layer of the flexible connections and the piezoelectric elements D and E are firmly fixed to the upper surface of the flexible connections, both of the elements can be formed in an overlapped manner in the same area. FIG. 25 shows a state where both of the elements are formed in an overlapped manner in the same area as appropriate. In the case of the sensor according to the first embodiment, 12 piezoresistive elements P are provided as shown in FIG. 17 and also 24 piezoelectric elements D and E in total are provided as shown in FIG. 20. Therefore, in the case of the sensor according to the second embodiment, 12 areas each include a piezoresistive element and a piezoelectric element formed in an overlapped manner, while the other 12 areas each include only a piezoelectric element formed therein, as shown in FIG. 25.

It is noted that electrodes are formed on the upper and lower surfaces of the piezoelectric elements D and E and insulating layers are formed between the piezoresistive elements P and the piezoelectric elements D and E, but these electrodes and insulating layers are not shown in FIG. 26. Specific configuration examples of the piezoresistive elements P and the piezoelectric elements D and E will be described in Section 7.

Figure 29:
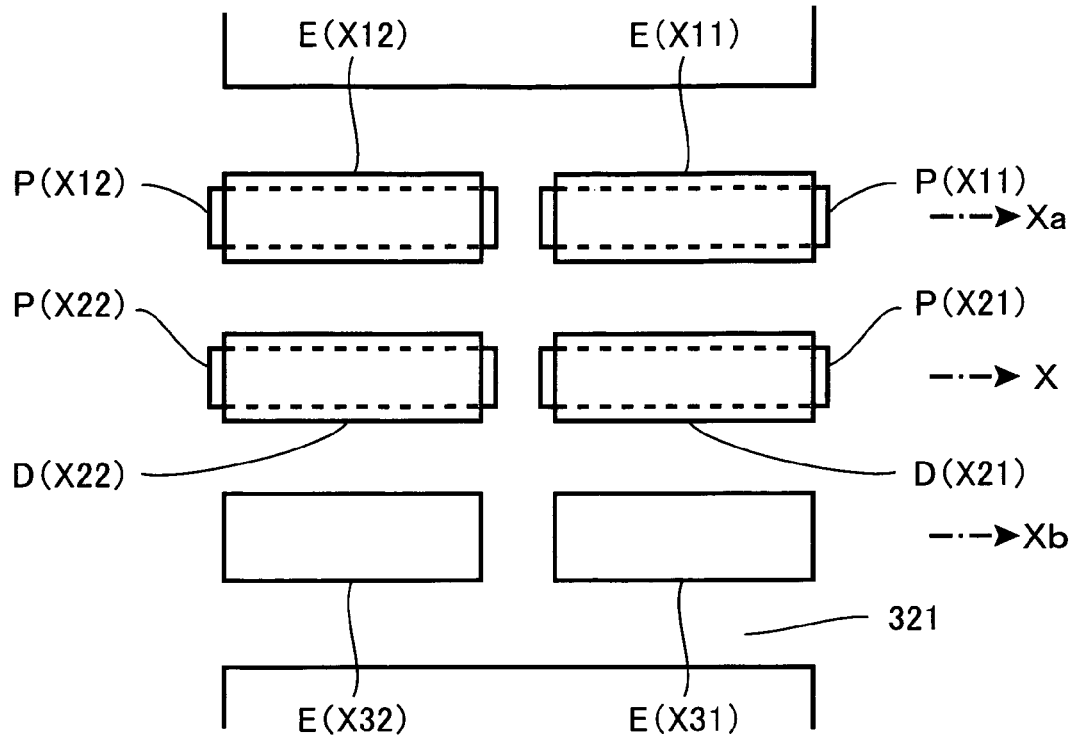
FIG. 29 is an enlarged top view of the plate-like bridge portion 321 in the sensor shown in FIG. 25.
Figure 30:
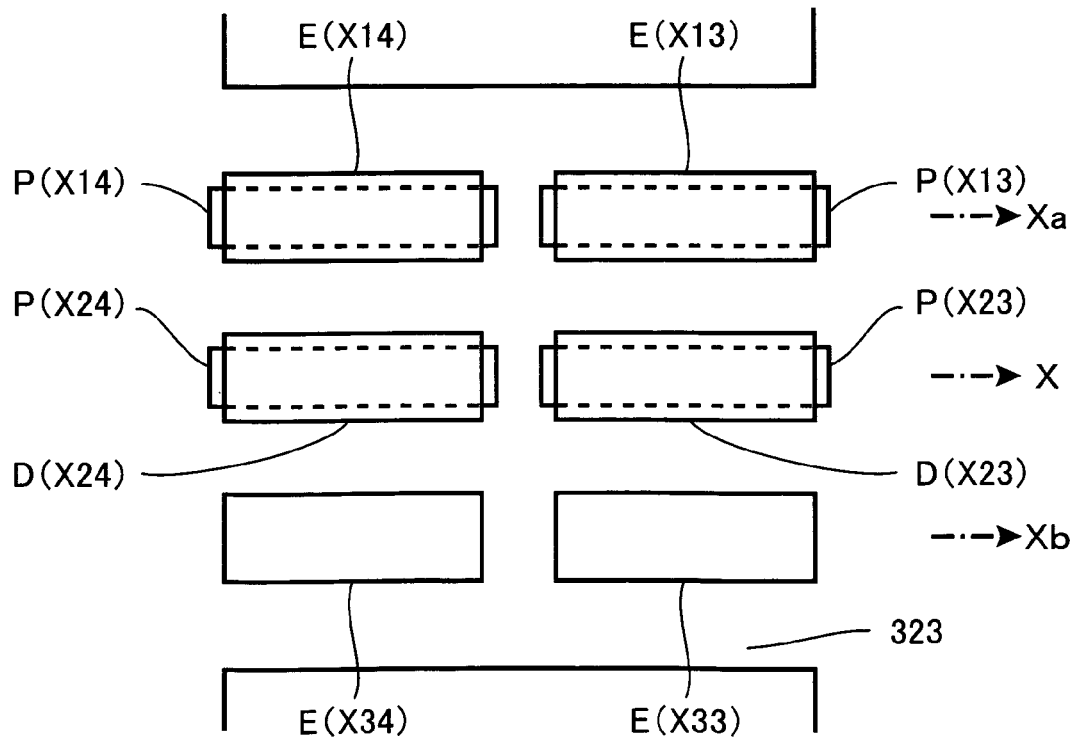
FIG. 30 is an enlarged top view of the plate-like bridge portion 323 in the sensor shown in FIG. 25.
Figure 31:
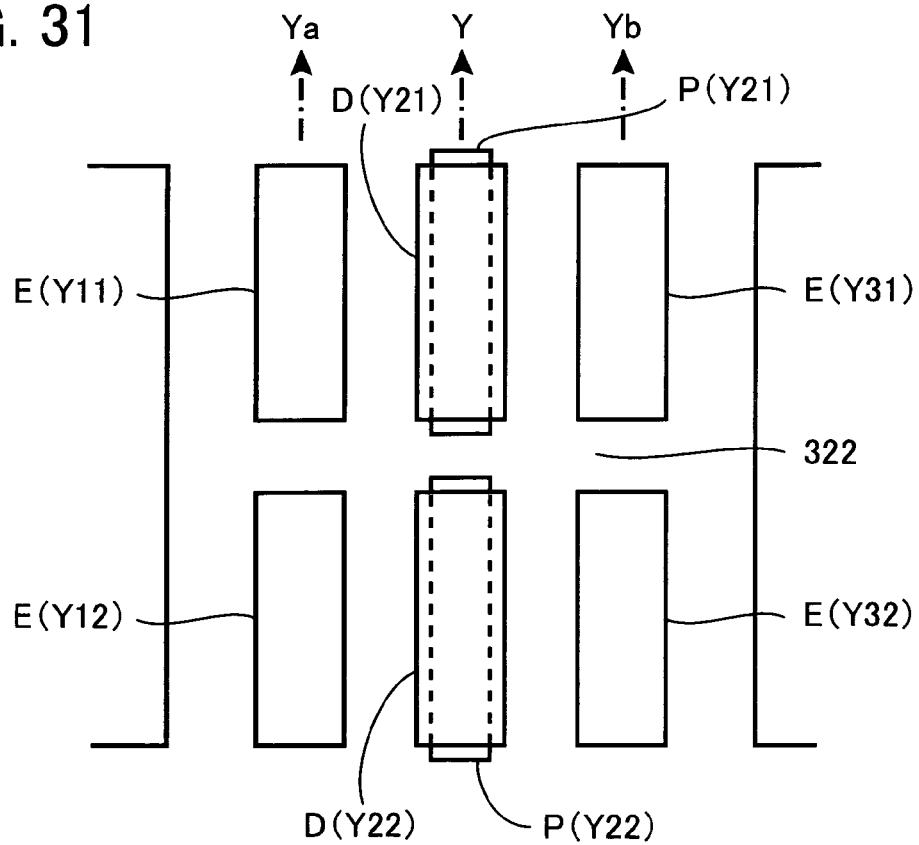
FIG. 31 is an enlarged top view of the plate-like bridge portion 322 in the sensor shown in FIG. 25.
Figure 32:
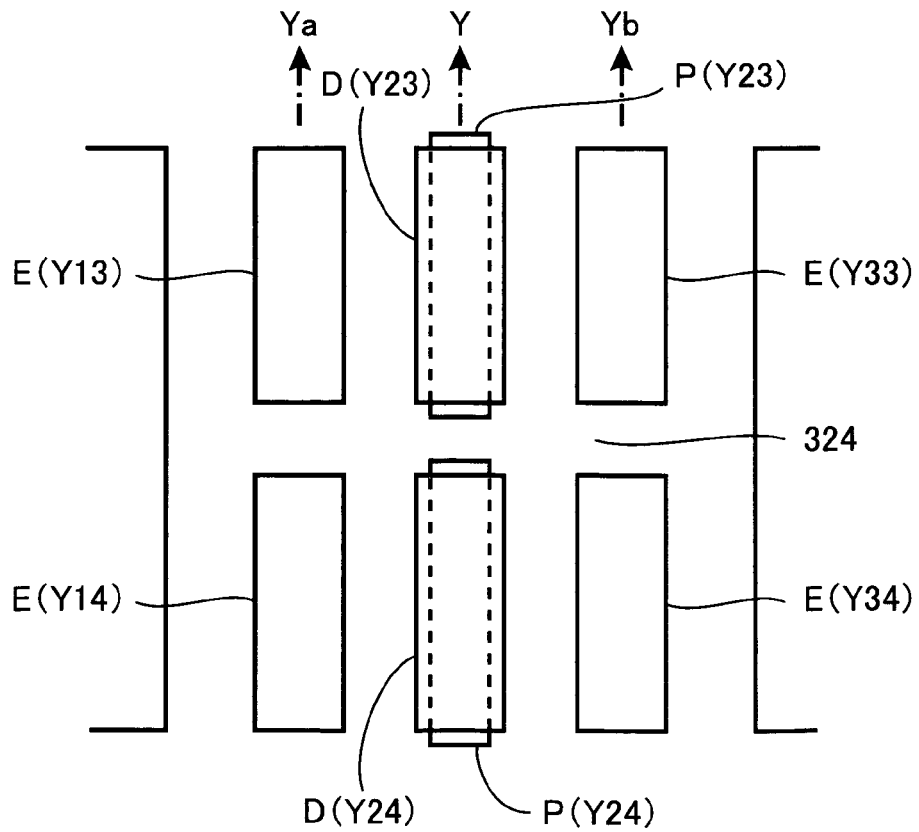
FIG. 32 is an enlarged top view of the plate-like bridge portion 324 in the sensor shown in FIG. 25.

FIG. 29 is an enlarged top view of the plate-like bridge portion 321 in the sensor shown in FIG. 25; FIG. 30 is an enlarged top view of the plate-like bridge portion 323 in the sensor shown in FIG. 25; FIG. 31 is an enlarged top view of the plate-like bridge portion 322 in the sensor shown in FIG. 25; and FIG. 32 is an enlarged top view of the plate-like bridge portion 324 in the sensor shown in FIG. 25. Each piezoresistive element will be referred to as "P (area symbol)," each detecting piezoelectric element will be referred to as "D (area symbol)," and each driving piezoelectric element will be referred to as "E (area symbol)," as is the case in the first embodiment. Here, "area symbol" represents the areas X11 to X34 and Y11 to Y34 shown in the fundamental model of FIG. 5.

Consequently, in the sensor described herein, detecting piezoelectric elements (D (X22) and D (X21)) are arranged on the inner and outer sides on the positive X-axis of the flexible connection; detecting piezoelectric elements (D (X23) and D (X24)) are arranged on the inner and outer sides on the negative X-axis; driving piezoelectric elements (E (X12) and E (X11)) are arranged on the inner and outer sides on the positive Xa-axis of the flexible connection; driving piezoelectric elements (E (X13) and E (X14)) are arranged on the inner and outer sides on the negative Xa-axis; driving piezoelectric elements (E (X32) and E (X31)) are arranged on the inner and outer sides on the positive Xb-axis of the flexible connection; driving piezoelectric elements (E (X33) and E (X34)) are arranged on the inner and outer sides on the negative Xb-axis; detecting piezoelectric elements (D (Y22) and D (Y21)) are arranged on the inner and outer sides on the positive Y-axis of the flexible connection; detecting piezoelectric elements (D (Y23) and D (Y24)) are arranged on the inner and outer sides on the negative Y-axis; driving piezoelectric elements (E (Y12) and E (Y11)) are arranged on the inner and outer sides on the positive Ya-axis of the flexible connection; driving piezoelectric elements (E (Y13) and E (Y14)) are arranged on the inner and outer sides on the negative Ya-axis; driving piezoelectric elements (E (Y32) and E (Y31)) are arranged on the inner and outer sides on the positive Yb-axis of the flexible connection; driving piezoelectric elements (E (Y33) and E (Y34)) are arranged on the inner and outer sides on the negative Yb-axis; piezoresistive elements (P (X22) and P (X21)) are arranged on the inner and outer sides on the positive X-axis of the flexible connection; piezoresistive elements (P (X23) and P (X24)) are arranged on the inner and outer sides on the negative X-axis; piezoresistive elements (P (Y22) and P (Y21)) are arranged on the inner and outer sides on the positive Y-axis of the flexible connection; piezoresistive elements (P (Y23) and P (Y24)) are arranged on the inner and outer sides on the negative Y-axis; piezoresistive elements (P (X12) and P (X11)) are arranged on the inner and outer sides on the positive W-axis of the flexible connection; and piezoresistive elements (P (X13) and P (X14)) are arranged on the inner and outer sides on the negative W-axis (although the Xa-axis is selected as a W-axis in this example, it is only required that one of the Xa, Xb, Ya, and Yb axes is defined as a W-axis (auxiliar axis W)).

In the sensor according to the second embodiment, the principle of acceleration detection using the piezoresistive elements P is completely the same as the principle of acceleration detection in the sensor according to the first embodiment described in Section 3, and acceleration can be detected using the acceleration detecting circuit described in Section 3. Also, in the sensor according to the second embodiment, the principle of angular velocity detection using the piezoelectric elements D and E is completely the same as the principle of angular velocity detection in the sensor according to the first embodiment described in Section 4, and angular velocity can be detected using the angular velocity detecting circuit described in Section 4. Therefore, descriptions of these basic detection principles and detecting circuits will here be omitted. However, since one weight body 310 is used for both acceleration detection and angular velocity detection, it is necessary to contrive ways to prevent interference between acceleration detection and angular velocity detection. Such a contrivance will be described in Section 10 in detail.

Section 7

Specific Configuration Examples of Piezoresistive Elements and Piezoelectric Elements Here will be described specific configuration examples of the piezoresistive elements and the piezoelectric elements and, in particular, specific configuration examples suitable for use in the second embodiment described in Section 6.

Figure 33:
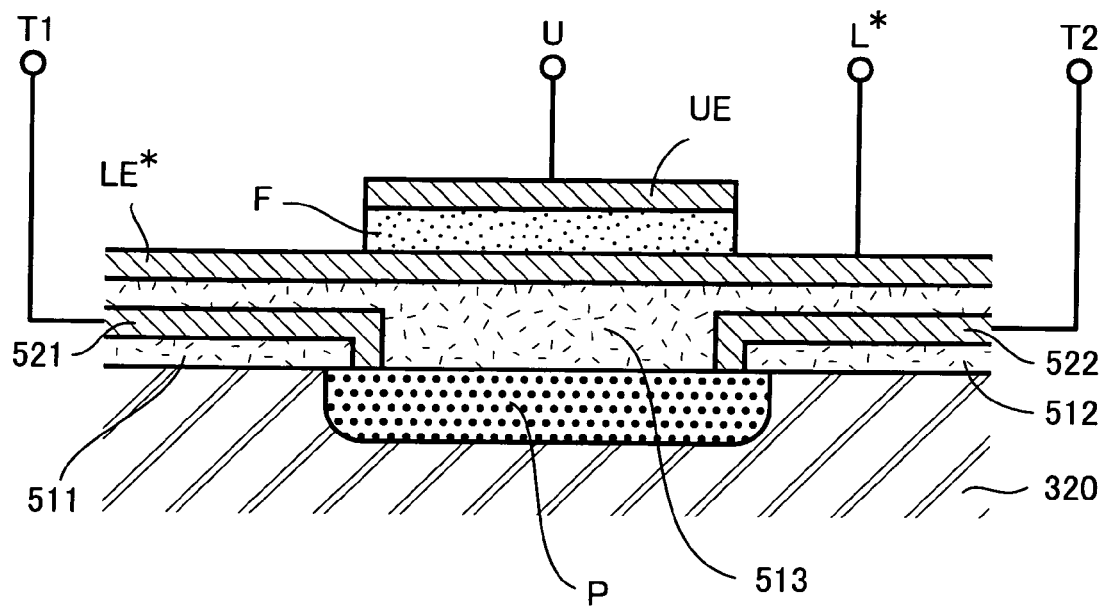
FIG. 33 is an enlarged vertical cross-sectional view of a portion where a piezoresistive element and a piezoelectric element is formed in an overlapped manner on one plate-like bridge portion in the sensor shown in FIG. 25.

FIG. 33 is an enlarged vertical cross-sectional view of a portion where a piezoresistive element and a piezoelectric element is formed in an overlapped manner on the flexible connection 320 (plate-like bridge portions 321 to 324) in the sensor shown in FIG. 25. In this example, the flexible connection 320 is constituted by an N-type silicon substrate, and the piezoresistive element P is constituted by a P-type impurity layer formed in the surface layer of the N-type silicon substrate. Insulating layers 511, 512, and 513 (e.g. silicon oxide film or silicon nitride film) are formed on the upper surface of the flexible connection 320. The wiring layer 521 formed on the upper part of the insulating layer 511 and the wiring layer 522 formed on the upper part of the insulating layer 512 are for installing wirings for both ends of the piezoresistive element P (e.g. aluminum layer) and for the terminals T1 and T2.

The common metal layer LE* formed on the upper surface of the insulating layer 513 serves as a lower electrode to be used in common for all of the piezoelectric elements F. Each piezoelectric element F (e.g. PZT) is formed at a predetermined position on the upper surface of the common metal layer LE*, and each upper electrode UE is formed on the upper surface of the piezoelectric element F. The piezoelectric elements F and the upper electrodes UE are thus arranged in the respective 24 areas X11 to X34 and Y11 to Y34 shown in FIG. 5, while the lower electrodes LE are replaced with a single common metal layer LE* instead of forming for each piezoelectric element F.

Employing such an arrangement advantageously allows wirings to be omitted in the case of detection with all of the lower electrodes LE being connected to a common ground potential. In the example of FIG. 33, installation of wirings for all of the lower electrodes LE is completed by connecting the terminal L* of the common metal layer to a ground potential. In other words, if the lower electrodes on multiple piezoelectric elements are formed of a physically single common metal layer LE*, the wirings can be simplified advantageously. It will be appreciated that separate metal layers may be formed only in the areas under the respective piezoelectric elements F instead of using a common metal layer LE*.

Figure 34:
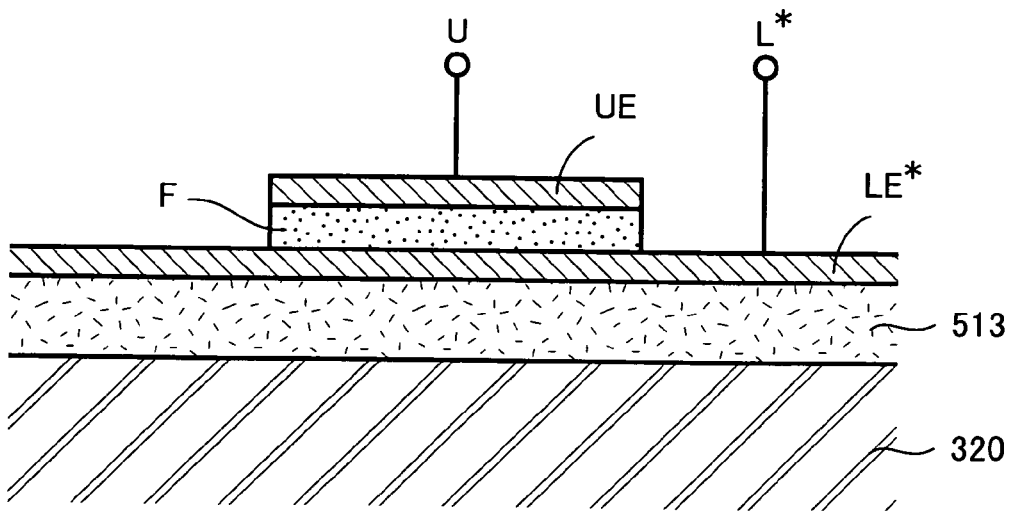
FIG. 34 is an enlarged vertical cross-sectional view of a portion where a piezoelectric element is formed on one plate-like bridge portion in the sensor shown in FIG. 25.

Meanwhile, FIG. 34 is an enlarged vertical cross-sectional view of a portion where only a piezoelectric element is formed on the flexible connection 320 (plate-like bridge portions 321 to 324) in the sensor shown in FIG. 25. An insulating layer 513 (e.g. silicon oxide film or silicon nitride film) is formed on the upper surface of the flexible connection 320, and the layer structure thereon is completely the same as shown in FIG. 33. In other words, the insulating layers 511, 512, and 513 shown in FIG. 33 are substantially the same as the insulating layer 513 shown in FIG. 34, and the wiring layers 521 and 522 shown in FIG. 33 are embedded in the same insulating layer. Also, the common metal layer LE* shown in FIG. 33 is substantially the same as the common metal layer LE* shown in FIG. 34. That is, the insulating layer 513 is formed entirely on the upper surface of the major structures shown in FIG. 25 (corresponding to the entire area hatched in FIG. 27), and further the common metal layer LE* is formed entirely on the upper surface of the insulating layer 513.

Thus, a piezoresistive element and a piezoelectric element are formed in a laminated manner across an insulating layer in some areas as shown in FIG. 33, while only a piezoelectric element is formed on an insulating layer in other areas as shown in FIG. 34.

The common metal layer LE* that serves as lower electrodes and each upper electrode UE may be made of any material as long as they have a conductivity for serving as an electrode. In general, metal such as aluminum is advantageously used. However, in the embodiment described herein, the common metal layer LE* employs a two-layer film with titanium for the lower layer and platinum for the upper layer. This is for the reason that when the insulating layer 513 under the common metal layer LE* is composed of silicon oxide film or silicon nitride film and the piezoelectric elements F on the common metal layer LE* is composed of PZT, the interfacial adaptation is improved. That is, if the lower layer of the common metal layer LE* is composed of titanium, the conjunction to the insulating layer 513 that is composed of silicon oxide film or silicon nitride film is advantageously improved, and if the upper layer of the common metal layer LE* is composed of platinum, the conjunction to the piezoelectric elements F that are composed of PZT is advantageously improved.

Figure 35:
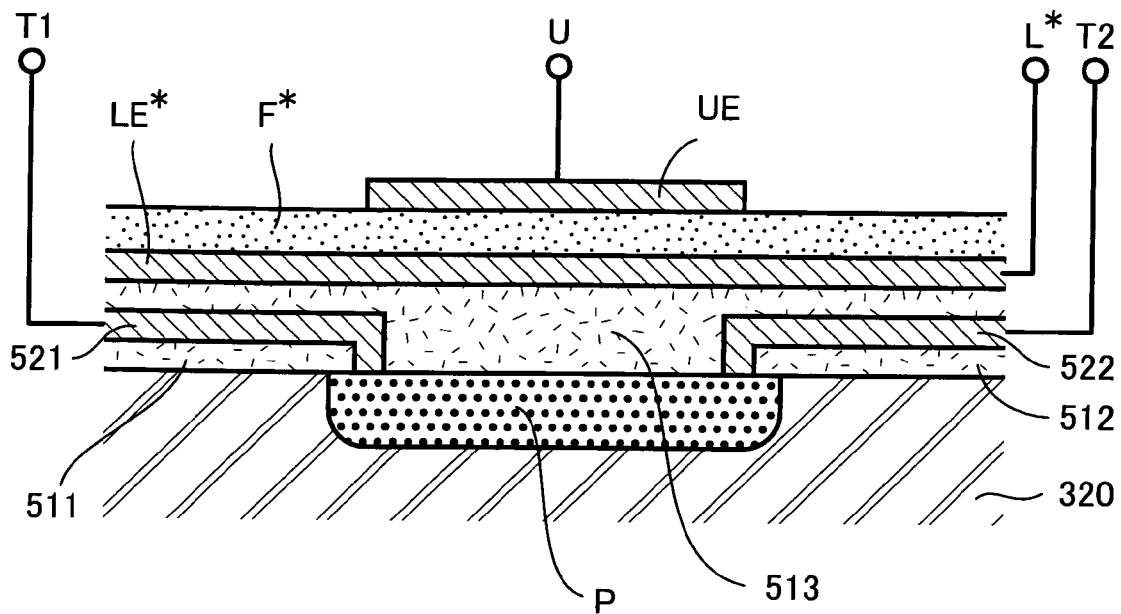
FIG. 35 is an enlarged vertical cross-sectional view showing an exemplary variation of a portion where a piezoresistive element and a piezoelectric element is formed in an overlapped manner on one plate-like bridge portion in the sensor shown in FIG. 25.
Figure 36:
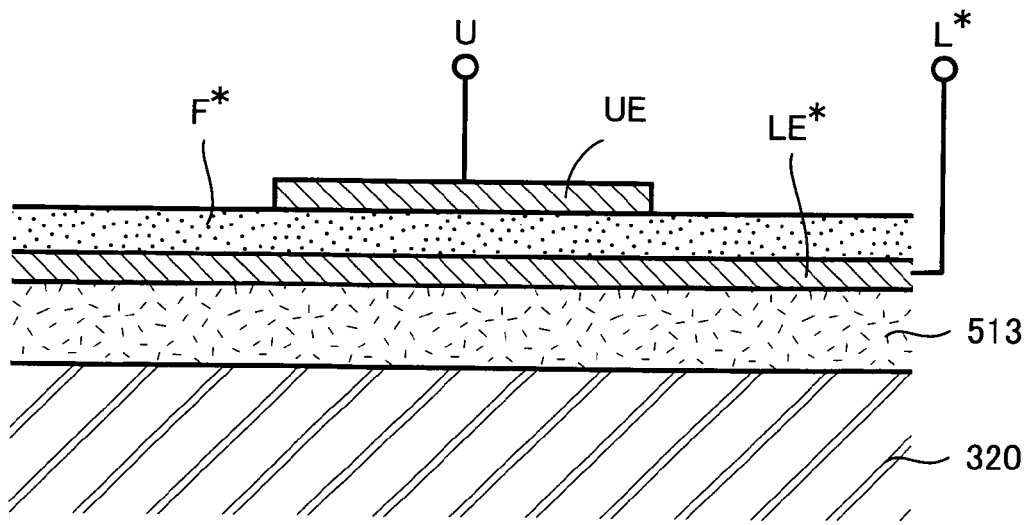
FIG. 36 is an enlarged vertical cross-sectional view showing an exemplary variation of a portion where a piezoelectric element is formed on one plate-like bridge portion in the sensor shown in FIG. 25.

It is noted that as with the case that the lower electrodes LE can be replaced with a single common metal layer LE*, the piezoelectric elements F may be replaced with a single common piezoelectric element F*. FIG. 35 and FIG. 36 are enlarged vertical cross-sectional views showing an example where multiple piezoelectric elements F are thus formed of a physically single common piezoelectric element F*, where FIG. 35 shows an area requiring both a piezoresistive element P and a piezoelectric element F arranged therein and FIG. 36 shows an area requiring only a piezoelectric element F arranged therein. In the example of FIG. 33 and FIG. 34, each area includes a piezoelectric element F formed therein, while in the example of FIG. 35 and FIG. 36, a single common piezoelectric element F* is formed entirely on the upper surface of the major structures shown in FIG. 25 (corresponding to the entire area hatched in FIG. 27). Even if such a single common piezoelectric element F* may be formed, each part of the single common piezoelectric element F* can behave as an independent piezoelectric element F without interrupting the operation of the sensor, as long as the upper electrodes UE are formed separately.

It is noted that although each piezoresistive element is constituted by a P-type impurity layer formed in the surface layer of an N-type silicon substrate in the above-described embodiment, each piezoresistive element may be constituted by an N-type impurity layer formed in the surface layer of a P-type silicon substrate. Alternatively, an SOI (Silicon On Insulator) substrate may be used instead of an N-type silicon substrate.

Figure 37:
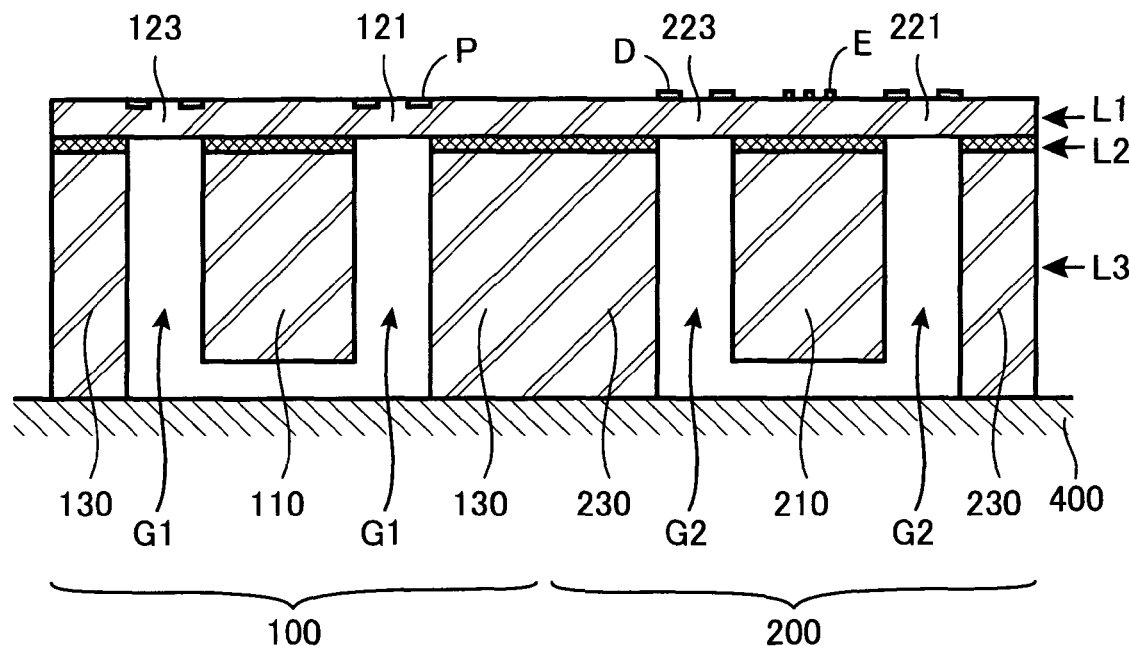
FIG. 37 is a vertical cross-sectional view showing an exemplary configuration where the sensor shown in FIG. 2 includes an SOI substrate.

FIG. 37 is a vertical cross-sectional view showing an exemplary configuration where the sensor according to the first embodiment shown in FIG. 2 includes an SOI substrate. That is, this example employs an SOI substrate having a three-layer structure of an upper layer L1 composed of N-type silicon, a middle layer L2 composed of a silicon oxide insulating layer, and a lower base layer L3 composed of N-type or P-type silicon. An annular groove G1 is dug in the middle and lower layers L2 and L3 of the SOI substrate to separate the weight body 110 and the pedestal 130, and an annular groove G2 is dug to separate the weight body 210 and the pedestal 230. As a result, the flexible connections (plate-like bridge portions 121 to 124 and 221 to 224) are composed only of the upper layer L1. Each piezoresistive element P is constituted by a P-type impurity layer formed in the surface layer of the upper layer L1, as is the case in the above-described embodiments. It is noted that the electrodes on the piezoelectric elements D and E are not shown in the drawing.

Figure 38:
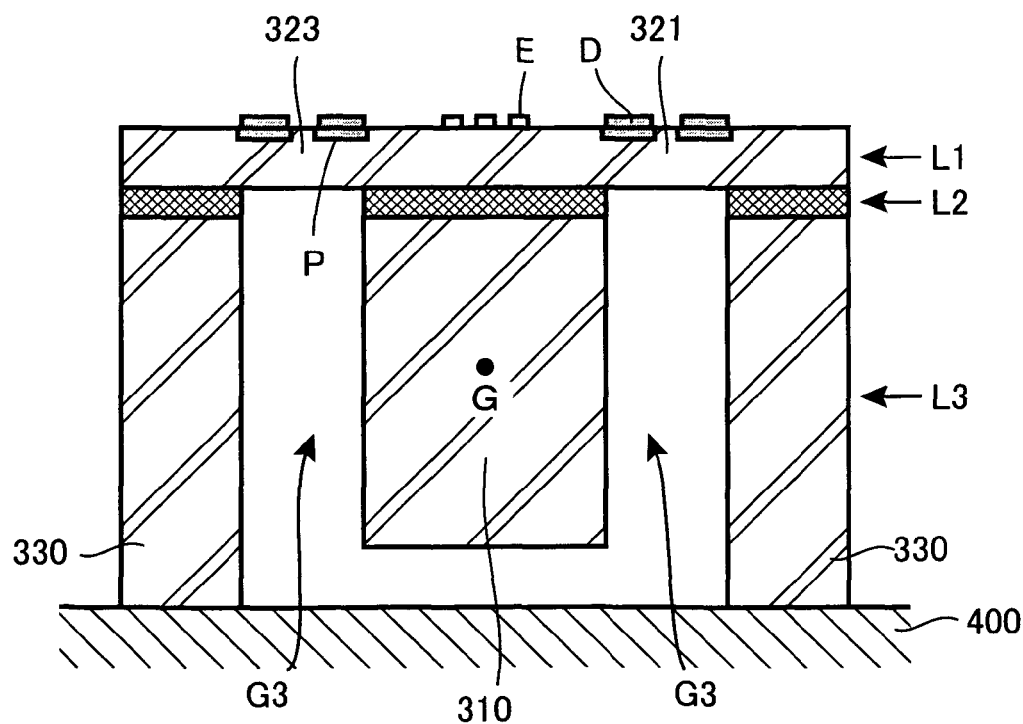
FIG. 38 is a vertical cross-sectional view showing an exemplary configuration where the sensor shown in FIG. 26 includes an SOI substrate.

Meanwhile, FIG. 38 is a vertical cross-sectional view showing an exemplary configuration where the sensor according to the second embodiment shown in FIG. 26 includes an SOI substrate. This sensor also employs an SOI substrate having a three-layer structure of an upper layer L1 composed of N-type silicon, a middle layer L2 composed of a silicon oxide insulating layer, and a lower base layer L3 composed of N-type or P-type silicon. That is, an annular groove G3 is dug in the middle and lower layers L2 and L3 of the SOI substrate to separate the weight body 310 and the pedestal 330, and the flexible connection (plate-like bridge portions 321 to 324) is composed only of the upper layer L1. Each piezoresistive element P is constituted by a P-type impurity layer formed in the surface layer of the upper layer L1, as is the case in the above-described embodiments. It is noted that electrodes are formed on the upper and lower surfaces of the piezoelectric elements D and E and insulating layers are formed between the piezoresistive elements P and the piezoelectric elements D and E, but these electrodes and insulating layers are not shown in FIG. 38.

The first advantage of employing an SOI substrate as shown in the examples of FIG. 37 and FIG. 38 is that since the upper and lower layers L1 and L3 are separated by the middle layer L2 composed of an insulating layer, the electrical behavior of each element can be stabilized. If each piezoresistive element P is constituted by a P-type impurity layer formed in an N-type silicon region, a potential barrier due to PN junction is formed at the interfacial boundary therebetween, which allows an electrically independent element to be formed of a sort. However, from a practical standpoint, it is inevitable that a leakage current will flow through the PN junction, and if the leakage current flows through the pedestal into the device chassis 400, no precise detection can be achieved. Employing an SOI substrate allows the upper layer L1 with the piezoresistive elements P formed therein and the lower layer L3 coupled to the device chassis 400 to be separated electrically by the middle layer L2 composed of an insulating layer as shown in FIG. 37 and FIG. 38, whereby the negative impact of the leakage current can be avoided.

The second advantage of employing an SOI substrate is that the thickness of the flexible connection (plate-like bridge portions) can be controlled easily during processing. The etching characteristic of N-type silicon constituting the upper layer L1 is different from that of silicon oxide constituting the middle layer L2. Therefore, when digging annular grooves G1, G2, and G3 from the lower surface of the SOI substrate, the etching process for groove formation can be stopped without etching the upper layer L1 at all by etching the lower layer L3 and then etching the middle layer L2. In other words, since the thickness of the flexible connection (plate-like bridge portions) is necessarily equal to that of the upper layer L1, it is possible to form major structures having a correct thickness as designed without any fine etching control.

Section 8

Exemplary Variations of the Flexible Connection

The sensor according to the present invention requires a structure in which a weight body is supported by a pedestal via a flexible connection so that the weight body can be displaced freely when an external force is applied thereto. In the sensors according to the above-described first and second embodiments, the flexible connection is composed of four plate-like bridge portions. However, the flexible connection may not necessarily include bridge structures (beam structures) as long as having flexibility and capable of connecting the weight body and the pedestal. Here will be described exemplary variations of the flexible connection.

Figure 39:
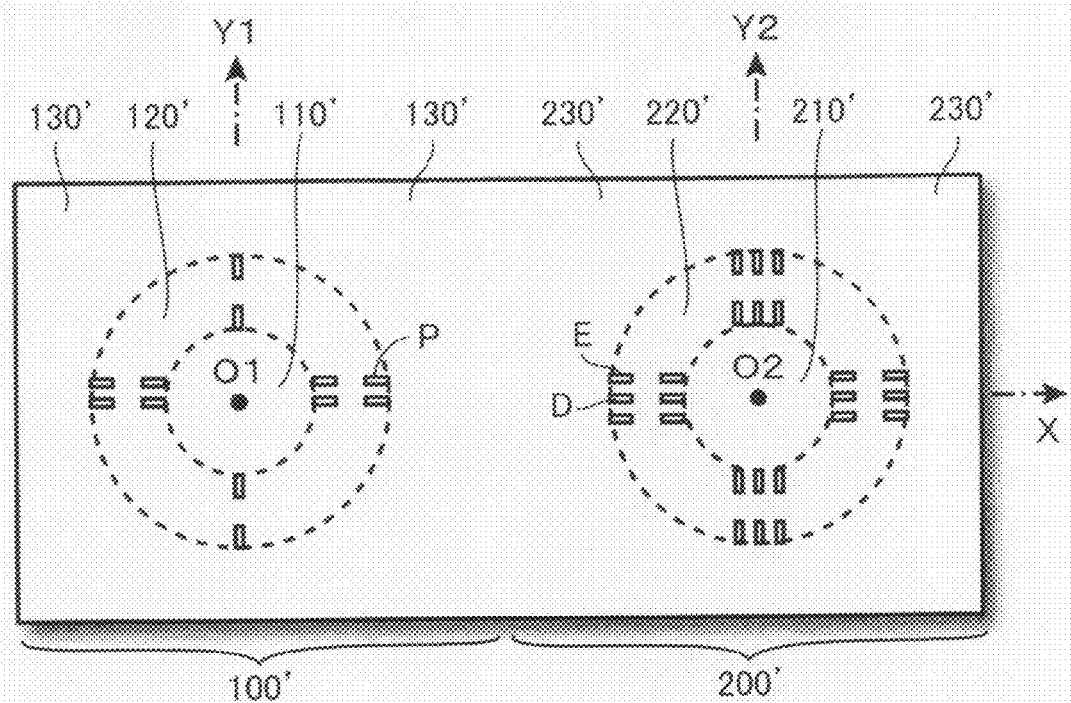
FIG. 39 is a top view showing an exemplary variation of the sensor shown in FIG. 1.
Figure 40:
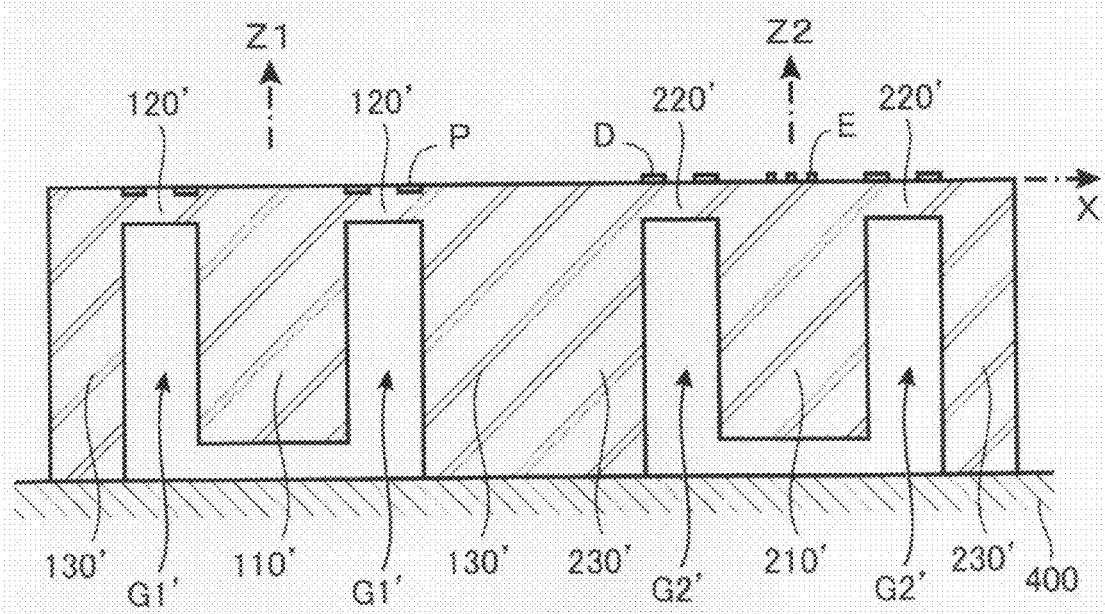
FIG. 40 is a vertical cross-sectional view of the sensor taken along the X-axis of FIG. 39.

FIG. 39 is a top view showing an exemplary variation of the sensor shown in FIG. 1, and FIG. 40 is a vertical cross-sectional view of the sensor taken along the X-axis. The sensor also includes an acceleration detecting section 100' on the left half and an angular velocity detecting section 200' on the right half. The major structures of the acceleration detecting section 100' are a cylindrical-columnar weight body 110' for acceleration detection, a washer-like flexible connection 120' formed around the weight body 110', and a pedestal 130' for acceleration detection formed around the flexible connection 120'. Similarly, the major structures of the angular velocity detecting section 200' are a cylindrical-columnar weight body 210' for angular velocity detection, a washer-like flexible connection 220' formed around the weight body 210', and a pedestal 230' for angular velocity detection formed around the flexible connection 220'.

In FIG. 40, the weight bodies 110' and 210' have a cylindrical-columnar shape, and annular grooves G1' and G2' are formed around the weight bodies. The pedestals 130' and 230' surround the respective weight bodies 110' and 210' across the respective annular grooves G1' and G2'. The pedestals 130' and 230' actually form a monolithic structure composed of a part of member with the bottom portions thereof being fixed to the device chassis 400.

The flexible connections 120' and 220' are composed of a thinned washer-like member (so-called diaphragm) and have flexibility. When a force based on acceleration is applied to the weight body 110', the flexible connection 120' is to be deflected so that the weight body 110' is displaced with respect to the pedestal 130'. Similarly, the weight body 210' can be oscillated by deflecting the flexible connection 220', and when a Coriolis force based on angular velocity is applied to the weight body 210' in this oscillated state, the flexible connection 220' is to be deflected based on the Coriolis force so that the weight body 210' is displaced with respect to the pedestal 230' based on the Coriolis force.

The flexible connection 120' includes 12 piezoresistive elements P formed in the upper surface layer thereof, and the flexible connection 220' includes 24 piezoelectric elements D and E formed on the upper surface thereof. The configuration and arrangement of these elements are completely the same as in the sensor shown in FIG. 1, and also the principle of acceleration and angular velocity detection using these elements is completely the same as in the sensor shown in FIG. 1. In the sensor shown in FIG. 1, since the flexible connection is composed of four plate-like bridge portions, the opening portions W11 to W24 are formed in the upper surface of the major structures, while in the sensor shown in FIG. 39, since the flexible connection is composed of a washer-like member, no opening portion is provided. Therefore, the annular grooves G1' and G2' can be evacuated as appropriate.

It is noted that FIG. 1 shows an example in which the flexible connection is composed of plate-like bridge portions (beam structures) in both the acceleration detecting section 100 and the angular velocity detecting section 200, while FIG. 39 shows an example in which the flexible connection is composed of a washer-like member (diaphragm structure) in both the acceleration detecting section 100' and the angular velocity detecting section 200'. It is however possible to employ a beam structure for one detecting section and a diaphragm structure for the other detecting section.

Figure 41:
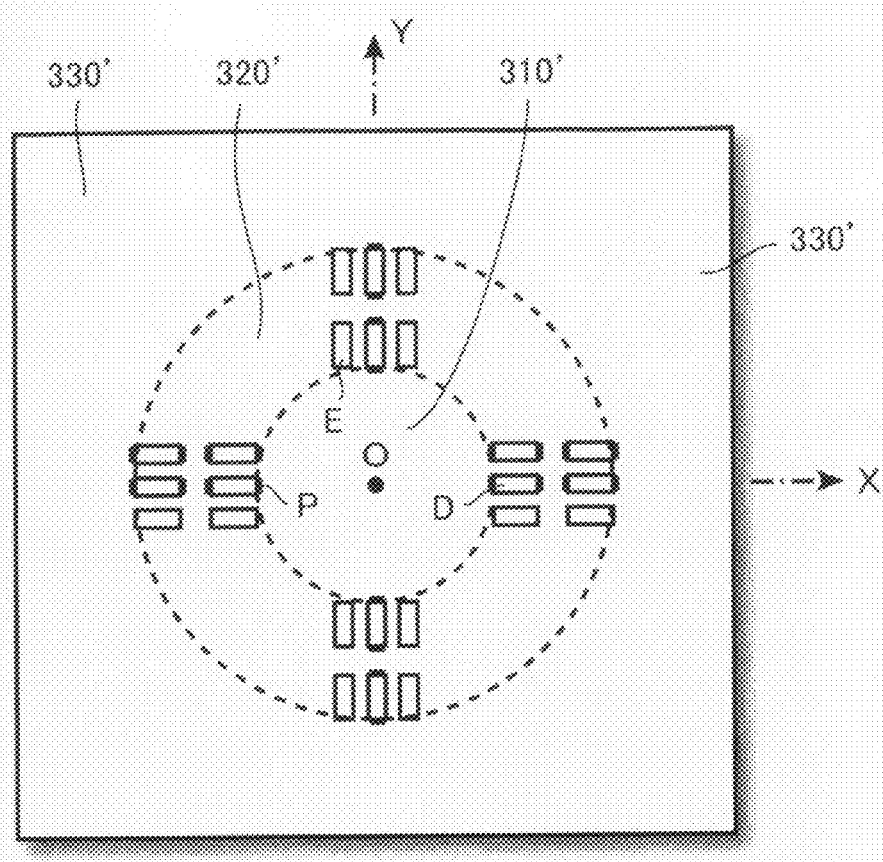
FIG. 41 is a top view showing an exemplary variation of the sensor shown in FIG. 25.
Figure 42:
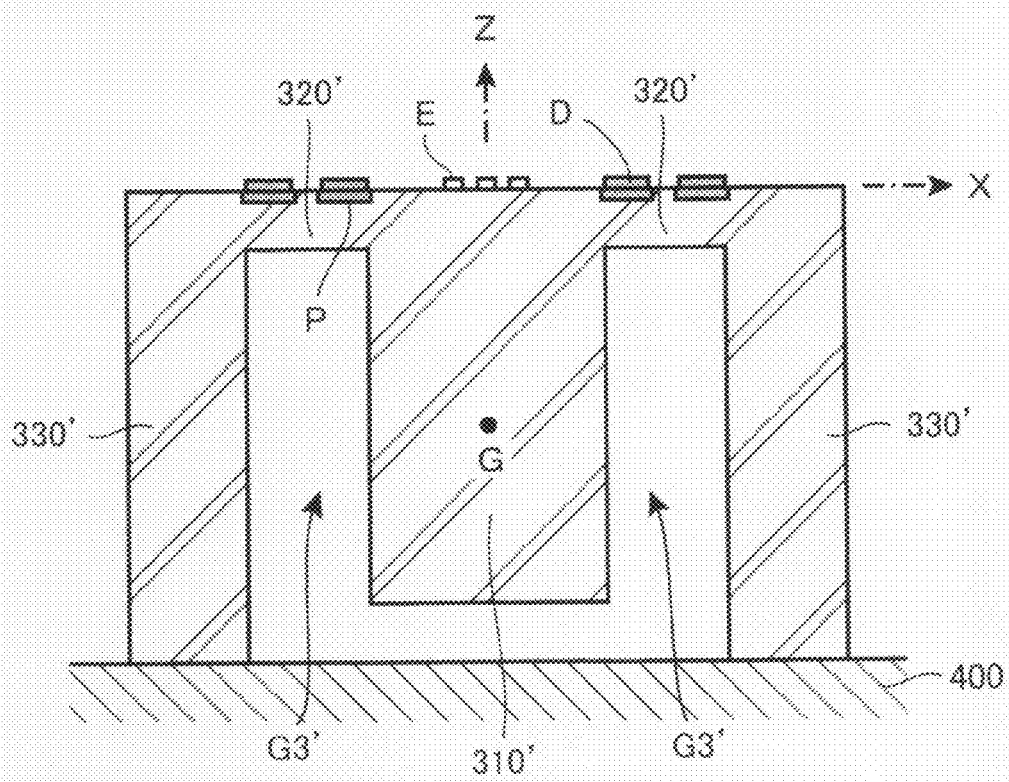
FIG. 42 is a vertical cross-sectional view of the sensor taken along the X-axis of FIG. 41.

FIG. 41 is a top view showing an exemplary variation of the sensor shown in FIG. 25, and FIG. 42 is a vertical cross-sectional view of the sensor taken along the X-axis. The major structures of the sensor are a cylindrical-columnar weight body 310', a washer-like flexible connection 320' formed around the weight body 310', and a pedestal 330' formed around the flexible connection 320'.

In FIG. 42, the weight body 310' has a cylindrical-columnar shape, and an annular groove G3' is formed around the weight body. The pedestal 330' surrounds the weight body 310' across the annular groove G3'. The bottom portion of the pedestal 330' is firmly fixed to the device chassis 400.

The flexible connection 320' is composed of a thinned washer-like member and has flexibility. Therefore; when a force based on acceleration is applied to the weight body 310', the flexible connection 320' is to be deflected so that the weight body 310' is displaced with respect to the pedestal 330'. On the other hand, the weight body 310' can be oscillated by deflecting the flexible connection 320', and when a Coriolis force based on angular velocity is applied to the weight body 310' in this oscillated state, the flexible connection 320' is to be deflected based on the Coriolis force so that the weight body 310' is displaced with respect to the pedestal 330' based on the Coriolis force.

The flexible connection 320' includes 12 piezoresistive elements P formed in the upper surface layer thereof and 24 piezoelectric elements D and E formed on the upper surface thereof. The configuration and arrangement of these elements are completely the same as in the sensor shown in FIG. 25, and some of the elements are formed in the same area in a laminated manner (electrodes and insulating layers are not shown in FIG. 42). Also, the principle of acceleration and angular velocity detection using these elements is completely the same as in the sensor shown in FIG. 25. In the sensor shown in FIG. 25, since the flexible connection is composed of four plate-like bridge portions, the opening portions W1 to W4 are formed in the upper surface of the major structures, while in the sensor shown in FIG. 41, since the flexible connection is composed of a washer-like member, no opening portion is provided. Therefore, the annular groove G3' can be evacuated as appropriate.

Section 9

Sensor According to the Third Embodiment

Next will be described a sensor according to a third embodiment of the present invention. The above-described sensors have a structure in which a weight body is surrounded by a pedestal and the periphery of the weight body is supported by a flexible connection, which allows the weight body to be displaced in any direction along each coordinate axis of a three-dimensional coordinate system. Consequently, acceleration in the directions along the three-dimensional coordinate axes and angular velocity around the three-dimensional coordinate axes can be detected. The sensor according to the third embodiment to be described herein is specialized in detecting one-dimensional acceleration and angular velocity with a simpler structure.

Figure 43:
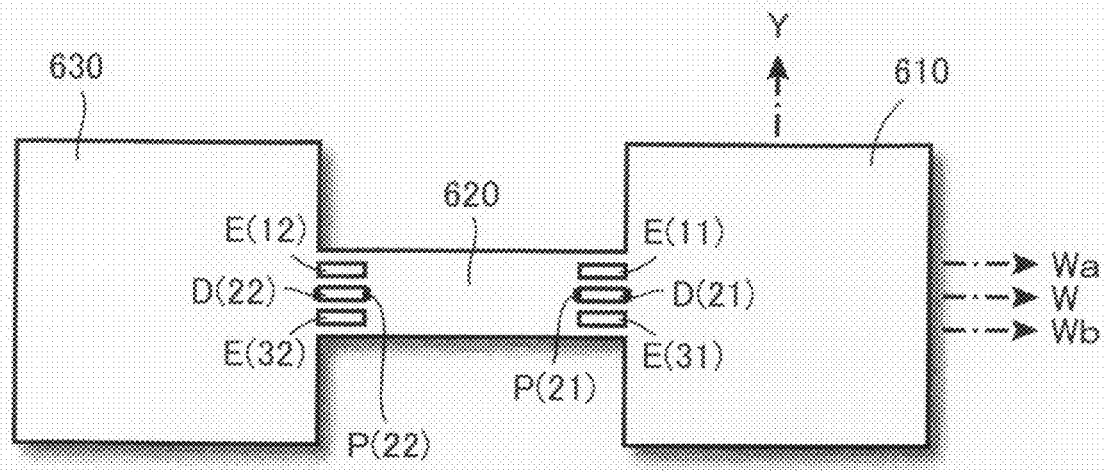
FIG. 43 is a top view of an acceleration and angular velocity sensor according to a third embodiment of the present invention.
Figure 44:
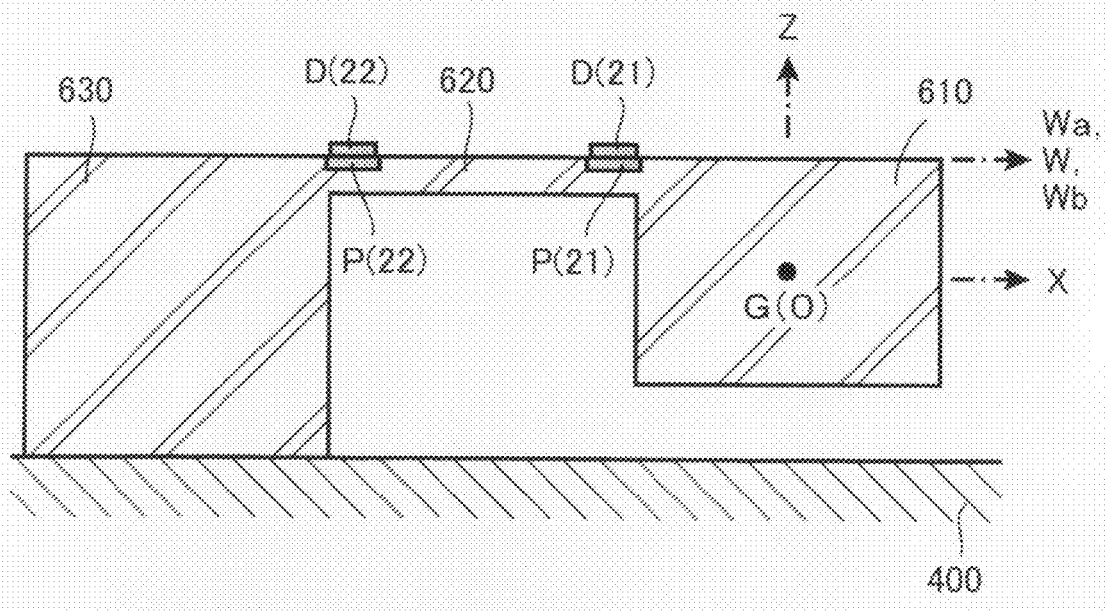
FIG. 44 is a vertical cross-sectional view of the sensor taken along the X-Z plane of FIG. 43.

FIG. 43 is a top view of the sensor, and FIG. 44 is a vertical cross-sectional view of the sensor. As shown in the drawings, the major structures of the sensor are a weight body 610, a flexible connection 620, and a pedestal 630, having a so-called "cantilever beam structure." The pedestal 630 is arranged to the side of the weight body 610 and the bottom portion of the pedestal 630 is fixed to the device chassis 400. The flexible connection 620 is composed of a plate-like bridge portion for connecting the upper part of the weight body 610 and the upper part of the pedestal 630. As shown in FIG. 44, the upper surfaces of the weight body 610, flexible connection 620, and pedestal 630 form a common plane. The common plane will hereinafter be referred to as the "sensor upper surface."

Piezoresistive elements P are embedded in the upper surface layer of the flexible connection 620. Also, driving piezoelectric elements E and detecting piezoelectric elements D are firmly fixed directly or indirectly to the upper surface of the flexible connection 620. For the sake of descriptive convenience, here will be defined an origin O at the center of gravity G (in a reference state where no force is applied) of the weight body 610, and an XYZ three-dimensional coordinate system is defined with the X-axis rightward and the Z-axis upward as shown in FIG. 44. FIG. 44 is a vertical cross-sectional view of the sensor taken along the XZ plane of FIG. 43. A W-axis parallel to the X-axis and included in the "sensor upper surface" is also defined. The W-axis connects a predetermined point (center point in this example) on the upper surface of the weight body 610 and a predetermined point (center point in this example) on the upper surface of the pedestal 630. Further, as shown in FIG. 43, Wa and Wb-axes are defined on either side of the W-axis on the "sensor upper surface," the Wa and Wb-axes running parallel to the W-axis with a predetermined space dw from the W-axis. Then, the portion of the flexible connection 620 closer to the weight body 610 (right end portion in the drawings) will be referred to as the weight body neighborhood, while the portion closer to the pedestal 630 (left end portion in the drawings) will be referred to as the pedestal neighborhood.

In accordance with these definitions, each element is arranged as follows. First, a piezoresistive element P (21) is arranged in the weight body neighborhood on the W-axis in the flexible connection 620, and a piezoresistive element P (22) is arranged in the pedestal neighborhood. Meanwhile, a detecting piezoelectric element D (21) is arranged in the weight body neighborhood on the W-axis in the flexible connection 620, and a detecting piezoelectric element D (22) is arranged in the pedestal neighborhood. Then, a driving piezoelectric element E (11) is arranged in the weight body neighborhood on the Wa-axis in the flexible connection 620, and a driving piezoelectric element E (12) is arranged in the pedestal neighborhood, while a driving piezoelectric element E (31) is arranged in the weight body neighborhood on the Wb-axis in the flexible connection 620, and a driving piezoelectric element E (32) is arranged in the pedestal neighborhood.

Figure 45:
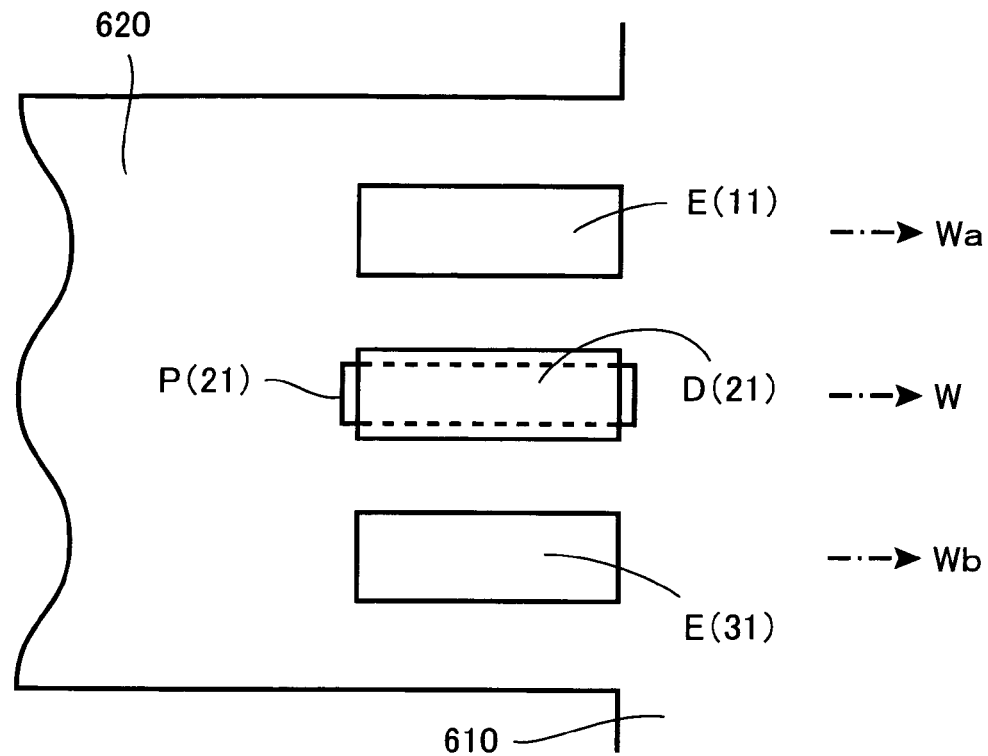
FIG. 45 is an enlarged top view of the right side portion of the flexible connection 620 in the sensor shown in FIG. 43.
Figure 46:
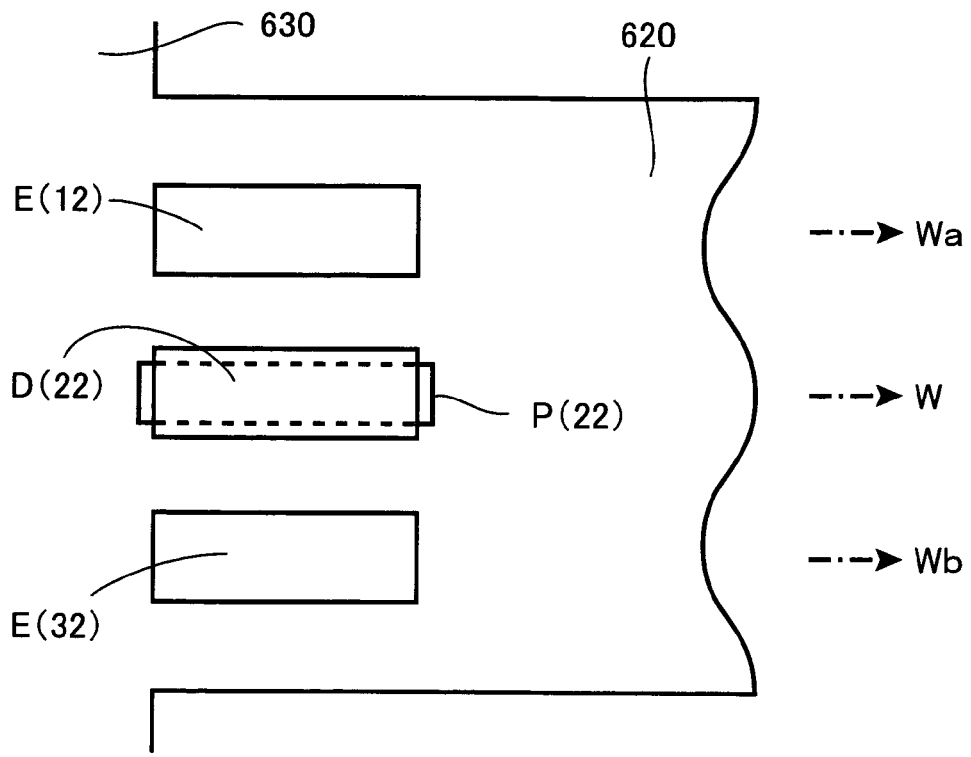
FIG. 46 is an enlarged top view of the left side portion of the flexible connection 620 in the sensor shown in FIG. 43.

FIG. 45 is an enlarged top view of the right side portion of the flexible connection 620 in the sensor shown in FIG. 43, and FIG. 46 is an enlarged top view of the left side portion. The arrangement of each element is shown clearly in these enlarged top views. It is noted that the specific configuration of the piezoresistive elements and piezoelectric elements may be the same as in the above-described embodiments. Lower and upper electrodes are formed, respectively, on the lower and upper surfaces of the driving piezoelectric elements and detecting piezoelectric elements, and the lower surfaces of the lower electrodes on the piezoelectric elements are firmly fixed to the upper surface of the flexible connection. Although FIG. 44 shows a state where the detecting piezoelectric elements D (21) and D (22) are formed directly on the piezoresistive elements P (21) and P (22) for the sake of illustrative convenience, insulating layers are actually inserted between the elements and electrode layers are formed on the upper and lower surfaces of the detecting piezoelectric elements D (21) and D (22).

The sensor also includes an acceleration detecting circuit for detecting an applied acceleration based on the change in the electrical resistances of the piezoresistive elements P (21) and P (22) and an angular velocity detecting circuit for detecting an applied angular velocity based on signals generated in the detecting piezoelectric elements D (21) and D (22) while supplying alternating signals to the driving piezoelectric elements E (11), E (12), E (31), and E (32) to periodically deform the flexible connection 620 and to generate a periodic motion of the weight body 610. More specifically, the angular velocity detecting circuit detects an applied angular velocity based on alternating voltages generated between the upper and lower electrodes on the detecting piezoelectric elements while applying alternating voltages between the upper and lower electrodes on the driving piezoelectric elements to generate a periodic motion of the weight body 610.

Figure 47:
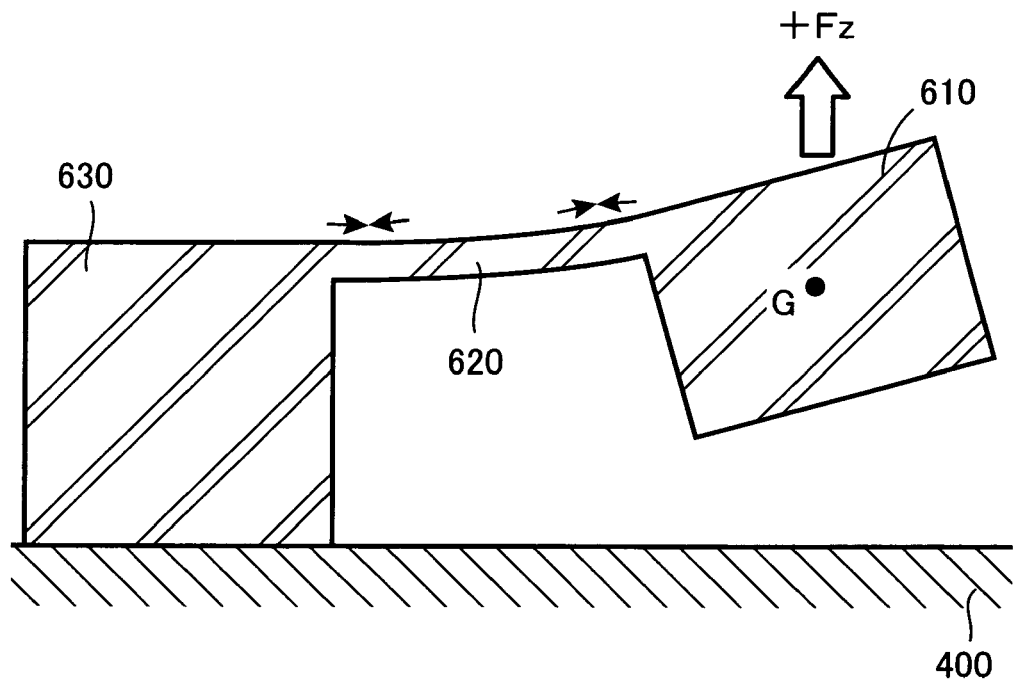
FIG. 47 is a vertical cross-sectional view showing a stretching state in the upper surface of the flexible connection 620 where a force +Fz in the positive direction along the Z-axis is applied to the weight body 610 in the sensor shown in FIG. 44.
Figure 48:
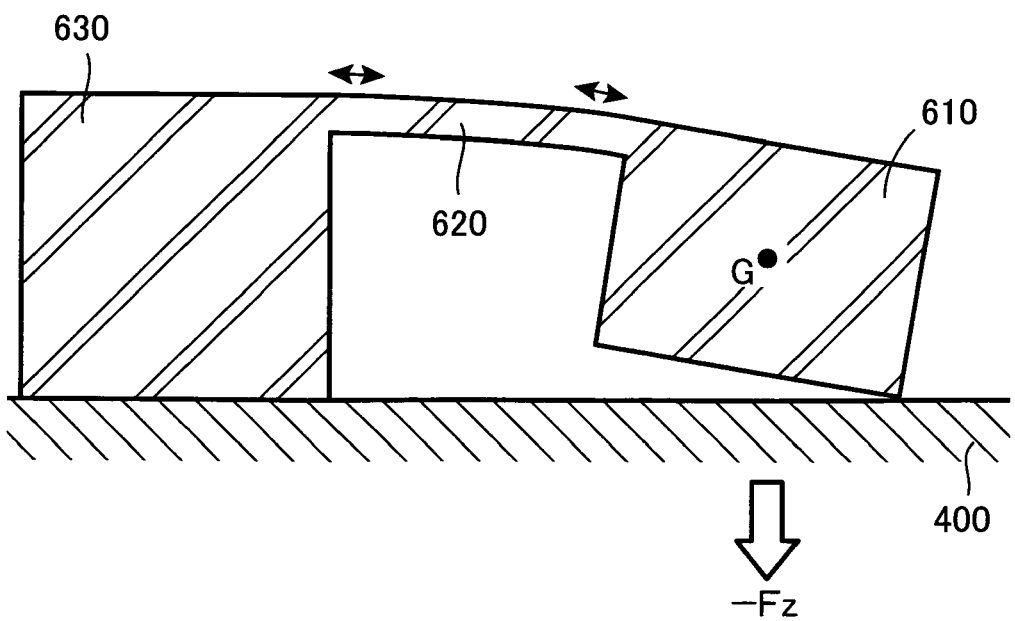
FIG. 48 is a vertical cross-sectional view showing a stretching state in the upper surface of the flexible connection 620 where a force −Fz in the negative direction along the Z-axis is applied to the weight body 610 in the sensor shown in FIG. 44.

Next will be described the principle of acceleration and angular velocity detection in the sensor. FIG. 47 is a vertical cross-sectional view showing a stretching state in the upper surface of the flexible connection 620 where a force +Fz in the positive direction along the Z-axis is applied to the weight body 610 in the sensor shown in FIG. 44. As shown in the drawing, the weight body 610 moves upward in the drawing and thereby each part in the upper surface of the flexible connection 620 is shrunk. Meanwhile, FIG. 48 is a vertical cross-sectional view showing a stretching state in the upper surface of the flexible connection 620 where a force −Fz in the negative direction along the Z-axis is applied to the weight body 610 in the sensor shown in FIG. 44. As shown in the drawing, the weight body 610 moves downward in the drawing and thereby each part in the upper surface of the flexible connection 620 is stretched.

Accordingly, the electrical resistances of the piezoresistive elements P (21) and P (22) are both increased (or reduced) in the state shown in FIG. 47, while are both reduced (or increased) in the state shown in FIG. 48 based on those in the state shown in FIG. 44. Hence, the acceleration a z in the direction of the Z-axis can be detected by monitoring the change in the electrical resistances of the piezoresistive elements P (21) and P (22). It will be appreciated that one piezoresistive element is sufficient in principle, but it is preferable for more precise detection to provide a pair of piezoresistive elements P (21) and P (22) and to obtain the acceleration a z in the direction of the Z-axis based on the sum of the changes in the electrical resistances of the elements.

On the other hand, angular velocity is detected while oscillating the weight body 610 harmonically in the direction of the Z-axis. That is, the four driving piezoelectric elements E (11), E (12), E (31), and E (32) are stretched and shrunk simultaneously by supplying alternating signals having the same phase (e.g. sinusoidal voltage signals) between the upper and lower electrodes of the elements, which causes the states shown in FIG. 47 and FIG. 48 to occur alternately, whereby the weight body 610 can be oscillated harmonically in the direction of the Z-axis.

Figure 49:
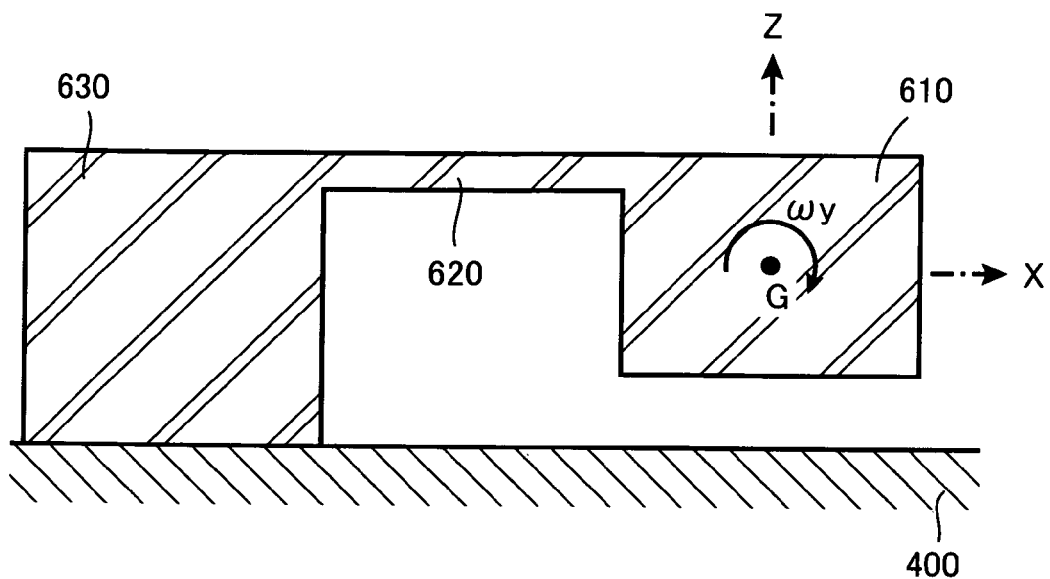
FIG. 49 is a vertical cross-sectional view showing a state where an angular velocity ωy around the Y-axis is applied to the weight body 610 in the sensor shown in FIG. 44.

Here will be considered the case where an angular velocity ωy around the Y-axis is applied as shown in FIG. 49 in such a state of harmonic oscillation. In this case, since the weight body 610 moves in the direction of the Z-axis and the angular velocity ωy is applied around the Y-axis, a Coriolis force in the direction of the X-axis is to be applied to the weight body 610. Hence, next will be considered the deflection of each part in the flexible connection 620 due to such a Coriolis force in the direction of the X-axis.

Figure 50:
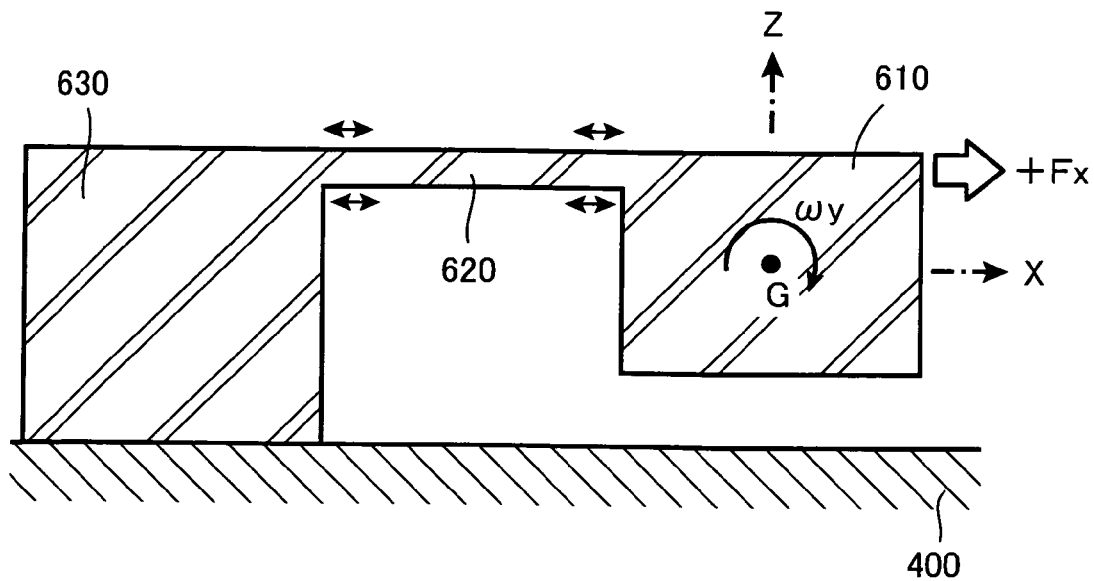
FIG. 50 is a vertical cross-sectional view showing an aspect of a stretching state of the flexible connection 620 where a force +Fx in the positive direction along the X-axis is applied to the flexible connection 620 in the sensor shown in FIG. 44.

Now, assuming that a Coriolis force +Fx in the direction of the X-axis due to an angular velocity ωy is applied as indicated by the arrow in FIG. 50, a stretching force directed rightward in the drawing is to be applied to the flexible connection 620, so that each part in the flexible connection 620 is to be stretched. However, the Coriolis force +Fx is not actually applied to the point shown in FIG. 50, but to the center of gravity G. Therefore, when the angular velocity ωy is applied to the weight body 610 during the motion in the direction of the Z-axis, the major structures are to be deformed not as shown in FIG. 50 but rather as shown in FIG. 47. This can be understood easily by imagining a case where a string is attached to the center of gravity G and a pulling force is applied rightward.

Although stretching forces are applied slightly in leftward and rightward direction to the flexible connection 620 as shown in FIG. 50, as far as the upper surface of the flexible connection 620 is concerned, the shrinkage force is dominant due to deformation as shown in FIG. 47. This is for the reason that since the flexible connection 620 has a plate-like bridge structure for connecting the upper part of the weight body 610 and the upper part of the pedestal 630, a Coriolis force due to the angular velocity ωy behaves as a moment for the entire weight body 610. Therefore, when a reversed Coriolis force −Fx is applied, the major structures are to be deformed as shown in FIG. 48.

Consequently, when an angular velocity ωy around the Y-axis is applied in a state where the weight body 610 is oscillated harmonically in the direction of the Z-axis, a shrinkage or stretching force is applied horizontally to the upper surface of the flexible connection 620. The angular velocity ωy can be obtained by detecting the force through the detecting piezoelectric elements D (21) and D (22).

However, the detecting piezoelectric elements D (21) and D (22) and the driving piezoelectric elements E (11), E (12), E (31), and E (32) are completely the same as a piezoelectric element formed on the upper surface of the flexible connection 620. Therefore, when the weight body 610 is oscillated harmonically in the direction of the Z-axis by supplying alternating drive signals to the driving piezoelectric elements E (11), E (12), E (31), and E (32), the upper surface of the flexible connection 620 is to be stretched and shrunk at the cycle of the alternating drive signals, whereby alternating signals having the same cycle as the alternating drive signals can be obtained constantly from the detecting piezoelectric elements D (21) and D (22). In other words, alternating signals can be obtained from the detecting piezoelectric elements D (21) and D (22) even if no angular velocity ωy is applied.

It is thus preferable that alternating signals output from the detecting piezoelectric elements D (21) and D (22) when the weight body 610 is oscillated harmonically in the direction of the Z-axis in a state where no angular velocity ωy is applied be measured preliminarily as reference alternating signals, and then in detecting an angular velocity ωy, the difference between alternating signals output from the detecting piezoelectric elements D (21) and D (22) and the preliminarily measured reference alternating signals be obtained as a detection value of the angular velocity ωy.

Figure 51:
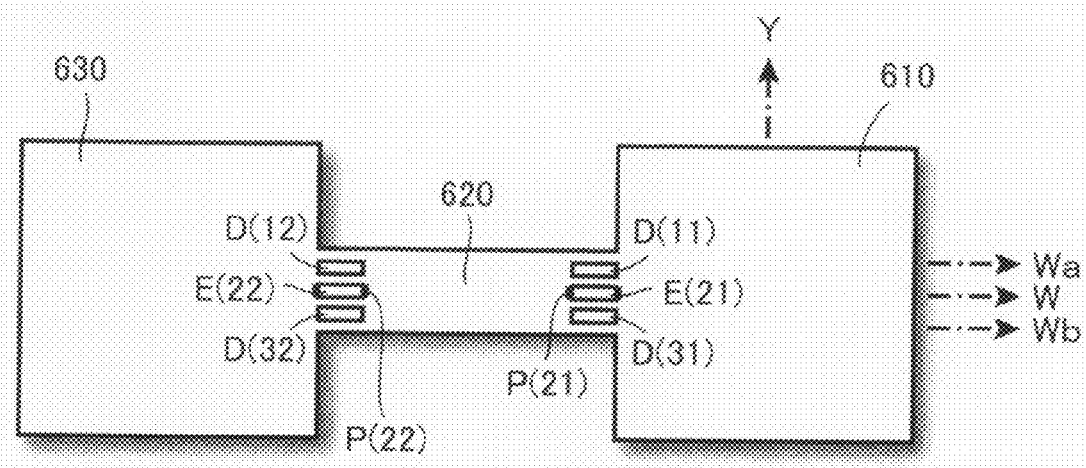
FIG. 51 is a top view showing an exemplary variation of the sensor shown in FIG. 43.

FIG. 51 is a top view showing an exemplary variation of the sensor shown in FIG. 43. The physical structure of the sensor shown in FIG. 51 is completely the same as that of the sensor shown in FIG. 43 except that the applications of each piezoelectric element are completely counterchanged. That is, the four driving piezoelectric elements E (11), E (12), E (31), and E (32) in the sensor shown in FIG. 43 are used as four detecting piezoelectric elements D (11), D (12), D (31), and D (32) in the sensor shown in FIG. 51, while the two detecting piezoelectric elements D (21) and D (22) in the sensor shown in FIG. 43 are used as two driving piezoelectric elements E (21) and E (22) in the sensor shown in FIG. 51.

In other words, each element is arranged as follows. First, a piezoresistive element P (21) is arranged in the weight body neighborhood on the W-axis in the flexible connection 620, and a piezoresistive element P (22) is arranged in the pedestal neighborhood. Meanwhile, a driving piezoelectric element E (21) is arranged in the weight body neighborhood on the W-axis in the flexible connection 620, and a driving piezoelectric element E (22) is arranged in the pedestal neighborhood. Then, a detecting piezoelectric element D (11) is arranged in the weight body neighborhood on the Wa-axis in the flexible connection 620, and a detecting piezoelectric element D (12) is arranged in the pedestal neighborhood, while a detecting piezoelectric element D (31) is arranged in the weight body neighborhood on the Wb-axis in the flexible connection 620, and a detecting piezoelectric element D (32) is arranged in the pedestal neighborhood.

The principle of acceleration detection in the sensor shown in FIG. 51 is completely the same as that in the sensor shown in FIG. 43, and the Z-axis component αz of an acceleration is detected based on the change in the electrical resistances of the piezoresistive elements P (21) and P (22). On the contrary, the principle of angular velocity detection varies slightly. First, alternating drive signals having the same phase are supplied to the two driving piezoelectric elements E (21) and E (22) to oscillate the weight body 610 harmonically in the direction of the Z-axis. In the state where the weight body 610 is thus oscillated harmonically in the direction of the Z-axis, the point for angular velocity detection is the same as in the sensor shown in FIG. 43, but in the sensor shown in FIG. 51, not an angular velocity ωy around the Y-axis but an angular velocity ωx around the X-axis is to be detected.

Figure 52:
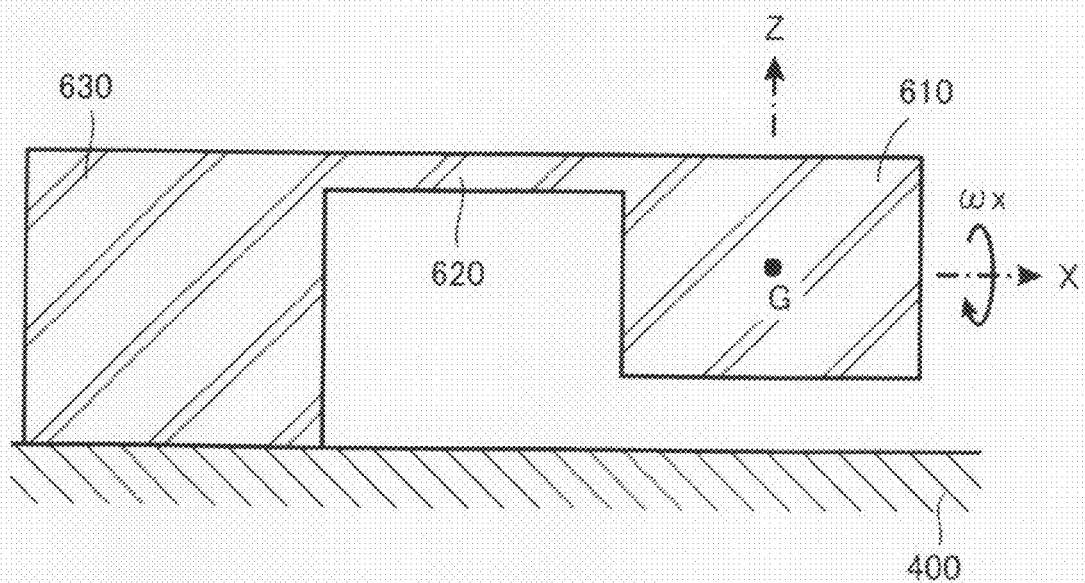
FIG. 52 is a vertical cross-sectional view showing a state where an angular velocity ωx around the X-axis is applied to the weight body 610 in the sensor shown in FIG. 51.
Figure 53:
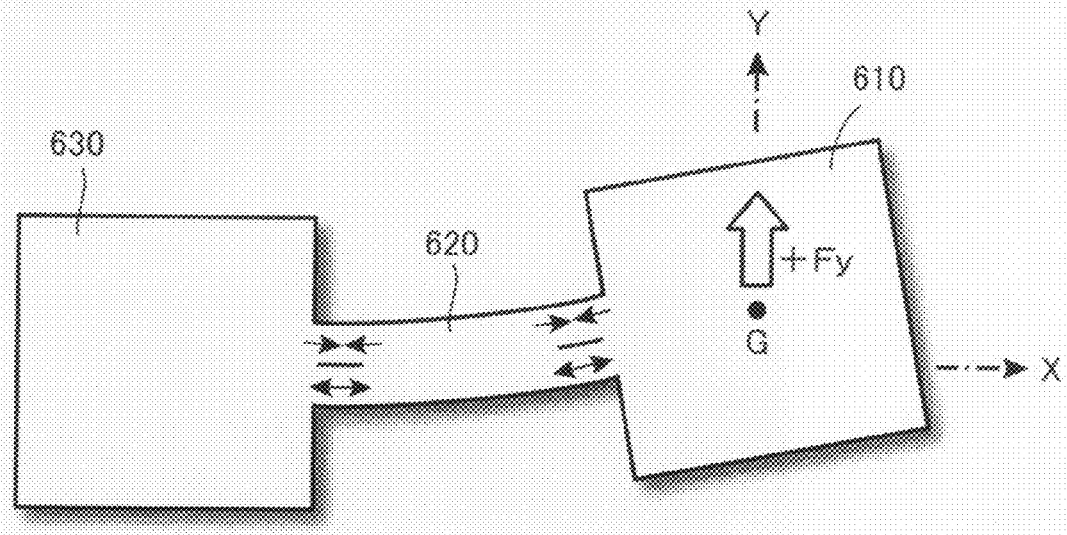
FIG. 53 is a top view showing a deformation state of the flexible connection 620 and a stretching state in the upper surface of the flexible connection 620 at one time point where an angular velocity ωx around the X-axis is applied to the weight body 610 in the sensor shown in FIG. 51.
Figure 54:
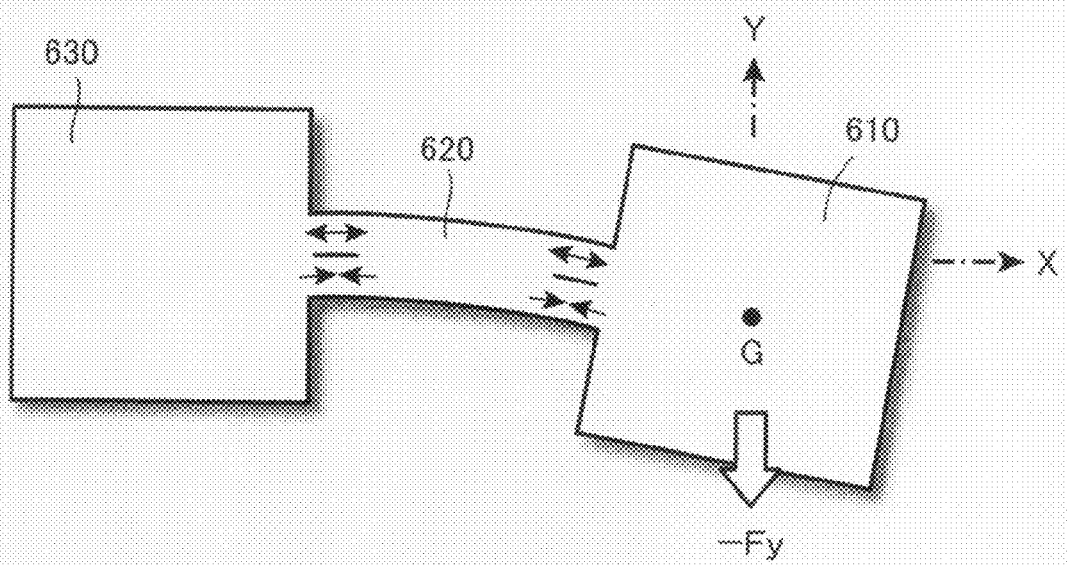
FIG. 54 is a top view showing a deformation state of the flexible connection 620 and a stretching state in the upper surface of the flexible connection 620 at another time point where an angular velocity ωx around the X-axis is applied to the weight body 610 in the sensor shown in FIG. 51.

FIG. 52 is a vertical cross-sectional view showing a state where an angular velocity ωx around the X-axis is applied to the weight body 610 in the sensor shown in FIG. 51. The weight body 610 moves in the direction of the Z-axis, and when an angular velocity ωx around the X-axis is applied in this state, a Coriolis force is to be applied in the direction of the Y-axis (perpendicular to the paper surface in FIG. 52). FIG. 53 and FIG. 54 are top views showing a stretching state in the upper surface of the flexible connection 620 at predetermined time points where an angular velocity ωx around the X-axis is applied to the weight body 610 in the sensor shown in FIG. 51.

That is, in the case that an angular velocity ωx around the X-axis is applied, if the weight body 610 moves in the positive direction along the Z-axis (first half of the harmonic oscillation period), a Coriolis force +Fy in the positive direction along the Y-axis is applied to the weight body 610 and thereby the flexible connection 620 is deflected as shown in FIG. 53, while if the weight body 610 moves in the negative direction along the Z-axis (last half of the harmonic oscillation period), a Coriolis force −Fy in the negative direction along the Y-axis is applied to the weight body 610 and thereby the flexible connection 620 is deflected as shown in FIG. 54 (alternatively, the behavior becomes exactly opposite depending on the direction of the angular velocity ωx). The stretching state of each part in the flexible connection 620 in each state is as indicated by the arrows and bars in the drawings.

Specifically, in the deflected state shown in FIG. 53, shrinkage forces are applied to the detecting piezoelectric elements D (11) and D (12), while stretching forces are applied to the detecting piezoelectric elements D (31) and D (32). On the contrary, in the deflected state shown in FIG. 54, stretching forces are applied to the detecting piezoelectric elements D (11) and D (12), while shrinkage forces are applied to the detecting piezoelectric elements D (31) and D (32). Therefore, if there is provided a detecting circuit for obtaining the difference between the sum of voltage values generated in the detecting piezoelectric elements D (11) and D (12) and the sum of voltage values generated in the detecting piezoelectric elements D (31) and D (32), the detection value from the detecting circuit indicates the angular velocity ωx around the X-axis. From a practical standpoint, it is preferable that detection values from the detecting circuit be obtained at the moment of timing the center of gravity G of the weight body 610 passes through the XY plane in the positive direction along the Z-axis and at the moment of timing the center of gravity G of the weight body 610 passes through the XY plane in the negative direction along the Z-axis, and then the detection values be output as a detection value of the angular velocity ωx. It is noted that even if the applied angular velocity ωx may be the same, the signs of the detection values are opposite between the moments, which requires the values to be treated in consideration of their signs.

It is noted that in the principle of detection in the third embodiment described in Section 9, multiple detecting piezoelectric elements and/or multiple driving piezoelectric elements may not necessarily be provided, but from a practical standpoint, it is preferable to provide multiple detecting piezoelectric elements and multiple driving piezoelectric elements, as in the above-described embodiment, for stable driving and precise detection. In particular, since the ends of the flexible connection 620 may have a deflection stress concentration, arranging detecting and driving piezoelectric elements in these portions is highly effective. The same applies to the arrangement of the piezoresistive elements P.

Also, in the sensor according to the third embodiment, the lower electrodes on the multiple piezoelectric elements may be formed of a physically single common metal layer, and further the multiple piezoelectric elements may be formed of a physically single common piezoelectric element. In addition, the weight body 610, flexible connection 620, and pedestal 630 may be composed of materials including silicon, and the piezoresistive elements may be constituted by a silicon layer containing impurities.

Section 10

Contrivance for Preventing Interference Between Acceleration Detection and Angular Velocity Detection The sensor according to the present invention has a function of detecting both the acceleration and angular velocity. However, acceleration detection and angular velocity detection may interfere with each other in a simultaneous detection, resulting in that no correct detection value can be obtained. For example, acceleration is detected by detecting the displacement of the weight body based on acceleration, but driving the weight body for angular velocity detection may cause an erroneous acceleration detection based on the displacement due to the driving. Also, angular velocity is detected by detecting the displacement of the weight body based on a Coriolis force, but the displacement based on acceleration may be detected erroneously as an angular velocity.

In order to prevent interference between acceleration detection and angular velocity detection, it is thus preferable to drive the weight body (e.g. harmonic oscillation or circular motion) at a frequency sufficiently higher than the frequency range for acceleration detection and to provide filter circuits for filtering out spurious signal components in both the acceleration detecting circuit and the angular velocity detecting circuit.

In general use, several tens of hertz is sufficient for the frequency range for acceleration detection. Hence, if the driving frequency of the weight body (frequency of the drive signals S1 and S2 shown in FIG. 22 and the drive signals SS1 to SS4 shown in FIG. 23) is set to several tens of kilo-hertz, the frequency range for acceleration detection and the frequency range for angular velocity detection can be separated by the filter circuits. For example, it is preferable that the driving frequency of the weight body be set to 20 kHz, a filter circuit for filtering out high-frequency components of 100 Hz or more be provided in the acceleration detecting circuit to remove signal noise components due to the oscillation of the weight body, and a filter circuit for filtering out low-frequency components of 100 Hz or less be provided in the angular velocity detecting circuit to remove signal noise components due to the acceleration.

Figure 55:
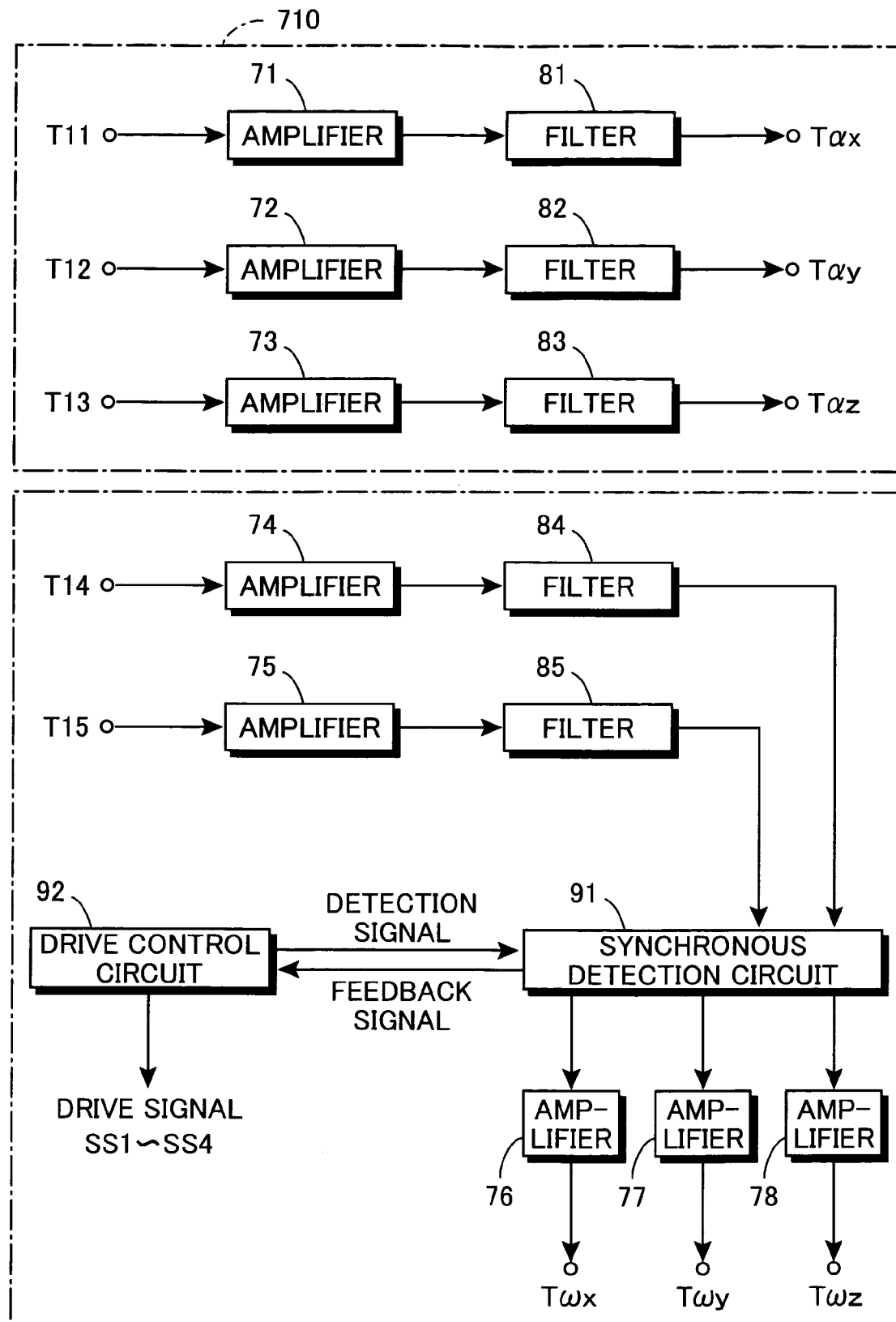
FIG. 55 is a circuit diagram showing an exemplary acceleration and angular velocity detecting circuit used in the sensor shown in FIG. 25.

FIG. 55 is a circuit diagram showing a detecting circuit employing such filter circuits, representing an acceleration and angular velocity detecting circuit used in the sensor shown in FIG. 25. The upper part of the drawing shows an acceleration detecting circuit 710 and the lower part of the drawing shows an angular velocity detecting circuit 720. The terminals T11 to T13 of the acceleration detecting circuit 710 are supplied with voltages that indicate initial detection values of the respective accelerations αx, αy, and αz in the respective directions of the X, Y, and Z axes. That is, the terminals T11, T12, and T13 are supplied with output voltages from the respective potentiometers 51, 52, and 53 shown in FIG. 19. These output voltages are amplified in the amplifier circuits 71, 72, and 73 to be given to the terminals Tαx, Tαy, and Tαz through the filter circuits 81, 82, and 83. The signals output from the terminals Tαx, Tαy, and Tαz indicate detection values of the respective accelerations αx, αy, and αz in the respective directions of the X, Y, and Z axes.

Here, the filter circuits 81, 82, and 83 are, for example, low-pass filter circuits for filtering out high-frequency components of 100 Hz or more, and high-frequency components contained in the signals indicating the change in the electrical resistances of the piezoresistive elements are filtered out. Therefore, even if noise signals within the driving frequency range of the weight body may be contained in the output voltages from the potentiometers 51, 52, and 53 shown in FIG. 19, the detection signals output from the terminals Tαx, Tαy, and Tαz contain no such noise signals.

Meanwhile, the angular velocity detecting circuit 720 includes: amplifier circuits 74 and 75 for amplifying voltages given to the respective terminals T14 and T15; filter circuits 84 and 85; a synchronous detection circuit 91; a drive control circuit 92; and back-end amplifier circuits 76, 77, and 78. The circuit shown here has a function of detecting the angular velocities ωx, ωy, and ωz around the X, Y, and Z-axes while moving the weight body 310 in the sensor shown in FIG. 25 circularly in a plane parallel to the XY plane. The drive control circuit 92 has a function of supplying alternating drive signals SS1 to SS4 as shown in FIG. 23 to each driving piezoelectric element to move the weight body 310 circularly. Detection signals synchronized with the drive signals SS1 to SS4 are supplied from the drive control circuit 92 to the synchronous detection circuit 91. The synchronous detection circuit 91 can acquire detection timing based on these detection signals. On the contrary, feedback signals are supplied from the synchronous detection circuit 91 to the drive control circuit 92. The drive control circuit 92 can perform drive compensation based on these feedback signals as appropriate.

The terminal T14 is supplied with the voltage value at the terminal Tx in FIG. 24A (indicating the force applied to the weight body 310 in the direction of the X-axis), while the terminal T15 is supplied with the voltage value at the terminal Tz in FIG. 24C (indicating the force applied to the weight body 310 in the direction of the Z-axis). It is noted that since the angular velocity detecting circuit 720 detects the tri-axial angular velocities ωx, ωy, and ωz while moving the weight body 310 circularly in a plane parallel to the XY plane as mentioned above, the circuit shown in FIG. 24B is not used (tri-axial angular velocities are detected without a value indicating the force applied to the weight body 310 in the direction of the Y-axis).

To-be-detected signals given to the terminals T14 and T15 are amplified in the amplifier circuits 74 and 75 to be given to the synchronous detection circuit 91 through the filter circuits 84 and 85. Here, the filter circuits 84 and 85 are high-pass filter circuits for filtering out low-frequency components contained in the alternating signals generated in the detecting piezoelectric elements. For example, a high-pass filter circuit for filtering out low-frequency components of 100 Hz or less can remove signal components due to acceleration in general use.

The synchronous detection circuit 91 is for synchronously detecting alternating signals passing through the high-pass filter circuits 84 and 85 based on a detection signal supplied from the drive control circuit 92. Specifically, the moment when the weight body 310 passes through the XZ plane (the moment when the weight body moves in the direction of the Y-axis) is detected based on a detection signal, and then the angular velocities ωz and ωx around the Z and X-axes can be obtained based on the to-be-detected signals at the moment (signal indicating the force applied to the weight body in the direction of the X-axis supplied at the terminal T14 and signal indicating the force applied to the weight body in the direction of the Z-axis supplied at the terminal T15). Also, the moment when the weight body 310 passes through the YZ plane (the moment when the weight body moves in the direction of the X-axis) is detected, and then the angular velocity ωy around the Y-axis can be obtained based on the to-be-detected signal at the moment (signal indicating the force applied to the weight body in the direction of the Z-axis supplied at the terminal T15).

Thus, the signals indicating the angular velocities ωx, ωy, and ωz that are obtained in the synchronous detection circuit 91 are amplified in the respective amplifier circuits 76, 77, and 78 to be output from the terminals Tωx, Tωy, and Tωz.

It is noted that the synchronous detection circuit 91 monitors whether the weight body moves with a correct amplitude (radius in the case of a circular motion) based on to-be-detected signals and then supplies the result to the drive control circuit 92 as a feedback signal. The drive control circuit 92 controls the amplitude of the drive signals SS1 to SS4 appropriately based on the feedback signal.

Although an exemplary detecting circuit used in the sensor shown in FIG. 25 has heretofore been described, the interference between acceleration detection and angular velocity detection can be prevented similarly in the sensors according to the other embodiments by using a predetermined filter circuit.

What is claimed is:

1. A sensor for detecting acceleration and angular velocity, comprising an acceleration detecting section and an angular velocity detecting section, the acceleration detecting section comprising:
　a weight body for acceleration detection; a pedestal for acceleration detection arranged in such a manner as to surround the weight body for acceleration detection;
　a flexible connection for acceleration detection for connecting the weight body for acceleration detection and the pedestal for acceleration detection; the flexible connection for acceleration detection including a plurality of plate-like bridge portions, each of the plate-like bridge portions of the flexible connection for acceleration detection including a piezoresistive element arranged on an inner side that is closer to the weight body for acceleration detection and a piezoresistive element arranged on an outer side that is closer to the pedestal for acceleration detection; the piezoresistive elements being embedded in a surface layer of the flexible connection for acceleration detection; and
　an acceleration detecting circuit for detecting an applied acceleration based on changes in electrical resistance of the piezoresistive elements, the angular velocity detecting section comprising:
　a weight body for angular velocity detection;
　a pedestal for angular velocity detection arranged in such a manner as to surround the weight body for angular velocity detection;
　a flexible connection for angular velocity detection for connecting the weight body for angular velocity detection and the pedestal for angular velocity detection; the flexible connection for angular velocity detection including a plurality of plate-like bridge portions, each of the plate-like bridge portions of the flexible connection for angular velocity detection including a driving piezoelectric element arranged on an inner side that is closer to the weight body for angular velocity detection, a driving piezoelectric element arranged on an outer side that is closer to the pedestal for angular velocity detection, a detecting piezoelectric element arranged on an inner side that is closer to the weight body for angular velocity detection, a detecting piezoelectric element arranged on an outer side that is closer to the pedestal for angular velocity detection;
　the driving piezoelectric elements and the detecting piezoelectric elements being fixed directly or indirectly to a surface of the flexible connection for angular velocity detection; and
　an angular velocity detecting circuit for detecting an applied angular velocity based on a signal generated in the detecting piezoelectric element while supplying an alternating signal to the driving piezoelectric element to periodically deform the flexible connection for angular velocity detection and to generate a periodic motion of the weight body for angular velocity detection, wherein
　the pedestal for acceleration detection and the pedestal for angular velocity detection form a monolithic structure and are fixed to a device chassis.

2. The sensor for detecting acceleration and angular velocity according to claim 1, wherein
　the weight body for acceleration detection, the pedestal for acceleration detection, the flexible connection for acceleration detection, the weight body for angular velocity detection, the pedestal for angular velocity detection, and the flexible connection for angular velocity detection are formed of a single silicon or SOI substrate, and the piezoresistive element is constituted by a silicon layer containing impurities formed in a surface layer of the substrate.

3. The sensor for detecting acceleration and angular velocity according to claim 2, wherein
　a pair of first and second annular grooves are formed on a lower surface of the single substrate, a portion surrounded by the first annular groove constituting the weight body for acceleration detection, while a portion surrounded by the second annular groove constituting the weight body for angular velocity detection,
　a thinned portion corresponding to the first annular groove constitutes the flexible connection for acceleration detection, while a thinned portion corresponding to the second annular groove constituting the flexible connection for angular velocity detection, and
　the piezoresistive element is embedded in an upper surface layer of the flexible connection for acceleration detection, and the driving piezoelectric element and the detecting piezoelectric element are fixed directly or indirectly to an upper surface of the flexible connection for angular velocity detection.

4. The sensor for detecting acceleration and angular velocity according to claim 1, wherein
　a lower electrode and an upper electrode are formed, respectively, on a lower surface and an upper surface of the driving piezoelectric element and the detecting piezoelectric element, a lower surface of the lower electrode is fixed to an upper surface of the flexible connection for angular velocity detection, and
　the angular velocity detecting circuit detects an applied angular velocity based on an alternating voltage generated between upper and lower electrodes of the detecting piezoelectric element while applying an alternating voltage between upper and lower electrodes of the driving piezoelectric element to generate a periodic motion of the weight body for angular velocity detection.

5. The sensor for detecting acceleration and angular velocity according to claim 4, wherein
　the lower electrodes of the driving and detecting piezoelectric elements are formed of a physically single common metal layer.

6. The sensor for detecting acceleration and angular velocity according to claim 4, wherein the driving and detecting piezoelectric elements are formed of a physically single common piezoelectric element.

7. A sensor for detecting acceleration and angular velocity, comprising:
a weight body;
a pedestal arranged in such a manner as to surround the weight body and fixed to a device chassis;
a flexible connection for connecting the weight body and the pedestal;
a piezoresistive element embedded in a surface layer of the flexible connection;
a driving piezoelectric element and a detecting piezoelectric element fixed directly or indirectly to a surface of the flexible connection;
an acceleration detecting circuit for detecting an applied acceleration based on a change in an electrical resistance of the piezoresistive element; and
an angular velocity detecting circuit for detecting an applied angular velocity based on a signal generated in the detecting piezoelectric element while supplying an alternating signal to the driving piezoelectric element to periodically deform the flexible connection and to generate a periodic motion of the weight body, wherein
the flexible connection includes a plurality of plate-like bridge portions, each plate-like bridge portion includes a plurality of the piezoresistive elements arranged, respectively, on an inner side that is closer to the weight body and on an outer side that is closer to the pedestal, and each plate-like bridge portion includes a plurality of the driving piezoelectric elements arranged, respectively, on the inner and outer sides and detecting piezoelectric elements arranged, respective on the inner and outer sides.

8. The sensor for detecting acceleration and angular velocity according to claim 7, wherein
the acceleration detecting circuit has a low-pass filter circuit for filtering out high-frequency components contained in a signal that indicates the change in the electrical resistance of the piezoresistive element, the acceleration detecting circuit outputting signal components passing through the low-pass filter circuit as a detection value of acceleration, and
the angular velocity detecting circuit has a drive control circuit for supplying an alternating signal to the driving piezoelectric element to control the periodic motion of the weight body, a high-pass filter circuit for filtering out low-frequency components contained in an alternating signal generated in the detecting piezoelectric element, and a synchronous detection circuit for synchronously detecting an alternating signal passing through the high-pass filter circuit at a time point determined by a detection signal supplied from the drive control circuit, the angular velocity detecting circuit outputting a detection result by the synchronous detection circuit as a detected value of angular velocity.

9. The sensor for detecting acceleration and angular velocity according to claim 7, wherein
the weight body, the pedestal, and the flexible connection are formed of a single silicon or SOI substrate, and the piezoresistive element is constituted by a silicon layer containing impurities formed in a surface layer of the substrate.

10. The sensor for detecting acceleration and angular velocity according to claim 9, wherein
an annular groove is formed on a lower surface of the single substrate, a portion surrounded by the annular groove constituting the weight body and a thinned portion corresponding to the annular groove constituting the flexible connection, and
the piezoresistive element is embedded in an upper surface layer of the flexible connection, and the driving piezoelectric element and the detecting piezoelectric element are fixed directly or indirectly to an upper surface of the flexible connection.

11. The sensor for detecting acceleration and angular velocity according to claim 10, wherein
an XYZ three-dimensional coordinate system having X-axis, Y-axis and Z-axis is defined, an origin O thereof being at a center on an upper surface of the weight body and an XY plane thereof corresponding to an upper surface of the substrate,
Xa and Xb-axes are defined on either side of the X-axis in the XY plane, the Xa and Xb-axes running parallel to the X-axis with a predetermined space dx from the X-axis,
Ya and Yb-axes are defined on either side of the Y-axis in the XY plane, the Ya and Yb-axes running parallel to the Y-axis with a predetermined space dy from the Y-axis,
one of the Xa, Xb, Ya, and Yb-axes is defined as an auxiliar W-axis,
a portion of the flexible connection closer to the weight body is defined as an inner side, while a portion of the flexible connection closer to the pedestal is defined as an outer side,
some of the detecting piezoelectric elements are arranged, respectively, on the inner and outer sides of the flexible connection along respective positive and negative regions of the X-axis,
some of the driving piezoelectric elements are arranged, respectively, on the inner and outer sides of the flexible connection along respective positive and negative regions of the Xa-axis,
some of the driving piezoelectric elements are arranged, respectively, on the inner and outer sides of the flexible connection along respective positive and negative regions of the Xb-axis,
some of the detecting piezoelectric elements are arranged, respectively, on the inner and outer sides of the flexible connection along respective positive and negative regions of the Y-axis,
some of the driving piezoelectric elements are arranged, respectively, on the inner and outer sides of the flexible connection along respective positive and negative regions of the Ya-axis,
some of the driving piezoelectric elements are arranged, respectively, on the inner and outer sides of the flexible connection along respective positive and negative regions of the Yb-axis,
some of the piezoresistive elements are arranged, respectively, on the inner and outer sides of the flexible connection along respective positive and negative regions of the X-axis,
some of the piezoresistive elements are arranged, respectively, on the inner and outer sides of the flexible connection along respective positive and negative regions of the Y-axis, and
some of the piezoresistive elements are arranged, respectively, on the inner and outer sides of the flexible connection along respective positive and negative regions of the auxiliar W-axis.

12. The sensor for detecting acceleration and angular velocity according to claim 7, wherein
a lower electrode and an upper electrode are formed, respectively, on a lower surface and an upper surface of the driving piezoelectric element and the detecting piezoelectric element, a lower surface of the lower electrode is fixed to an upper surface of the flexible connection, and the angular velocity detecting circuit detects an applied angular velocity based on an alternating voltage generated between upper and lower electrodes of the detecting piezoelectric element while applying an alternating voltage between upper and lower electrodes of the driving piezoelectric element to generate a periodic motion of the weight body.

13. The sensor for detecting acceleration and angular velocity according to claim 12, wherein the lower electrodes of the driving and detecting piezoelectric elements are formed of a physically single common metal layer.

14. The sensor for detecting acceleration and angular velocity according to claim 12, wherein the driving and detecting piezoelectric elements are formed of a physically single common piezoelectric element.

15. The sensor for detecting acceleration and angular velocity according to claim 7, wherein a piezoresistive element and a piezoelectric element are partially laminated with an insulating layer therebetween.

16. A sensor for detecting acceleration and angular velocity, comprising:

a weight body;

a pedestal arranged to a side of the weight body and fixed to a device chassis;

a flexible connection for connecting the weight body and the pedestal; the flexible connection including a plate-like bridge portion connecting an upper part of the weight body and an upper part of the pedestal, a lower part of the pedestal being fixed to the device chassis, the plate-like bridge portion including piezoresistive elements arranged, respectively, at a first position close to the weight body and at a second position close to the pedestal, and further including driving piezoelectric elements arranged, respectively, at the first position and at the second position and detecting piezoelectric elements arranged, respectively, at the first position and at the second position, the piezoresistive elements being embedded in an upper surface layer of the flexible connection, and the driving piezoelectric elements and the detecting piezoelectric elements being fixed directly or indirectly to an upper surface of the flexible connection an acceleration detecting circuit for detecting an applied acceleration based on changes in electrical resistance of the piezoresistive elements; and an angular velocity detecting circuit for detecting an applied angular velocity based on signals generated in the detecting piezoelectric elements while supplying alternating signals to the driving piezoelectric elements to periodically deform the flexible connection and to generate a periodic motion of the weight body.

17. The sensor for detecting acceleration and angular velocity according to claim 16, wherein the acceleration detecting circuit has a low-pass filter circuit for filtering out high-frequency components contained in a signal that indicates the change in the electrical resistance of the piezoresistive element, the acceleration detecting circuit outputting signal components passing through the low-pass filter circuit as a detection value of acceleration, and the angular velocity detecting circuit has a drive control circuit for supplying an alternating signal to the driving piezoelectric element to control the periodic motion of the weight body, a high-pass filter circuit for filtering out low-frequency components contained in an alternating signal generated in the detecting piezoelectric element, and a synchronous detection circuit for synchronously detecting an alternating signal passing through the high-pass filter circuit at a time point determined by a detection signal supplied from the drive control circuit, the angular velocity detecting circuit outputting a detection result by the synchronous detection circuit as a detected value of angular velocity.

18. The sensor for detecting acceleration and angular velocity according to claim 16, wherein the weight body, the pedestal, and the flexible connection are composed of materials including silicon, and the piezoresistive element is constituted by a silicon layer containing impurities.

19. The sensor for detecting acceleration and angular velocity according to claim 16, wherein W-axis is defined for connecting a predetermined point on an upper surface of the weight body and a predetermined point on an upper surface of the pedestal, and Wa and Wb-axes are defined on either side of the W-axis, the Wa and Wb-axes running parallel to the W-axis with a predetermined space dw from the W-axis, a portion of the flexible connection closer to the weight body is defined as a weight body neighborhood, while a portion of the flexible connection closer to the pedestal is defined as a pedestal neighborhood, the detecting piezoelectric elements are arranged, respectively, on the weight body neighborhood and the pedestal neighborhood of the flexible connection along the W-axis, some of the driving piezoelectric elements are arranged, respectively, on the weight body neighborhood and the pedestal neighborhood of the flexible connection along the Wa-axis, some of the driving piezoelectric elements are arranged, respectively, on the weight body neighborhood and the pedestal neighborhood of the flexible connection along the Wb-axis, and the piezoresistive elements are arranged, respectively, on the weight body neighborhood and the pedestal neighborhood of the flexible connection along the W-axis.

20. The sensor for detecting acceleration and angular velocity according to claim 16, wherein W-axis is defined for connecting a predetermined point on an upper surface of the weight body and a predetermined point on an upper surface of the pedestal, and Wa and Wb-axes are defined on either side of the W-axis, the Wa and Wb-axes running parallel to the W-axis with a predetermined space dw from the W-axis, a portion of the flexible connection closer to the weight body is defined as a weight body neighborhood, while a portion of the flexible connection closer to the pedestal is defined as a pedestal neighborhood, the driving piezoelectric elements are arranged, respectively, on the weight body neighborhood and the pedestal neighborhood of the flexible connection along the W-axis, some of the detecting piezoelectric elements are arranged, respectively, on the weight body neighborhood and the pedestal neighborhood of the flexible connection along the Wa-axis, some of the detecting piezoelectric elements are arranged, respectively, on the weight body neighborhood and the pedestal neighborhood of the flexible connection along the Wb-axis, and the piezoresistive elements are arranged, respectively, on the weight body neighborhood and the pedestal neighborhood of the flexible connection along the W-axis.

21. The sensor for detecting acceleration and angular velocity according to claim 16, wherein a lower electrode and an upper electrode are formed, respectively, on a lower surface and an upper surface of the driving piezoelectric element and the detecting piezoelectric element, a lower surface of the lower electrode is fixed to an upper surface of the flexible connection, and the angular velocity detecting circuit detects an applied angular velocity based on an alternating voltage generated between upper and lower electrodes of the detecting piezoelectric element while applying an alternating voltage between upper and lower electrodes of the driving piezoelectric element to generate a periodic motion of the weight body.

22. The sensor for detecting acceleration and angular velocity according to claim 21, wherein the lower electrodes on the driving and detecting piezoelectric elements are formed of a physically single common metal layer.

23. The sensor for detecting acceleration and angular velocity according to claim 21, wherein the driving and detecting piezoelectric elements are formed of a physically single common piezoelectric element.

24. The sensor for detecting acceleration and angular velocity according to claim 16, wherein a piezoresistive element and a piezoelectric element are partially laminated with an insulating layer therebetween.

* * * * *